(12) United States Patent
Yamaguchi et al.

(10) Patent No.: US 9,003,188 B2
(45) Date of Patent: Apr. 7, 2015

(54) RECORDING MEDIUM DEVICE, TERMINAL DEVICE, DISTRIBUTION DEVICE, CONTROL METHOD, AND PROGRAM RECORDING MEDIUM

(75) Inventors: Takahiro Yamaguchi, Osaka (JP); Yuichi Futa, Osaka (JP); Toshihisa Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 235 days.

(21) Appl. No.: 13/597,929

(22) Filed: Aug. 29, 2012

(65) Prior Publication Data
US 2013/0061053 A1    Mar. 7, 2013

Related U.S. Application Data

(60) Provisional application No. 61/531,282, filed on Sep. 6, 2011.

(51) Int. Cl.
*G06F 15/16*    (2006.01)
*H04L 9/32*    (2006.01)
(Continued)

(52) U.S. Cl.
CPC .............. *H04L 9/3268* (2013.01); *G06F 21/10* (2013.01); *G11B 20/00181* (2013.01); *G11B 20/00195* (2013.01); *G11B 20/00224* (2013.01); *G11B 20/00847* (2013.01); *H04N 21/2585* (2013.01); *H04N 21/4334* (2013.01); *H04N 21/8355* (2013.01); *G11B 20/00427* (2013.01); *H04L 2209/60* (2013.01); *G11B 2220/2541* (2013.01)

(58) Field of Classification Search
CPC ................................ H04N 5/935; G06F 12/14

USPC .................................... 726/2, 4; 713/168, 170
See application file for complete search history.

(56) References Cited

U.S. PATENT DOCUMENTS 8,145,030 B2 *  3/2012  Isozaki et al. .................. 386/213
8,250,664 B2 *  8/2012  Yamaguchi et al. ............ 726/27
(Continued)

FOREIGN PATENT DOCUMENTS

JP    2002-132587    5/2002
JP    2004-264894    9/2004
(Continued)

OTHER PUBLICATIONS

"The Use of the Simple Certificate Enrollment Protocol (SCEP) and Untrusted Devices"—CSS, Jan. 2012 http://www.css-security.com/wp-content/themes/css/scep/SCEP_and_Untrusted_Devices.pdf.*
(Continued)

*Primary Examiner* — Randy Scott
(74) *Attorney, Agent, or Firm* — Wenderoth, Lind & Ponack, L.L.P.

(57) ABSTRACT

When the terminal device attempts to use a special content, which has an attribute including information distinguishing the special content from regular contents and is stored in the recording medium device, the recording medium device refers to the revocation information indicating terminal devices restricted from using the special content. When the recording medium device determines the terminal device as a terminal device to be restricted from using the special content based on the terminal identifying information of the terminal device, the usage information output unit of the recording medium device does not transmit the necessary information for using the special content to the terminal device.

7 Claims, 30 Drawing Sheets

(51) Int. Cl.
*G06F 21/10* (2013.01)
*G11B 20/00* (2006.01)
*H04N 21/258* (2011.01)
*H04N 21/433* (2011.01)
*H04N 21/8355* (2011.01)

(56) References Cited

U.S. PATENT DOCUMENTS

2002/0169971 A1* 11/2002 Asano et al. ............ 713/193
2006/0041585 A1* 2/2006 Ebihara et al. .......... 707/104.1
2008/0032668 A1 2/2008 Alvarado et al.

FOREIGN PATENT DOCUMENTS

JP 2005-327185 11/2005
JP 2007-519994 7/2007

OTHER PUBLICATIONS

International Search Report issued Nov. 27, 2012 in corresponding International Application No. PCT/JP2012/005358.
Advanced Access Content System (AACS), Prepared Video Book, Revision 0.95, Final, Feb. 19, 2009, pp. 1-33.
Advanced Access Content System (AACS), Introduction and Common Cryptographic Elements, Revision 0.91, Feb. 17, 2006, pp. 1-70.

* cited by examiner

FIG. 4

| Device ID region : Signature device 0x201 | ~1211 |
| Revocation date/time region : 8/15/2011 | ~1212 |
| Device ID region : Terminal device 0x301 | ~1221 |
| Revocation date/time region : 5/12/2011 | ~1222 |
| Owner ID: 0x8001 | ~1223 |
| ⋮ | |
| Device ID region : Terminal device 0x205 | ~1231 |
| Revocation date/time region : 1/3/2011 | ~1232 |
| Signature region : | ~1250 |

Revocation information 1200

Usage Rule (UR)

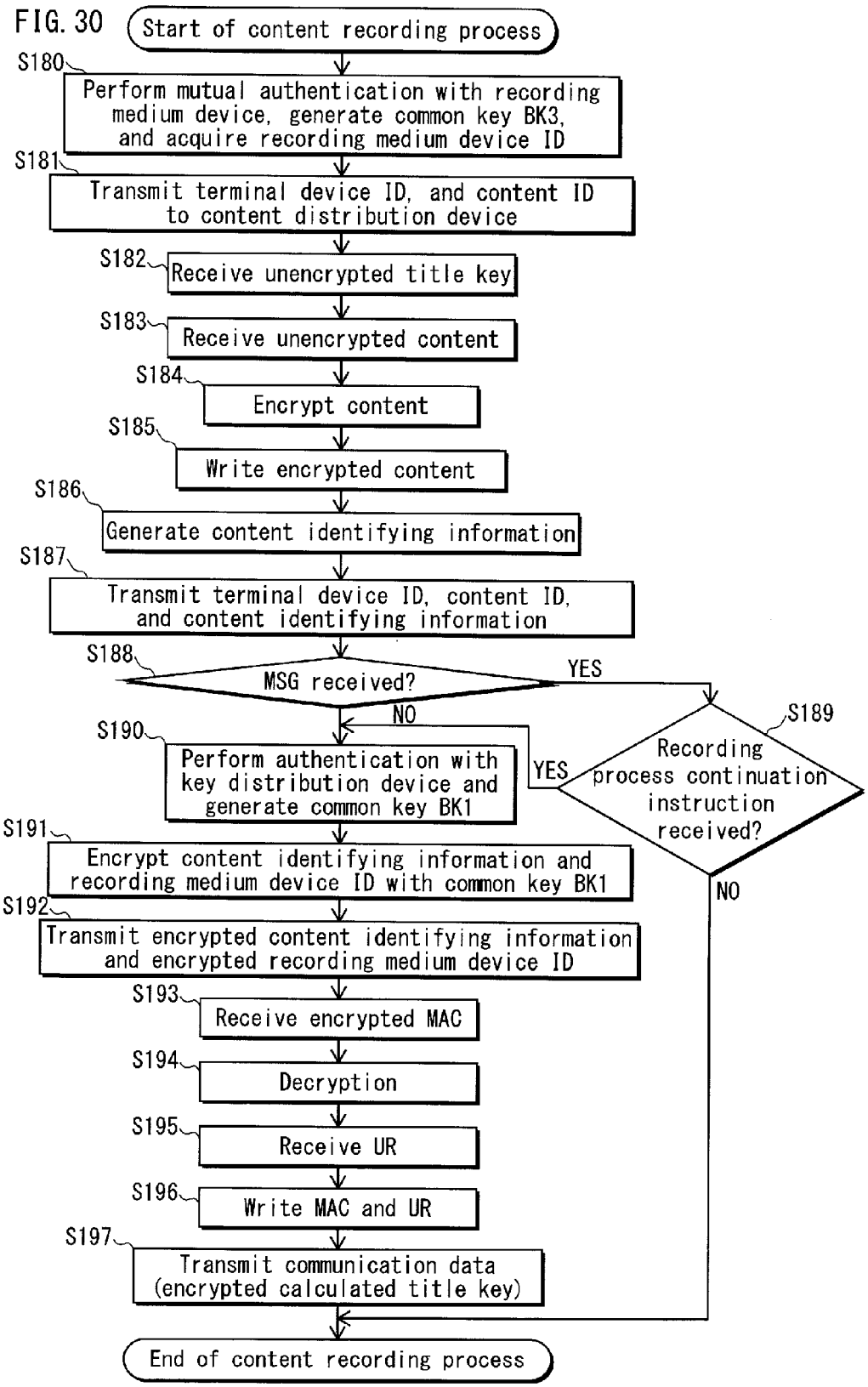

RECORDING MEDIUM DEVICE, TERMINAL DEVICE, DISTRIBUTION DEVICE, CONTROL METHOD, AND PROGRAM RECORDING MEDIUM

CROSS REFERENCE TO RELATED APPLICATION

This application claims benefit to the U.S. provisional Application No. 61/531,282, filed on Sep. 6, 2011.

BACKGROUND

1. Technical Field

The present disclosure relates to a content management system, and in particular to technology of controlling the use of contents by terminal devices.

2. Background of the Related Art

Digital contents such as movies, music, games and digital books are at risk of being copied and used without authorization, because it is easy to copy the data of digital contents. In order to prevent unauthorized copy and use of contents (hereinafter simply referred to as "unauthorized use"), it is necessary to take measure for copyright protection.

One example of copyright protection standards applicable to contents is the Advanced Access Content System (AACS). AACS is copyright protection standards adopted for Blu-ray Discs (BD)™ (c.f. Non-Patent Literature 1).

Under the AACS, a key issuing device issues a device key for a terminal device. Using the device key, the terminal device obtains a title key for decrypting an encrypted content. Also, under the AACS, whether the device key for the terminal device is invalid or not is determined based on a Media Key Block (MKB) which is regularly issued and which contains information defining invalid device keys that have been leaked. A terminal device whose device key is determined invalid is controlled so as not to be able to acquire a title key. A terminal device that cannot acquire a title key cannot encrypt the content, and is therefore prevented from playing back the content.

CITATION LIST

Non-Patent Literature

[Non-Patent Literature 1]
Advanced Access Content System (AACS) Prepared Video Book Revision 0.95
[Non-Patent Literature 2]
Advanced Access Content System (AACS) Introduction and Common Cryptographic Elements Revision 0.91

SUMMARY

However, when a terminal device is determined to be an unauthorized device based on information shown in an MKB that defines invalid device keys which have been leaked, the terminal device is not allowed to use any content. That is, the information shown in the MKB is used for preventing terminal devices from using any contents without exception, regardless of who the content provider is and what the content is.

Hence, there has been a problem that a content provider is not able to flexibly set the information for invalidating terminal devices with respect to the content provider's own contents.

In view of the problem above, one non-limiting and exemplary embodiment provides a recording medium device that enables a content provider to flexibly set information for invalidating terminal devices with respect to contents provided by the content provider, and in particular, a recording medium device that enables the content provider to prevent different terminal devices from using a content depending on whether the content is a regular content or another type of content that is different from a regular content.

In one general aspect, the techniques disclosed here feature a recording medium device for storing contents used by terminal devices connected to the recording medium device, comprising: a content storage unit configured to store contents including a special content; an attribute storage unit configured to store attributes of the contents, which correspond one-to-one to the contents and among which an attribute of the special content contains content identifying information distinguishing the special content from regular contents; a revocation information storage unit configured to store revocation information indicating a terminal device restricted from using the special content; a device identifying information acquisition unit configured to acquire device identifying information from a terminal device connected to the recording medium device, the device identifying information identifying the terminal device; a usage information output unit configured to output usage information to a terminal device connected to the recording medium device, the usage information being necessary for using the special content; and a control unit configured to refer to the revocation information to determine, when a terminal device attempts to use the special content, whether or not the terminal device is restricted from using the special content, based on the device identifying information acquired from the terminal device, and when determining affirmatively, to restrict the usage information output unit from outputting the usage information to the terminal device.

With the recording medium device pertaining to an aspect of the present invention having the stated structure, when the terminal device that attempts to use a special content having an attribute including content identifying information, which distinguishes the special content from regular contents, is determined as a terminal device restricted from using the special content, the recording medium device does not output the necessary information for using the special content to the terminal device. Thus, the stated structure prevents unauthorized use of the special content distinguished from regular contents.

These general and specific aspects may be implemented using a method, and a computer program, and any combination of methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 4 shows a data structure of revocation information 1200 generated by the key issuing device 200.

FIG. 30 is a flowchart showing operations for a content recording process performed by the terminal device 500b.

DETAILED DESCRIPTION

1. Embodiment 1

The following describes a content distribution system 1 as an aspect of the present disclosure.

1-1. Overview

According to the specifications of the AACS, a vendor of a terminal device having a leaked device key is given a preparation/development period (up to 90 days) for creating a new device key, and a considerably long period (approximately four to six months) is required by the vendor to issue an MKB in which the leaked device key is revoked. Hence, it is impossible to prevent unauthorized use of content until a new MKB will be issued.

Meanwhile, contents provided by content providers include a type called "Early Window Contents". Early Window Contents are type of contents adopted in the movie industry or the like, and is provided only for a short time (e.g. approximately three months) after the theatrical closing until the start of the distribution of the content in the form of a recording medium such as a DVD. Since there are only limited ways to acquire such contents, Early Window Contents have commercially valuable for contents providers. Under the conventional mechanism that takes four to six months before the issuance of an MKB, it cannot be said that unauthorized use of such contents is effectively prevented. Since unauthorized use of such valuable contents causes a significant damage, content providers wish to have measures to quickly address the situation in order to prevent unauthorized use of such valuable contents.

Considering the above, as a result of continuing research, the inventors of the present invention have conceived of a content distribution system that is capable of addressing unauthorized use of high-value contents such as Early Window Contents in order to prevent terminal devices without authorization from using the contents. The high-value contents are also referred to as special contents in the following, and is considered amore valuable than regular contents.

Figure 1:
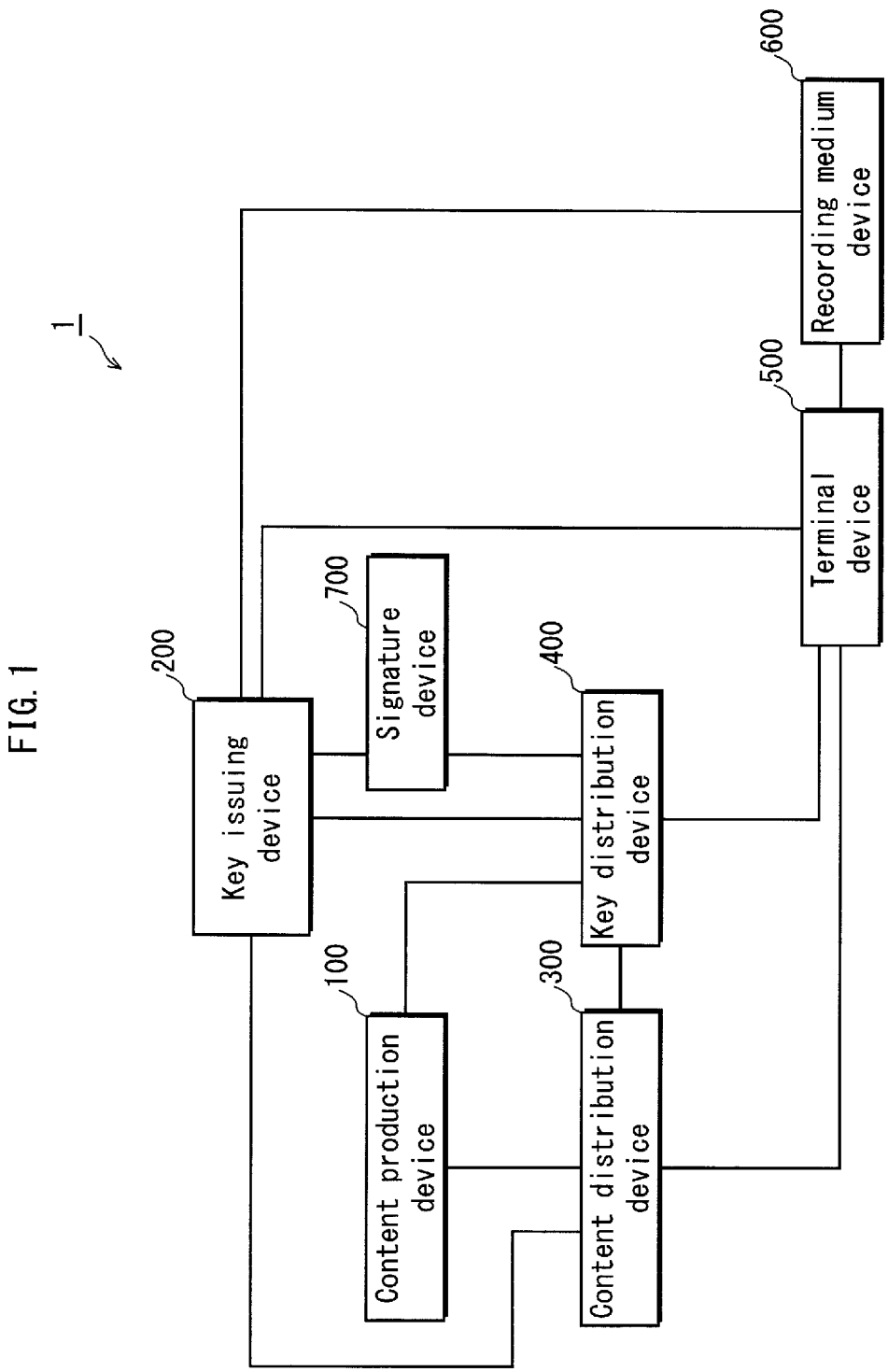
FIG. 1 shows the configuration of a content distribution system 1.

FIG. 1 is a block diagram schematically showing an overall configuration of the content distribution system 1.

The content distribution system 1 includes a content production device 100, a key issuing device 200, a content distribution device 300, a key distribution device 400, a terminal device 500, a recording medium device 600, and a signature device 700. The details of each device will be described later.

The recording medium device 600 stores therein revocation information containing information indicating an unauthorized terminal device (such an unauthorized terminal device is hereinafter also referred to as "revoked device"). The revocation information is used for determining whether a terminal device is an unauthorized terminal device or not. Conventionally, this revocation information has been used for restricting the use of any contents. In the present embodiment, additional revocation information is recorded together with the conventional revocation information so that the additional revocation information indicates a terminal device to be restricted from using a particular content when the content attribute information of the content contains information for distinguishing the content from regular contents (e.g. a particular content provider ID). This additional revocation information is set by the content provider. In this embodiment, the use of content means playback of the content by the terminal device 500 and writing of the content by the terminal device 500 to the recording medium device 600.

When distributing a particular content (hereinafter also referred to as "special content") to the recording medium device 600 and therefor encrypting a title key of the content, the key distribution device 400 generates an encrypted title key by using information that is unique to the content (hereinafter referred to as "encryption unique information"), which has been generated in association with the information for distinguishing the content from regular contents (e.g. a particular content provider ID) and identifying information identifying the recording medium device 600 (e.g. a recording medium device ID). Then, the key distribution device 400 transmits the encrypted title key to the recording medium device 600.

When the terminal device 500 plays back the content recorded on the recording medium device 600, the recording medium device 600 refers to the revocation information. When the attribute information relating to the content contains information distinguishing a special content from regular contents (e.g. a particular content provider ID), the recording medium device 600 determines whether the terminal device 500 is to be restricted from playing back the content. When determining that the terminal device 500 is not a revoked terminal device, the recording medium device 600 generates encryption unique information based on the information distinguishing the content from regular contents and on the identifying information identifying the recording medium device 600. Then, the recording medium device 500 outputs the encryption unique information to the terminal device 500. When determining that the terminal device 500 is a revoked terminal device, the recording medium device 600 does not output the encryption unique information to the terminal device 500. Since the terminal device 500 cannot decrypt the encrypted title key and obtain the title key without the encryption unique information, the terminal device 500 cannot decrypt and play back the content.

The following describes the content production device 100, the key issuing device 200, the content distribution device 300, the key distribution device 400, the terminal device 500, the recording medium device 600, and the signature device 700, which are included in the content distribution system 1.

1-2. Overall Structure

The key issuing device 200 is a device owned by a proper authority, serving as a basis for the security of the content distribution system 1. The key issuing device 200 generates and issues an authorized private key and public key certificate for each of the devices constituting the content distribution system 1.

The content production device 100 generates a content and Usage Rule (hereinafter referred to as an "UR") in which usage conditions and the likes of the content are defined. The content production device 100 transmits an unencrypted content to the content distribution device 300, and transmits the UR to the key distribution device 400.

The terminal device 500 is, for example, a PC located in a user's home. The terminal device 500 is connectable to the content distribution device 300 and the key distribution device 400 via a network such as the Internet.

The terminal device 500 is, for example, a DVD/BD player capable of playing back recording media such as optical discs including DVDs and BDs. The terminal device 500 is connectable to the network, and is located in a home or the like of a user who watches or listens to the content. The recording medium device 600 is, for example, a memory card such as an SD card. When used, the recording medium device 600 is inserted into a card slot of the terminal device 500.

The terminal device 500 receives an encrypted content from the content distribution device 300 via a network, and writes the encrypted content to the recording medium device 600 inserted in the terminal device 500. The terminal device 500 receives a title key from the key distribution device 400 via a network, and writes the title key to the recording medium device 600.

In this regard, the title key is transmitted and received via a secure communication channel (also referred to as "session") established as a result of mutual authentication performed by the key distribution device 400 and the recording medium device 600.

Therefore, the recording medium device 600 can acquire the title key from the key distribution device 400 without exposing the title key to the terminal device 500.

Furthermore, the key distribution device 400 transmits content identifying information 1300 to the signature device 700, and receives content signature generated by the signature device 700 using the private key of the signature device 700. The content signature is also transmitted to the terminal device 500, and written to the recording medium device 600. The content signature is used for verification of the validity of the content.

The following describes the structures and operations of the devices in detail.

1-3. Structure of Key Issuing Device 200

The key issuing device 200 performs a key issuing process for generating and issuing an authorized private key and public key certificate for each of the devices constituting the content distribution system 1. Here, the term "issue" means transmission the private key and the public key certificate to each terminal device, or output of the private key and the public key certificate to another recording medium (e.g. an SD card) for the purpose of setting the private key and the public key certificate to each terminal device.

Figure 2:
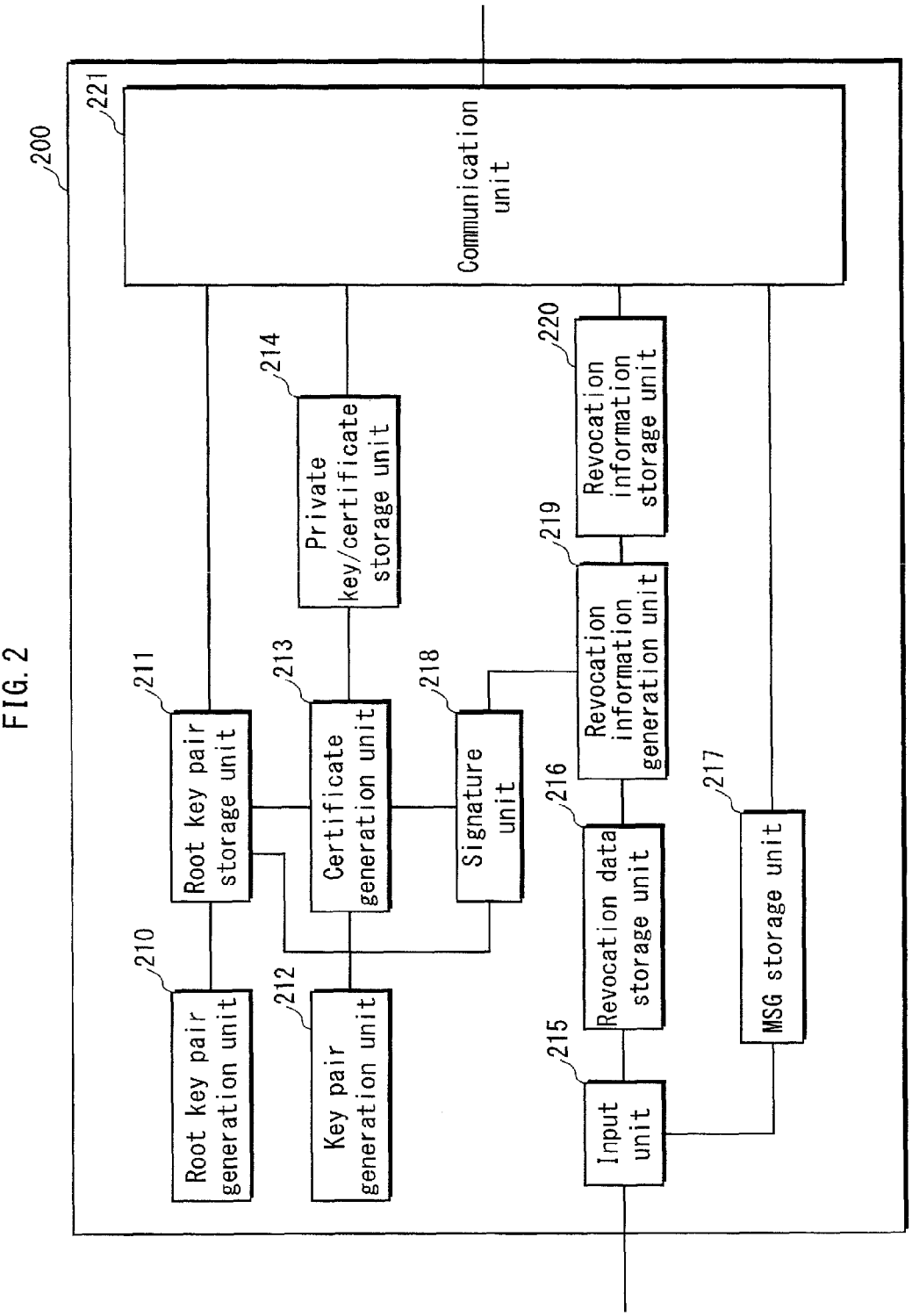
FIG. 2 is a functional block diagram of a key issuing device 200.

FIG. 2 is a block diagram showing a functional structure of the key issuing device 200.

As shown in FIG. 2, the key issuing device 200 includes a root key pair generation unit 210, a root key pair storage unit 211, a key pair generation unit 212, a certificate generation unit 213, a private key/certificate storage unit 214, an input unit 215, a revocation data storage unit 216, a MSG storage unit 217, a signature unit 218, a revocation information generation unit 219, a revocation information storage unit 220, and a communication unit 221.

The key issuing device 200 is a computer system including a CPU, a memory, a secondary storage unit (e.g. a hard disk), a network connection unit, a keyboard, etc. Each of the root key pair storage unit 211, the private key/certificate storage unit 214, the revocation data storage unit 216, the revocation information storage unit 220, and the MSG storage unit 217 includes a secondary storage unit (e.g. a hard disk).

The functions of each of the key pair generation unit 212, the certificate generation unit 213, the signature unit 218 and the revocation information generation unit 219 are achieved by the CPU executing a computer program stored in the memory. The communication unit 221 includes a network connection unit. The input unit 215 includes a keyboard.

The following describes the functional structure of each unit.

(1) Root Key Pair Generation Unit 210 and Key Pair Generation Unit 212

The root key pair generation unit 210 generates a root key pair of the key issuing device 200 which serves as a basis for the security of the content distribution system 1. The root key pair is composed of a root public key and a root private key.

The root key pair generation unit 210 generates a private key and a public key which are to be allocated to each device, by the following key generation method.

One example of the key generation method is as follows.

When a public key cryptosystem using elliptic curve cryptography is adopted for example, the root key pair generation unit 210 generates a random number x, and determines the generated random number x as the private key. Next, the root key pair generation unit 210 calculates Y=x*P, and determines Y as the public key. "P" represents a point on an elliptic curve, and "*" represents multiplication on the elliptic curve.

The root key pair generation unit 210 generates a root private key and a root public key to be allocated to the key issuing device 200 by the key generation method described above. Next, the root key pair generation unit 210 writes the root private key and the root public key to the key issuing device 211.

By similar methods as with the method for generating the root private key and the root public key to be allocated to the key issuing device 200, the key pair generation unit 212 generates a content distribution device private key and a content distribution device public key to be allocated to the content distribution device 300, a key distribution device private key and a key distribution device public key to be allocated to the key distribution device 400, a terminal device private key and a terminal device public key to be allocated to the terminal device 500, and a recording medium device private key and a recording medium device public key to be allocated to the recording medium device 600.

Next, the key pair generation unit 212 writes the content distribution device private key, the key distribution device private key, the terminal device private key, the recording medium device private key and the signature device private key into the private key/certificate storage unit 214.

The key pair generation unit 212 outputs the content distribution device public key, the key distribution device public key, the terminal device public key, the recording medium device public key and the signature device public key to the certificate generation unit 213.

(2) Certificate Generation Unit 213 and Signature Unit 218

The certificate generation unit 213 generates a public key certificate to be embedded in the content distribution device 300, the key distribution device 400, the terminal device 500, the recording medium device 600, and the signature device 700.

FIGS. 3A through 3E show examples of public key certificates generated by the certificate generation unit 213.

Figure 3A:
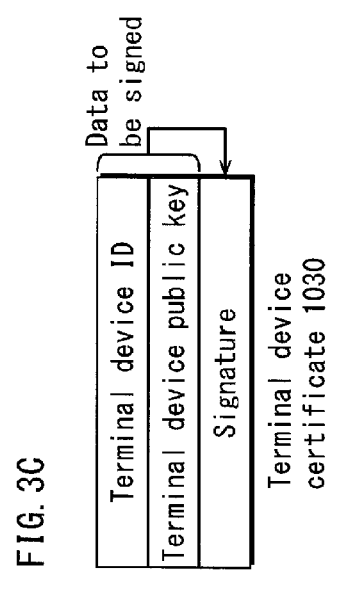
FIGS. 3A through 3E show data structures of certificates generated by the key issuing device 200.

FIG. 3A shows a content distribution device certificate 1010 to be allocated to the content distribution device 300. The content distribution device certificate 1010 includes a content distribution device ID, a content distribution device public key and a signature. In the content distribution device certificate 1010, the signature is attached to the data generated by adding the content distribution device ID, which is the identifier of the content distribution device 300, to the content distribution device public key generated by the key pair generation unit 212. This data is also referred to as "data to be signed".

The content distribution device certificate 1010 is generated from the content distribution device ID, the content distribution device public key, and the signature for the content distribution device 300 generated by the signature unit 218.

The signature unit 218 generates the signature by applying a signature generation algorithm to the data to be signed, using the root private key as the signature generation key. The signature generation algorithm is based on a public key cryptosystem. One example of cryptographic technology used in a public key cryptosystem is elliptic curve cryptography. The signature generation algorithm is Elliptic Curve-Digital Signature Algorithm (EC-DSA), for example.

Figure 3B:
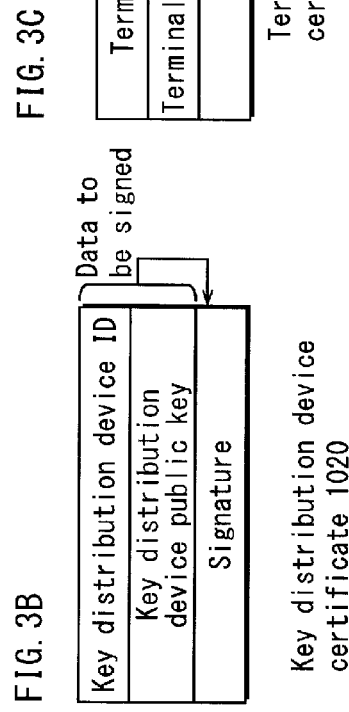

FIG. 3B shows a key distribution device certificate 1020 to be allocated to the key distribution device 400.

Figure 3D:
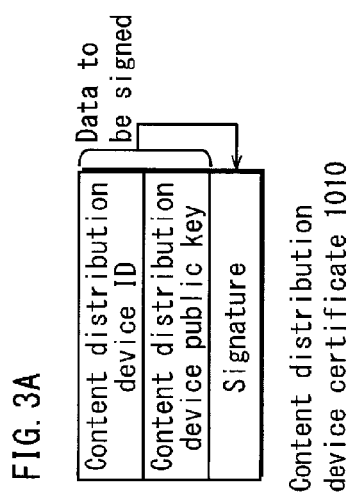
Figure 3C:
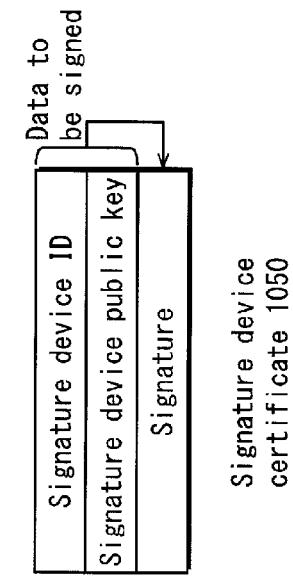

FIG. 3C shows a terminal device certificate 1030 to be allocated to the terminal device 500.

FIG. 3D shows a recording medium device certificate 1040 to be allocated to the recording medium device 600.

Figure 3E:
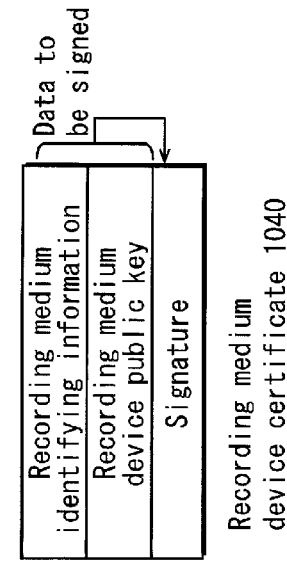

FIG. 3E shows a signature device certificate 1050 to be allocated to the signature device 700.

These public key certificates are generated in a similar manner as with the content distribution device certificate 1010.

(3) Root Key Pair Storage Unit 211, Private Key/Certificate Storage Unit 214, Revocation Data Storage Unit 216, Revocation Information Storage Unit 220, and MSG storage unit 217

The root key pair storage unit 211 is provided with a region for storing the root key pair generated by the root key pair generation unit 210.

The private key/certificate storage unit 214 is provided with a region for storing the content distribution device private key, the content distribution device certificate 1010, the key distribution device private key, the key distribution device certificate 1020, the terminal device private key, the terminal device certificate 1030, the recording medium device private key, the recording medium device certificate 1040, the signature device private key and the signature device certificate 1050.

The revocation data storage unit 216 is provided with a region for storing the revocation data input by the input unit 215, which will be described later. The revocation data is the ID of a revoked device, which is input by the content provider by using the input unit 215.

The revocation information storage unit 220 is provided with a region for storing the revocation information 1200 generated by the revocation information generation unit 219 by using the revocation data.

The MSG storage unit 217 is provided with a region for storing a message (hereinafter also referred to as "MSG") to be presented to the user when the terminal device is revoked.

The MSG storage unit 217 stores notification message information received by the input unit 215. Notification message information is text information saying "The use of the content is not permitted, because your terminal device has been considered as an invalid terminal device by the film company A", for example.

(4) Input Unit 215

The input unit 215 receives the terminal device ID identifying a revoked terminal device, the recording medium device ID identifying a revoked recording medium device and the signature device ID of a revoked signature device according to operations by the content provider, and stores the terminal device ID, the recording medium device ID and the signature device ID into the revocation data storage unit 216.

The input unit 215 receives notification message information for notifying the user of the terminal device when the terminal device has been revoked, according to operations by the content provider. The input unit 215 stores the notification message information into the MSG storage unit 217.

(5) Revocation Information Generation Unit 219

The revocation information generation unit 219 reads revocation data from the revocation data storage unit 216. Next, the revocation information generation unit 219 outputs the revocation data to the signature unit 218, and instructs the signature unit 218 to generate the signature data.

The revocation information generation unit 219 also receives the signature data from the signature unit 218.

Also, as shown in FIG. 4, the revocation information generation unit 219 generates the revocation information 1200 containing the revocation data and the signature data, and writes the revocation information 1200 into the revocation information storage unit 220.

FIG. 4 shows the structure of the revocation information.

The revocation information 1200 can be principally divided into three regions. One is a region in which terminal device IDs to be revoked at the use of any contents are written. Another is a region in which terminal device IDs to be revoked at the use of contents belonging to a particular owner ID. The other is a signature region. Information of a device to be revoked is written in a pair of a device ID region and a revocation date/time region. In the example shown in FIG. 4, a device ID region 1211 and a revocation date/time region 1212 are paired, and a device ID region 1221 and a revocation date/time region 1222 are paired. The signature device 0x201 described in the device ID region 1211 and the terminal device 0x301 described in the device ID region 1221 are devices to be revoked at the use of any contents. Devices to be revoked only at the use of the content belonging to the owner ID written in the owner ID 1223 are indicated by the information described between the owner ID 1223 and the signature region 1250. In the example shown in FIG. 4, the terminal device having the terminal device ID "0x205" is considered as a terminal device to be revoked when the terminal device attempts to use the content whose attribute information contains information indicating that the owner ID is 0x8001. The content provider indicated by the owner ID written in the owner ID 1223 can add information of terminal devices to be revoked at the use of the content belonging to the owner ID by inputting information from the input unit 215.

The information written in the revocation date/time regions 1212, 1222 and 1232 is compared with the signature date/time contained in the device certificate of the device indicated by the ID written in the device ID region, and devices that have been signed later than the date/time written in the revocation date/time region will be revoked.

Note that the term "owner" of a content means a person or an organization (e.g. a film studio, a broadcast company) having rights to the content (e.g. rights of possession, rights of selling, copyrights, portrait rights, rights of distribution).

(6) Communication Unit 221

The communication unit 221 reads the root public key from the root key pair storage unit 211. Next, the communication unit 221 transmits the root public key to the key distribution device 400, the terminal device 500 and the recording medium device 600 via a network.

The communication unit 221 also reads the pair of the content distribution device private key and the content distribution device certificate 1010 from the private key/certificate storage unit 214. Next, the communication unit 221 transmits the pair of the content distribution device private key and the content distribution device certificate 1010 to the content distribution device 300 via a network.

The communication unit 221 also reads the pair of the key distribution device private key and the key distribution device certificate 1020 from the private key/certificate storage unit 214. Next, the communication unit 221 transmits the pair of the key distribution device private key and the key distribution device certificate 1020 to the key distribution device 400 via a network.

The communication unit 221 also reads the pair of the terminal device private key and the terminal device certificate 1030 from the private key/certificate storage unit 214. Next, the communication unit 221 outputs the pair of the terminal device private key and the terminal device certificate 1030 to the terminal device 500 via a manufacturer device owned by a terminal device manufacturer, which is not depicted in the drawings.

The communication unit 221 also reads the pair of the recording medium device private key and the recording medium device certificate 1040 from the private key/certificate storage unit 214. Next, the communication unit 221 outputs the pair of the recording medium device private key and the recording medium device certificate 1040 to the recording medium device 600 via a manufacturer device owned by a recording medium device manufacturer.

The communication unit 221 also reads the pair of the signature device private key and the signature device certificate 1050 from the private key/certificate storage unit 214. Next, the communication unit 221 transmits the pair of the signature device private key and the signature device certificate 1050 to the signature device 700 via a network.

The communication unit 221 reads the revocation information 1200 from the revocation information storage unit 220. Next, the communication unit 221 transmits the revocation information 1200 to the key distribution device 400 via a network.

The communication unit 221 reads notification message information for user notification from the MSG storage unit 217. Next, the communication unit 221 transmits the notification message information to the key distribution device 400 via a network.

1-4. Operations for Key Issuing Process

The following describes the key issuing process performed by the key issuing device 200.

Figure 5:
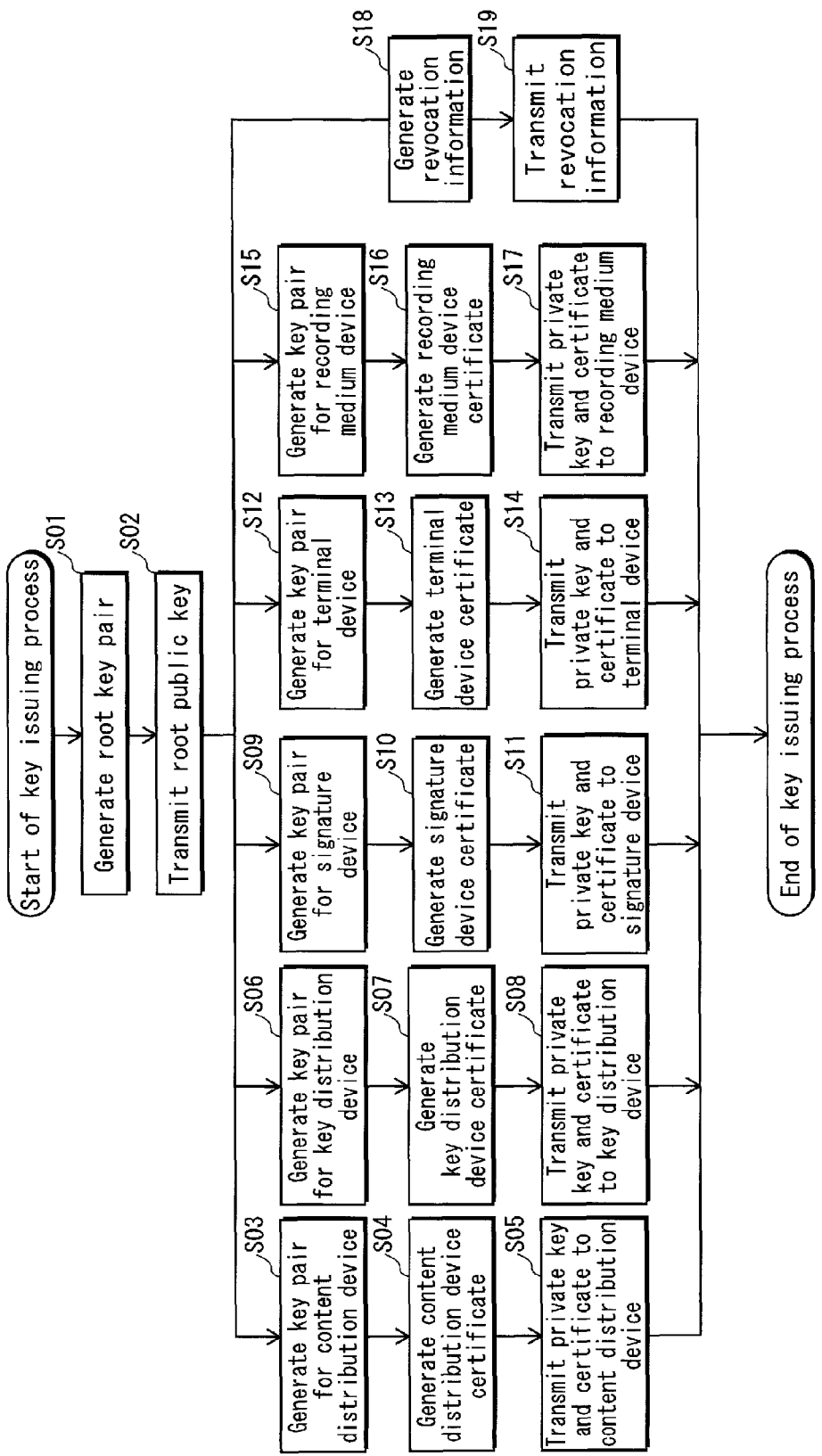
FIG. 5 is a flowchart showing a key issuing process performed by the key issuing device 200.

FIG. 5 is a flowchart showing operations for the key issuing process performed by the key issuing device 200.

The key issuing device 200 generates the root key pair composed of the root public key and the root private key (Step S01), and stores the root key pair into the root key pair storage unit 211. Next, in response to a root public key request, the communication unit 221 transmits the root public key to the content distribution device 300, the key distribution device 400, the terminal device 500, the recording medium device 600 and the signature device 700 (Step S02).

The key pair generation unit 212 generates the key pair for the content distribution device 300 (Step S03). The certificate generation unit 213 generates the content distribution device certificate 1010 (Step S04). The communication unit 221 transmits the content distribution device private key and the content distribution device certificate 1010 to the content distribution device 300 (Step S05).

The key pair generation unit 212 generates the key pair for the key distribution device 400 (Step S06). The certificate generation unit 213 generates the key distribution device certificate 1020 (Step S07). The communication unit 221 transmits the key distribution device private key and the key distribution device certificate 1020 to the key distribution device 400 (Step S08).

The key pair generation unit 212 generates the key pair for the signature device 700 (Step S09). The certificate generation unit 213 generates the signature device certificate 1050 (Step S10). The communication unit 221 transmits the signature device private key and the signature device certificate 1050 to the signature device 700 (Step S11).

The key pair generation unit 212 generates the key pair for the terminal device 500 (Step S12). The certificate generation unit 213 generates the terminal device certificate 1030 (Step S13). The communication unit 221 transmits the terminal device private key and the terminal device certificate 1030 to the terminal device 500 (Step S14).

The key pair generation unit 212 generates the key pair for the recording medium device 600 (Step S15). The certificate generation unit 213 generates the recording medium device certificate 1040 (Step S16). The communication unit 221 transmits the recording medium device private key and the recording medium device certificate 1040 to the recording medium device 600 (Step S17).

The revocation information generation unit 219 generates the revocation information 1200 (Step S18). The communication unit 221 transmits the revocation information 1200 to the key distribution device 400 and the signature device 700 (Step S19).

1-5. Structure of Content Production Device 100

Figure 6:
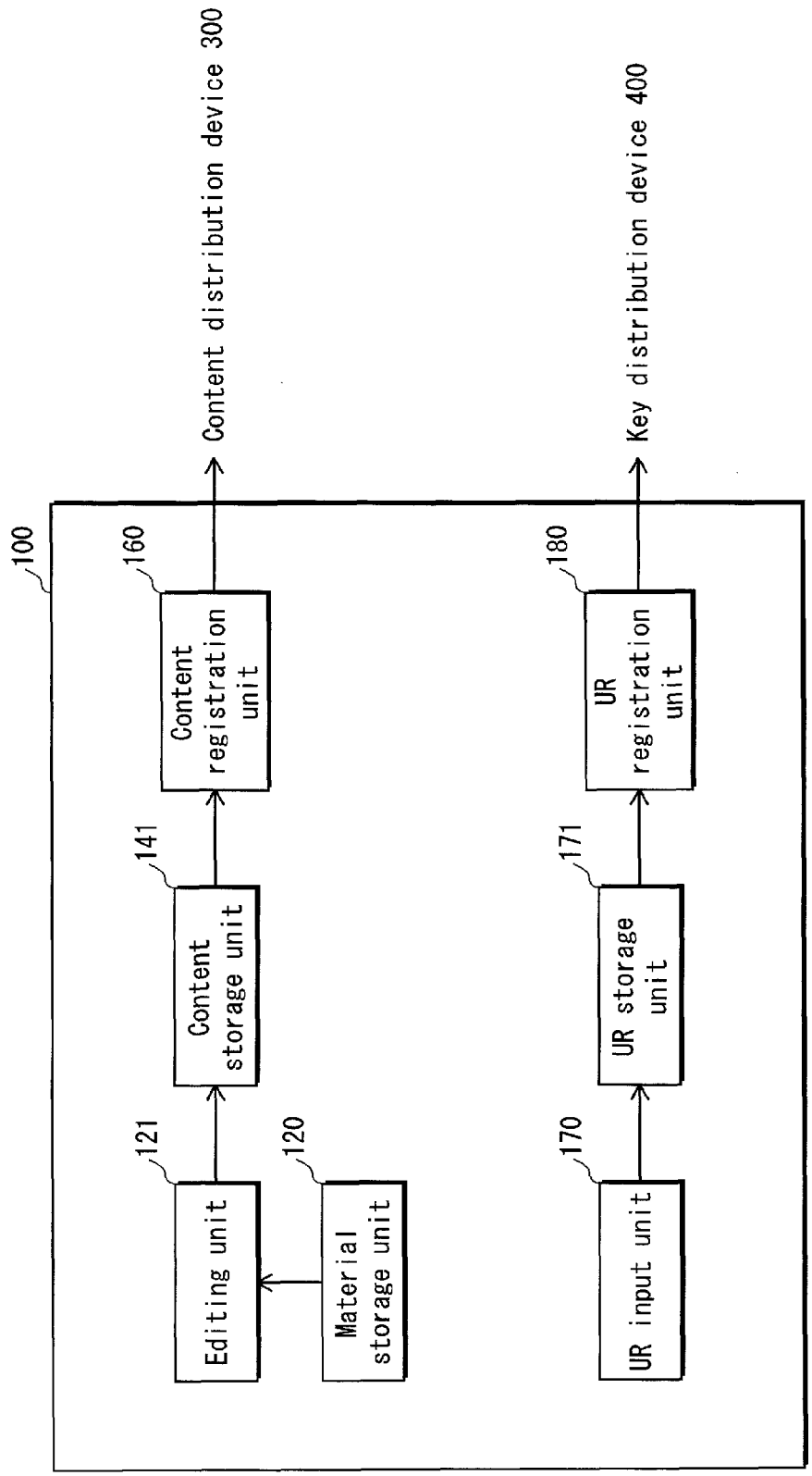
FIG. 6 is a functional block diagram of a content production device 100.

FIG. 6 is a block diagram showing a functional structure of the content production device 100.

As shown in FIG. 6, the content production device 100 includes a material storage unit 120, an editing unit 121, a content storage unit 141, a content registration unit 160, an UR input unit 170, an UR storage unit 171, and an UR registration unit 180.

The content production device 100 is a computer system including a CPU, a memory, a secondary storage unit (e.g. a hard disk), a network connection unit, a keyboard, a mouse, etc. Each of the material storage unit 120, the content storage unit 141 and the UR storage unit 171 includes a secondary storage unit (e.g. a hard disk). Each of the content registration unit 160 and the UR registration unit 180 includes a network connection unit. The UR input unit includes an input device such as a keyboard and a mouse.

The following describes the functional structure of each unit.

(1) Material Storage Unit 120, Content Storage Unit 141, and UR Storage Unit 171

The material storage unit 120 stores one or more materials of video and audio of a movie, for example. Each material is digitized, encoded, and compressed video/audio data piece. Explanation for production of video and audio is omitted, because it is not relevant to the subject of the present invention.

The content storage unit 141 is provided with a region for storing a content edited by the editing unit 121.

The UR storage unit 171 is provided with a region for storing an UR received by the UR input unit 170. UR will be described later.

(2) Editing Unit 121

The editing unit 121 reads the materials stored in the material storage unit 120 and edits the materials to generate an unencrypted content, in response to operations by the content producer. The editing unit 121 outputs the unencrypted content to the content storage unit 141.

(3) UR Input Unit 170

The UR input unit 170 receives a UR indicating conditions relating to the use of contents such as a permitted playback count of the content and whether the content can be moved, in response to operations input by the content producer from an input device.

Figure 7:
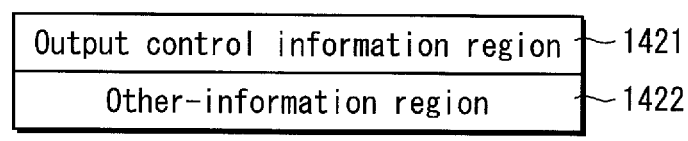
FIG. 7 shows a data structure of a Usage Rule (UR).
Figure 8:
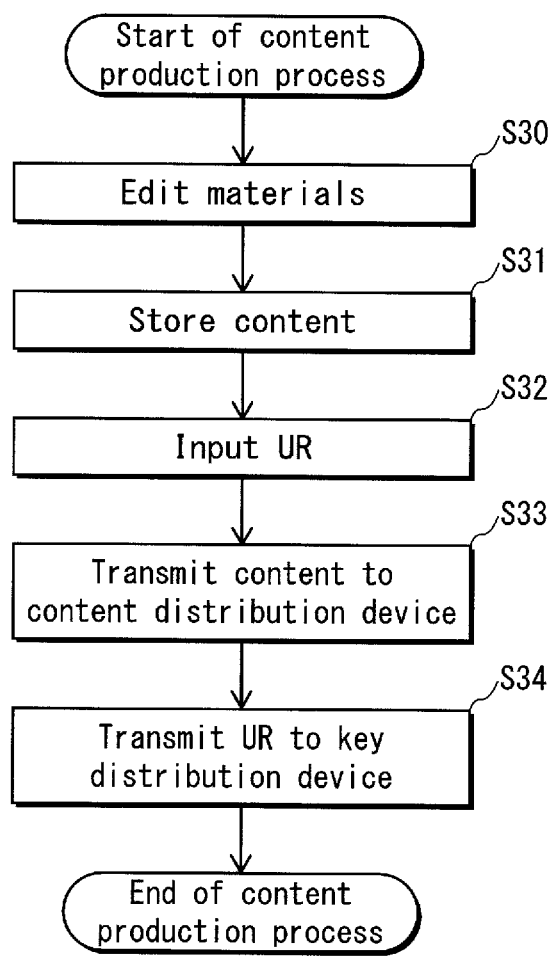
FIG. 8 is a flowchart showing a content production process performed by the content production device 100.

FIG. 7 shows a data structure of a UR.

The UR has an output control information region 1421 and an other-information region 1422. The output control information region 1421 is a region for recording control information relating to viewing and playback such as a viewable time period, a viewing start time, and a viewing end time. The other-information region 1422 is a region for recording information other than the control information relating to viewing and playback. For example, the URL of the server in which the content is stored, the name and the address of the producer or the copyright holder of the content are stored in the other-information region.

(4) Content Registration Unit 160 and UR Registration Unit 180

The content registration unit 160 registers the content stored in the content storage unit 141 with the content distribution device 300.

The UR registration unit 180 registers the UR stored in the UR storage unit 171 with the key distribution device 400.

1-6. Operations for Content Production Process

The editing unit 121 generates a content such as a movie by combining the materials stored in the material storage unit 120 (Step S30).

The editing unit 121 outputs the content to the content storage unit 141 (Step S31).

Next, the UR input unit 170 receives the UR input by the content producer (Step S32). The UR is stored into the UR storage unit 171.

The content registration unit 160 transmits the content stored in the content storage unit 141 to the content distribution device 300 (Step S33).

The UR registration unit 180 transmits the UR stored in the UR storage unit 171 to the key distribution device 400 (Step S34).

1-7. Structure of Content Distribution Device 300

The content distribution device 300 receives and stores a content from the content production device 100. The content distribution device 300 performs a content encryption process for encrypting the content received from the content production device 100. Furthermore, the content distribution device 300 performs a content distribution process for distributing the content to the terminal device 500 connected via a network.

Figure 9:
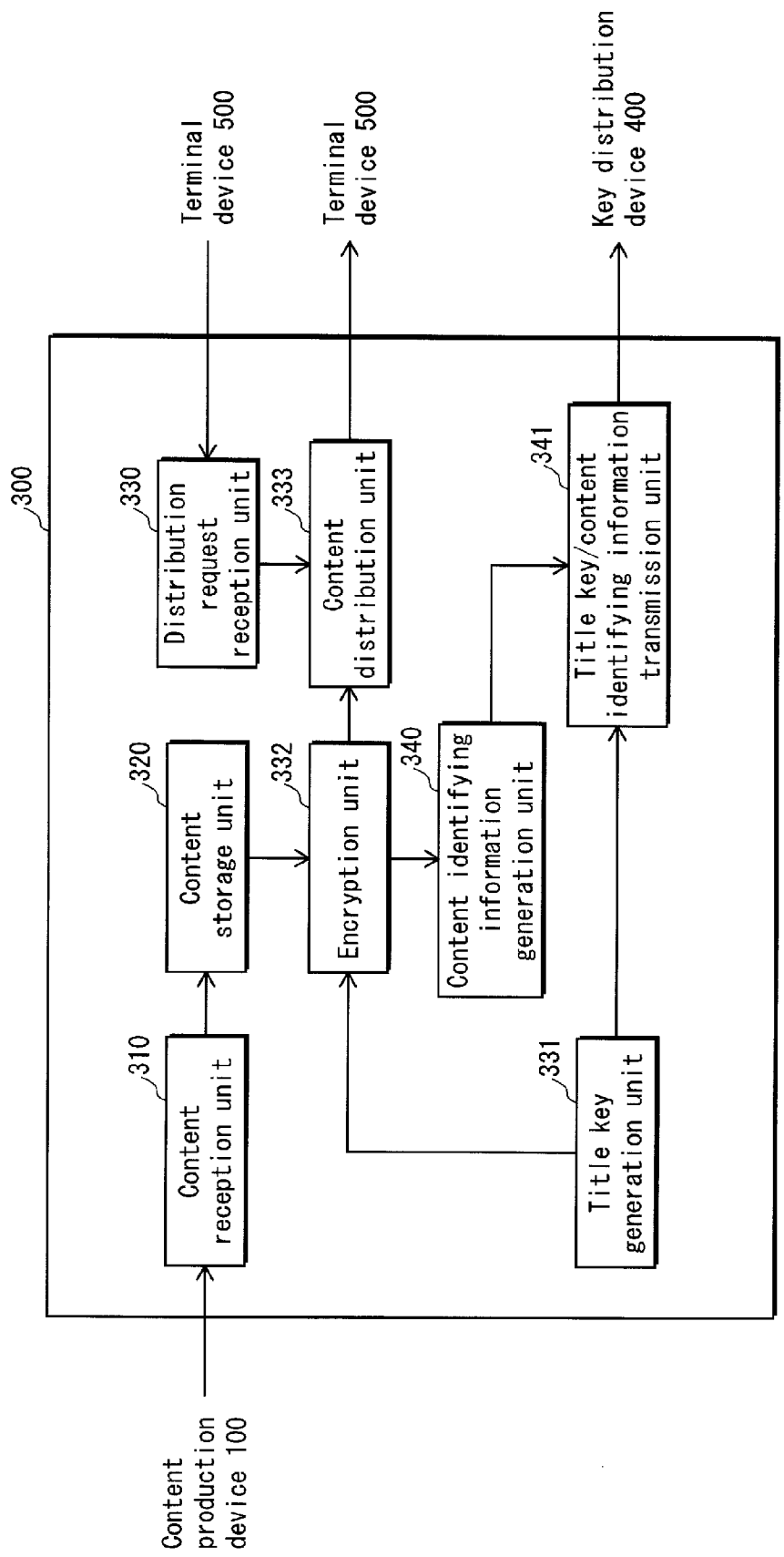
FIG. 9 is a functional block diagram of a content distribution device 300.

FIG. 9 is a block diagram showing a functional structure of the content production device 300.

As shown in FIG. 9, the content distribution device 300 includes a content reception unit 310, a content storage unit 320, a distribution request reception unit 330, a title key generation unit 331, an encryption unit 332, a content distribution unit 333, a content identifying information generation unit 340, and a title key/content identifying information transmission unit 341.

The content distribution device 300 is a computer system including a CPU, a memory, a secondary storage unit (e.g. a hard disk), a network connection unit, a keyboard, a mouse, etc. The content storage unit 320 includes a secondary storage unit (e.g. a hard disk).

The functions of each of the title key generation unit 331, the encryption unit 332 and the content identifying information generation unit 340 are achieved by the CPU executing a computer program stored in the memory. Each of the content reception unit 310, the distribution request reception unit 330, the content distribution unit 333, and the tile key/content identifying information transmission unit 341 includes a network connection unit.

The following describes the functional structure of each unit.

(1) Content Reception Unit 310, Content Distribution Unit 333, Distribution Request Reception Unit 330 and Tile Key/Content Identifying Information Transmission Unit 341

The content reception unit 310 receives a content from the content production device 100, and writes the content into the content storage unit 320.

Upon receiving content distribution request data from the terminal device 500, the distribution request reception unit 330 instructs the content distribution unit 333 to distribute the content. The distribution request data includes, for example, content copyright holder ID and a title of the content.

When the distribution request reception unit 330 receives the distribution request, the content distribution unit 333 searches the content storage unit 320 for the corresponding content based on the title of the content, and distributes the content encrypted by the encryption unit 332 to the terminal device 500.

The title key/content identifying information transmission unit 341 distributes the title key of the content indicated by the distribution request generated by the title key generation unit 331 and the content identifying information 1300 generated by the content identifying information generation unit 340 to the key distribution device 400. The content identifying information 1300 will be described later.

(2) Content Storage Unit 320

The content storage unit 320 is provided with a region for storing the content received by the content reception unit 310. When the distribution request reception unit 330 receives the content distribution request from the terminal device 500, the content storage unit 320 outputs the corresponding content to the encryption unit 332.

(3) Title Key Generation Unit 331

The title key generation unit 331 generates a 128-bit random number, and determines the random number as the title key. The title key generation unit 331 outputs the title key to the encryption unit 332 and the title key/content identifying information transmission unit 341.

(4) Encryption Unit 332

The encryption unit 332 receives the unencrypted content from the content storage unit. The encryption unit also receives the title key from the title key generation unit 331.

Next, the encryption unit 332 encrypts the unencrypted content by an encryption algorithm by using the title key, and thus generates an encrypted content. In the following, a content that has been encrypted with the title key is simply referred to as "content" unless otherwise noted.

The encryption algorithm is based on a private key cryptosystem. For example, Advanced Encryption Standard (AES) may be used.

Next, the encryption unit 332 outputs the content to the content distribution unit 333.

(5) Content Identifying Information Generation Unit 340

Figure 10:
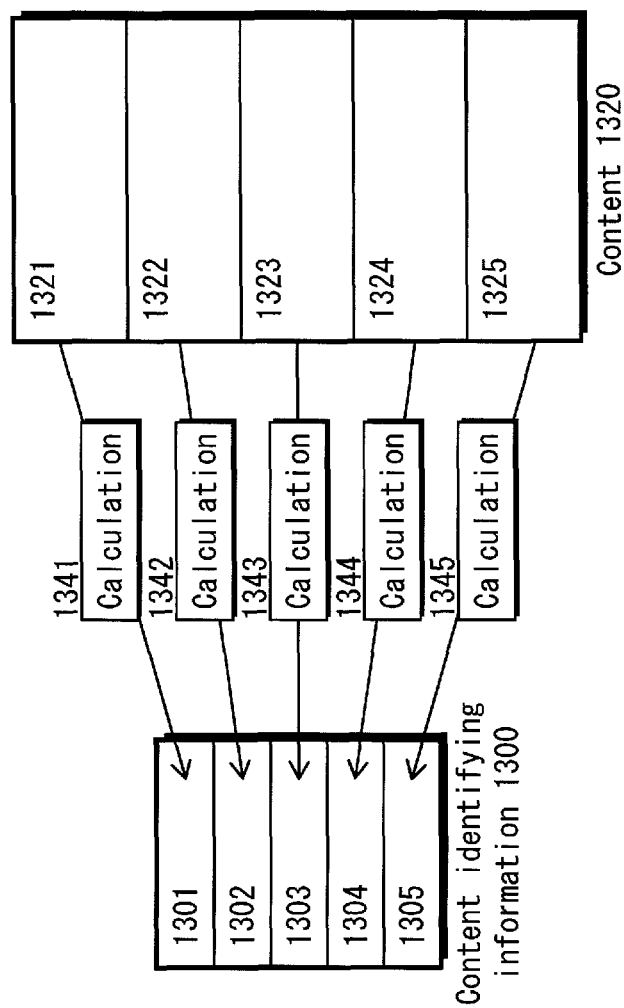
FIG. 10 shows a data structure of content identifying information 1300.

Based on the content encrypted by the encryption unit 332, the content identifying information generation unit 340 generates the content identifying information 1300 uniquely identifying the content. For example, the content identifying information 1300 is generated in the following manner:

As shown in FIG. 10, the content identifying information generation unit 340 generates content portions by dividing the content encrypted by the encryption unit 332. In the example shown in FIG. 10, the content is divided into five content portions. The content identifying information generation unit 340 performs a calculation using a one-way function for each of the content portions 1321 through 1325. Specifically, the content identifying information generation unit 340 obtains hash values 1341 through 1345 corresponding to the content portions 1321 through 1325 respectively by performing a hash calculation using a hash function. The hash values 1341 through 1345 are stored in elements 1301 through 1305 of the content identifying information 1300, respectively.

Next, the content identifying information generation unit 340 outputs the content identifying information 1300 to the title key/content identifying information transmission unit 341.

1-8. Operations for Content Distribution Process

The following describes the content distribution process performed by the content distribution device 300.

Figure 11:
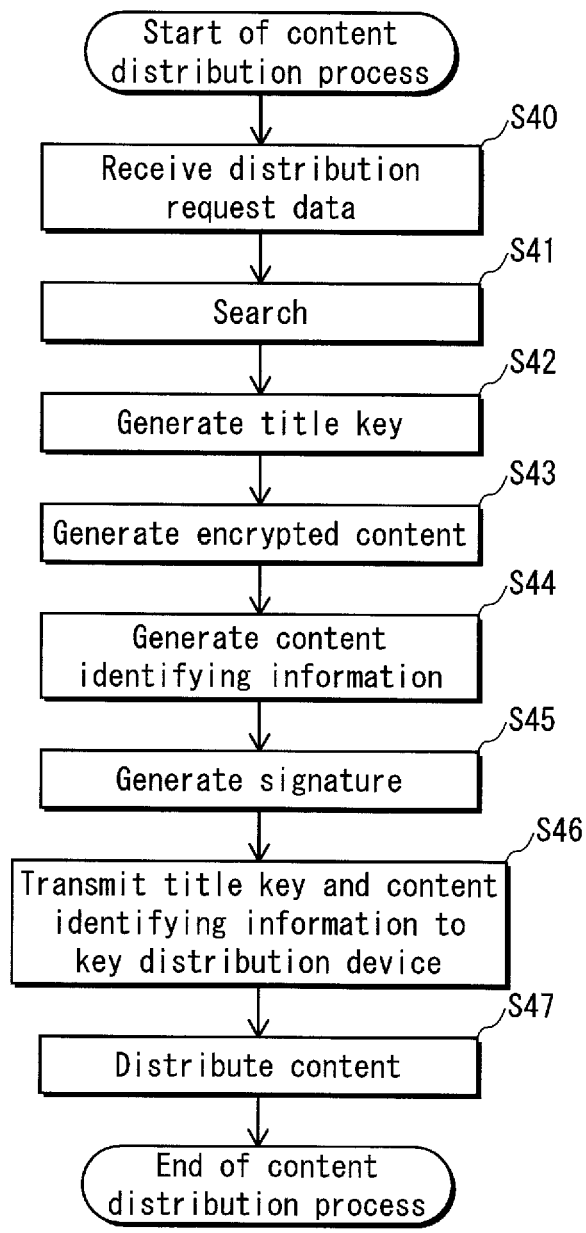
FIG. 11 is a flowchart showing a content distribution process performed by the content distribution device 300.

FIG. 11 is a flowchart showing a content distribution process performed by the content distribution device 300.

Prior to the content distribution process, the content reception unit 310 has received the unencrypted content from the content production device 100, and the unencrypted content data has been stored in the content storage unit 320.

Upon receiving the content distribution request data from the terminal device 500, the distribution request reception unit 330 instructs the content distribution unit 333 to distribute the content (Step S40).

Upon instructed to distribute the content, the content distribution unit 333 searches the content storage unit 320 for the requested content (Step S41). Specifically, the content distribution unit 333 searches for the corresponding content based on the copyright holder ID and the title of the content included in the content distribution data. When the corresponding content is stored in the content storage unit 320, the title key generation unit 331 generates the title key (Step S42).

The encryption unit 332 reads the content data of the content corresponding to the distribution request from the content storage unit 320, and encrypts the content data with the title key generated by the title key generation unit 331 to generate the content to be distributed (Step S43).

Using the encrypted content data generated by the encryption unit 332, the content identifying information generation unit 340 generates the content identifying information 1300 uniquely identifying the content (Step S44). The content identifying information generation unit 340 also generates signature for the content identifying information 1300 (Step S45).

The title key/content identifying information transmission unit 341 transmits the title key, the content identifying information 1300 and the signature to the key distribution device 400 (Step S46).

Next, the content distribution unit 333 transmits the content generated by the encryption unit 332 to the terminal device 500 which is the request source (Step S47). When the requested content is not stored in the content distribution unit 333, the content distribution unit 333 notifies the terminal device 500 that the content cannot be distributed.

1-9. Structure of Key Distribution Device 400

The key distribution device 400 performs a key distribution process for transmitting the title key used for decryption of the content to the recording medium device 600.

Figure 12:
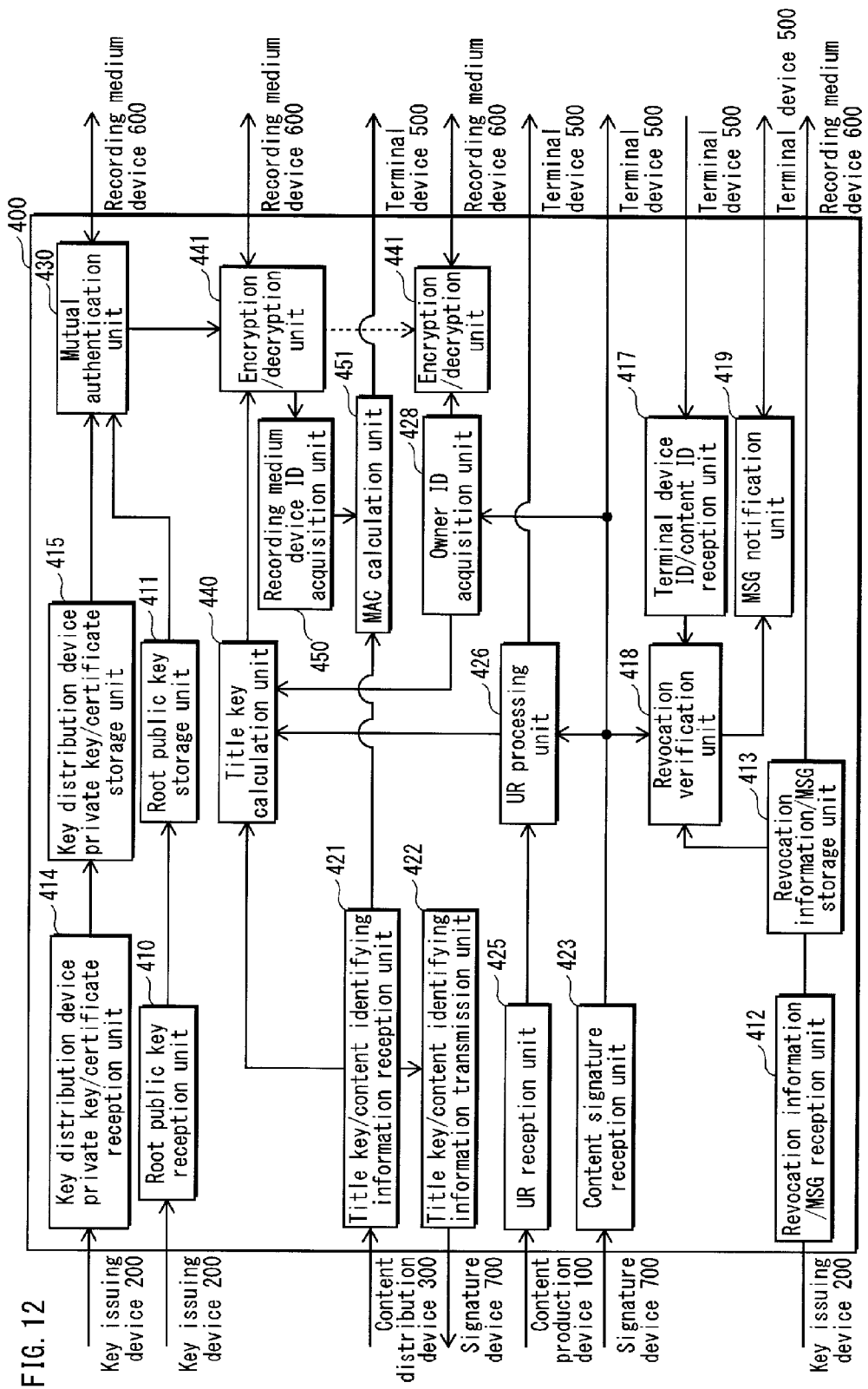
FIG. 12 is a functional block diagram of a key distribution device 400.

FIG. 12 is a block diagram showing a functional structure of the content distribution device 400.

As shown in FIG. 12, the key distribution device 400 includes a root public key reception unit 410, a root public key storage unit 411, a revocation information/MSG reception unit 412, a revocation information/MSG storage unit 413, a key distribution device private key/certificate reception unit 414, a key distribution device private key/certificate storage unit 415, a terminal device ID/content ID reception unit 417, a revocation verification unit 418, an MSG notification unit 419, a title key/content identifying information reception unit 421, a title key/content identifying information transmission unit 422, a content signature reception unit 423, an UR reception unit 425, an UR processing unit 426, an owner ID acquisition unit 428, a mutual authentication unit 430, a title key calculation unit 440, an encryption/decryption unit 441, a recording medium device ID acquisition unit 450, and a Message Authentication Code (MAC) calculation unit 451.

The key distribution device 400 is a computer system including a CPU, a memory, a secondary storage unit (e.g. a hard disk), a network connection unit, etc.

Each of the root public key storage unit 411, the key distribution device private key/certificate storage unit 415 and the revocation information/MSG storage unit 413 includes a secondary storage unit (e.g. a hard disk).

The functions of each of the revocation verification unit 418, the UR processing unit 426, the owner ID acquisition unit 428, the mutual authentication unit 430, the title key calculation unit 440, the encryption/decryption unit 441 the recording medium device ID acquisition unit 450 and the MAC calculation unit 451 are achieved by the CPU executing a computer program stored in the memory.

Each of the root public key reception unit 410, the revocation information/MSG reception unit 412, the key distribution device private key/certificate reception unit 414, the terminal device ID/content ID reception unit 417, the MSG notification unit 419, the title key/content identifying information reception unit 421, the title key/content identifying information transmission unit 422, the content signature reception unit 423 and the UR reception unit 425 includes a network connection unit.

The following describes the functional structure of each unit.

(1) Root Public Key Reception Unit 410, Revocation Information/MSG Reception Unit 412, Key Distribution Device Private Key/Certificate Reception Unit 414, Terminal Device ID/content ID Reception Unit 417, Content Signature Reception Unit 423, Title Key/Content Identifying Information Reception Unit 421 and UR Reception Unit 425

The root public key reception unit 410 receives a root public key from the key issuing device 200.

The revocation information/MSG reception unit 412 receives, from the key issuing device 200, the revocation information 1200 and a notification message for notifying the user of the terminal device when the terminal device has been revoked.

The key distribution device private key/certificate reception unit 414 receives, from the key issuing device 200, a key distribution device private key and the key distribution device certificate 1020.

The terminal device ID/content ID reception unit 417 receives, from the terminal device 500, the terminal device ID of the terminal device 500 and the content ID of the content requested by the terminal device 500.

The title key/content identifying information reception unit 421 receives, from the content distribution device 300, the title key and the content identifying information 1300 of the content requested by the terminal device 500.

The content signature reception unit 423 receives, from the signature device 700, the content signature 1400 of the content requested by the terminal device 500.

Figure 13:
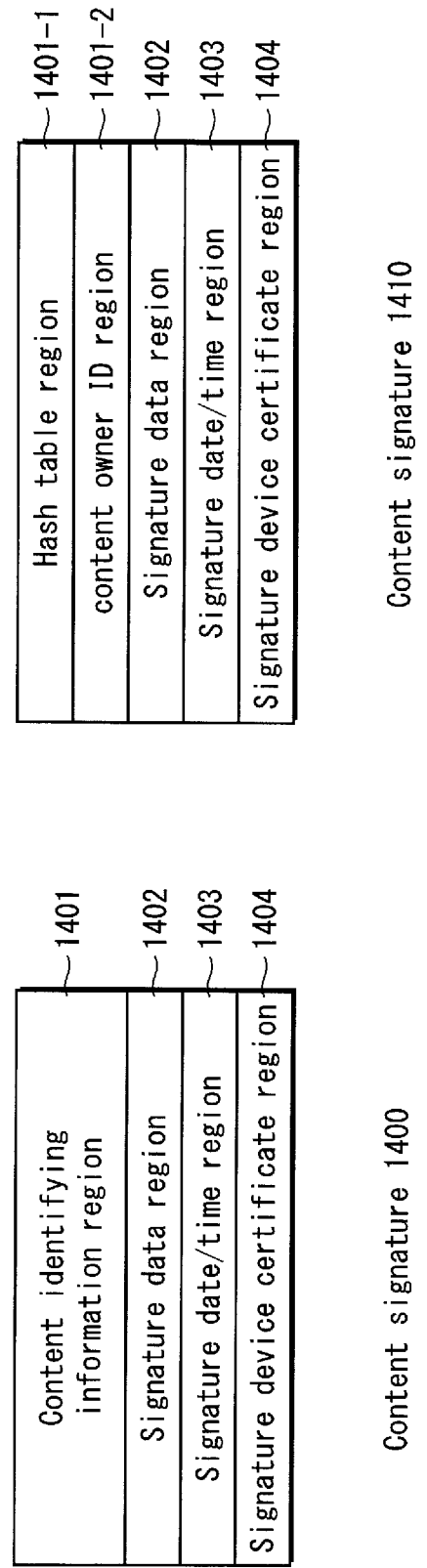
FIG. 13 shows data structures of a content signature.

FIG. 13 shows the structures of the content signature 1400 and the content signature 1410.

The content signature 1400 includes a content identifying information region 1401, a signature data region 1402, a signature date/time region 1403, and a signature device certificate region 1404.

The content identifying information region 1401 is a region for recording the content identifying information 1300, which has been transmitted by the content identifying information transmission unit 422 to the signature device 700.

The signature data region 1402 is a region for recording signature data generated by the signature device 700 for the content identifying information region 1401 by using the signature device private key. The signature date/time region 1403 is a region for recording date/time at which the signature device 700 applies the signature. The signature device certificate region 1404 is a region for recording the signature device certificate.

The content signature 1410 includes a hash table region 1401-1, an owner ID region 1401-2, a signature data region 1402, a signature date/time region 1403, and a signature device certificate region 1404. The hash table region 1401-1 and the owner ID region 1401-2 are examples of specific description written in the content identifying information region 1401 of the content signature 1400.

The hash table region 1401-1 is a region for recording the hash values of the content portions described in FIG. 10. The owner ID region 1401-2 is a region for recording an owner ID for specifying the owner of the content.

The UR reception unit 425 receives, from the content production device 100, the UR of the content requested by the terminal device 500.

(2) Root Public Key Storage Unit 411, Key Distribution Device Private Key/Certificate Storage Unit 415 and Revocation Information/MSG Storage Unit 413

The root public key storage unit 411 is provided with a region for storing the root public key issued by the key issuing device 200.

The key distribution device private key/certificate storage unit 415 is provided with a region for storing a key distribution device private key and the key distribution device certificate 1020 issued by the key issuing device 200.

The revocation information/MSG reception unit 413 is provided with a region for storing the revocation information 1200 received form the key issuing device 200 and storing a notification message for notifying the user of the terminal device when the terminal device has been revoked.

(3) Mutual Authentication Unit 430

The mutual authentication unit 430 performs mutual authentication with the terminal device 500 according to Difiee-Helman method, Elliptic Curve Difiee-Helman (EC-DH) method, or the like, and shares a common key with the terminal device 500. The Difiee-Helman method is a key exchange method based on the complexity of factorization into prime factors, and the EC-DH method is a key exchange method based on the discrete logarithm problem on an elliptic curve. Similarly, the mutual authentication unit 430 performs mutual authentication with the recording medium device 600, and shares a common key with the recording medium device 600. The details of the mutual authentication will be described later.

(4) Encryption/Decryption Unit 441

The encryption/decryption unit 441 communicates with the recording medium device 600 using the common key shared between the mutual authentication unit 430 and the recording medium device 600, and encrypts data when transmitting the data, and decrypts the data when receiving the data. Thus data on the transmission channel is protected.

The encryption/decryption unit 441 receives the recording medium device ID from the recording medium device 600. The encryption/decryption unit 441 also transmits a calculated title key calculated by the title key calculation unit 440 to the recording medium device. The encryption/decryption unit 441 also transmits the owner ID acquired by the owner ID acquisition unit 428 to the recording medium device 600. The encryption/decryption unit 600 also receives, from the recording medium device 600, the MAC of the owner ID calculated by using the private key of the recording medium device.

(5) Revocation Verification Unit 418

The revocation verification unit 418 verifies whether the signature device 700 is a valid device or not based on the content signature received from the signature device 700.

The revocation verification unit 418 also determines whether the terminal device 500 has been revoked or not based on the terminal device ID received by the terminal device ID/content ID reception unit 417 and the revocation information stored in the revocation information/MSG storage unit 413.

(6) UR Processing Unit 426

The UR processing unit 426 generates a processed UR 1440 by adding the hash value of the entire content signature, the signature date/time described in the content signature and the signature data of the content signature to the UR received by the UR reception unit 425 by using the content signature received by the content signature reception unit 423.

Figure 14:
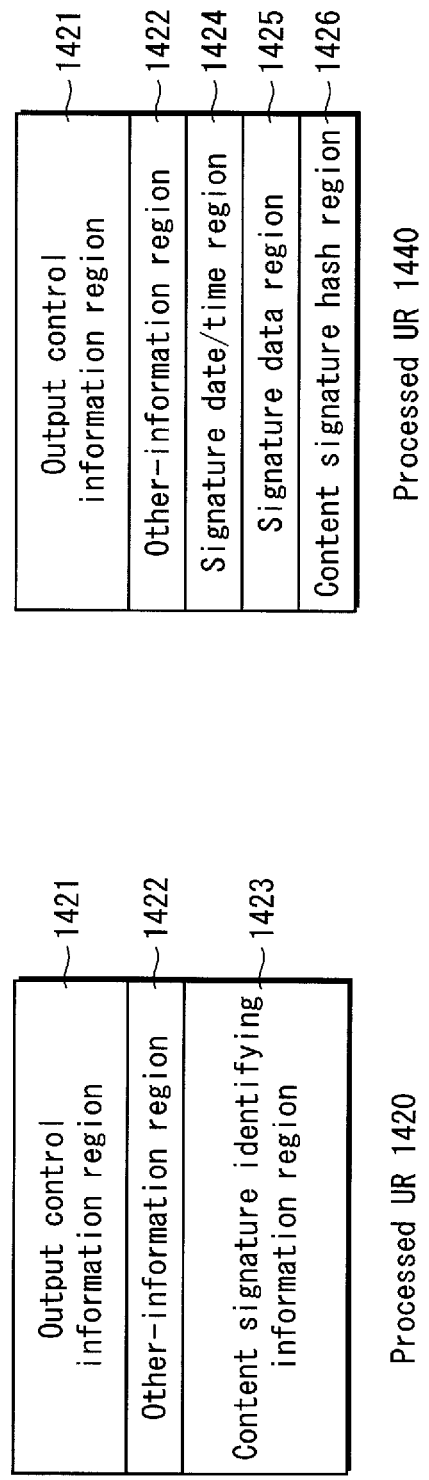
FIG. 14 shows data structures of a processed UR.

FIG. 14 shows the structures of a processed UR 1420 and a processed UR 1440.

The processed UR 1420 includes an output control information region 1421, an other-information region 1422, and a content signature identifying information region 1423.

The output control information region 1421 is the same as the output control information region 1421 shown in FIG. 7, and the other-information region 1422 is the same as the other-information region shown in FIG. 7.

The content signature identifying information region 1423 is a region for storing information relating to the content signature for specifying the content. By using the value of the content signature identifying information region 1423, the corresponding content can be uniquely specified.

The processed UR 1440 includes an output control information region 1421, an other-information region 1422, a signature date/time region 1424, a signature data region 1425, and a content signature hash value region 1426. The signature date/time region 1424, the signature data region 1425 and the content signature hash value region 1426 are examples of specific description written in the content signature identifying information region 1423.

The signature date/time region 1424 is a region for recording the same information as the signature date/time region 1403 of the content signature 1400 received by the content signature reception unit 423 from the signature device 700.

The signature date/time region 1425 is a region for recording the same information as signature data region 1402 of the content signature 1400 received by the content signature reception unit 423 from the signature device 700.

In the content signature hash value region 1426, a hash value resulting from a hash calculation on the whole content signature 1400 is recorded.

(7) Owner ID Acquisition Unit 428 and Title Key Calculation Unit 440

The owner ID acquisition unit 428 acquires the owner ID described in the owner ID region 1401-2 of the content signature 1410 received by the content signature reception unit 423. The owner ID acquisition unit 428 outputs the owner ID to the encryption/decryption unit 441. The owner ID acquisition unit 428 also acquires the MAC of the owner ID received by the encryption/decryption unit 441 from the recording medium device 600.

The title key calculation unit 440 receives the processed UR 1440 from the UR processing unit 426, the MAC of the owner ID from the owner ID acquisition unit 428, and the title key from the title key/content identifying information reception unit 421.

The title key calculation unit 440 performs hash calculation on the processed UR 1440, and generates a calculated title key by performing a reversible calculation using the hash value, the title key and the MAC of the owner ID. For example, the title key calculation unit 440 generates the calculated title key (XORed title key) by calculating the exclusive OR (XOR) of the title key and the data generated by concatenating the hash value of the content signature 1410 and the MAC of the owner ID.

The calculated title key generated by the title key calculation unit 440 is passed to the encryption/decryption unit 441. The encryption/decryption unit 441 transmits the calculated title key after encrypting it by using the common key shared with the recording medium device 600.

(8) Recording Medium Device ID Acquisition Unit 450 and MAC Calculation Unit 451

The recording medium device ID acquisition unit 450 acquires the recording medium device ID received by the encryption/decryption unit 441 from the recording medium device 600, and outputs the recording medium device ID to the MAC calculation unit 451.

The MAC calculation unit 451 calculates the MAC of the recording medium device ID by using the title key received by the title key/content identifying information reception unit 421 and the recording medium device ID input by the recording medium device ID acquisition unit 450. The MAC calculation unit 451 transmits the MAC of the recording medium device ID to the terminal device 500.

(9) MSG Notification Unit 419 and Content Identifying Information Transmission Unit 422

The MSG notification unit 419 transmits, to the terminal device 500, a notification message stored in the revocation information/MSG storage unit 413 when the revocation verification unit 418 determines that the terminal device 500 has been revoked, based on the terminal device ID received by the terminal device ID/content ID reception unit 417. The MSG notification unit also receives, from the terminal device 500, information showing whether to continue the process. The terminal device 500 transmits this information to the MSG notification unit in response to the notification information.

The content identifying information transmission unit 422 transmits, to the signature device 700, the content identifying information 1300 received by the title key/content identifying information reception unit 421.

1-10. Mutual Authentication Process

The following describes the details of the mutual authentication process performed by the mutual authentication 430.

Figure 15:
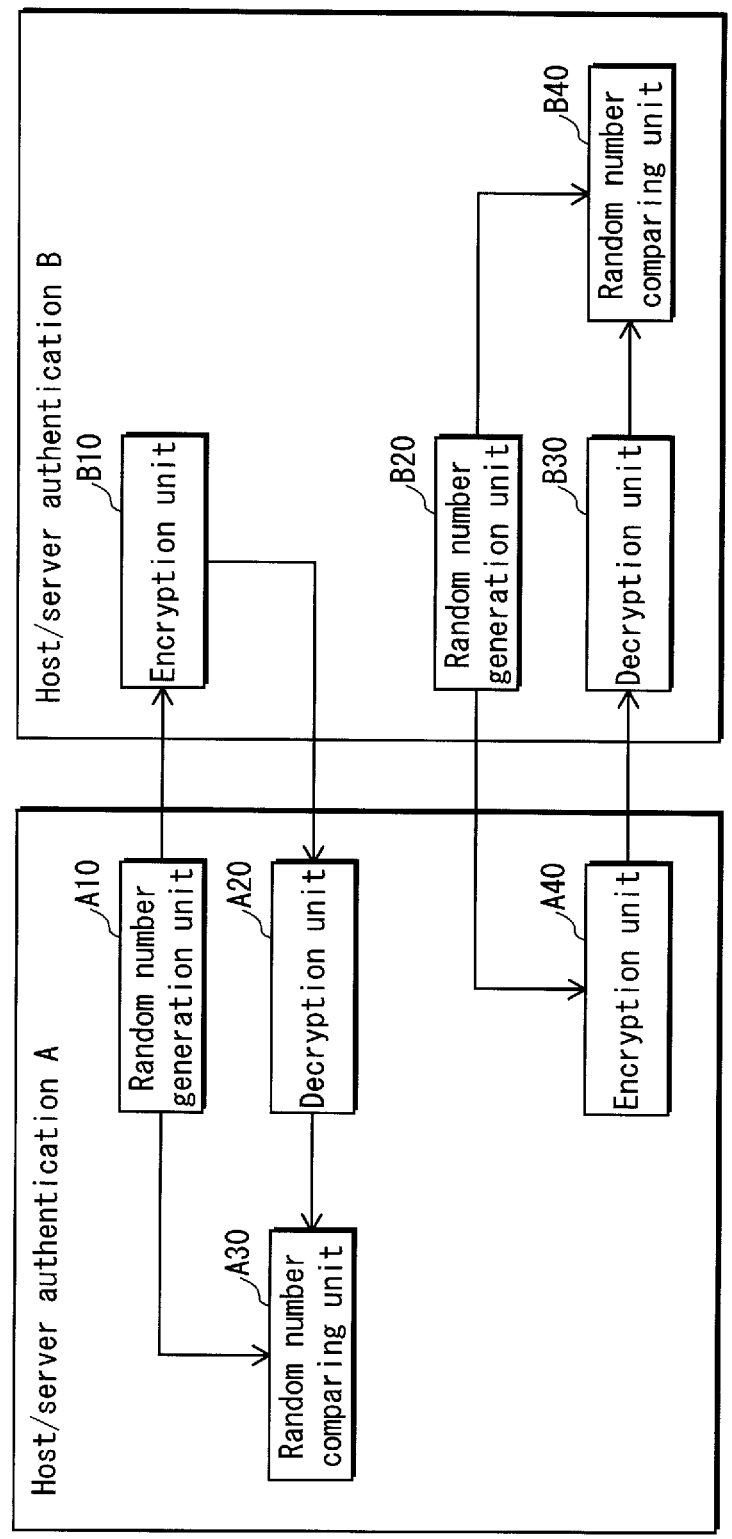
FIG. 15 is a block diagram for illustrating an example procedure for mutual authentication pertaining to an embodiment.

FIG. 15 is a block diagram for illustrating an example procedure for mutual authentication between host/server authentication A and host/server authentication B.

The host/server authentication A corresponds to the key distribution device 400, for example, and the host/server authentication B corresponds to the terminal device 500 or the recording medium device 600.

The mutual authentication unit of the host/server authentication A includes a random number generation unit A10, a decryption unit A20, a random number comparing unit A30 and an encryption unit A40. The mutual authentication unit of the host/server authentication B includes an encryption unit B10, a random number generation unit B20, a decryption unit B30 and a random number comparing unit B40.

Figure 16:
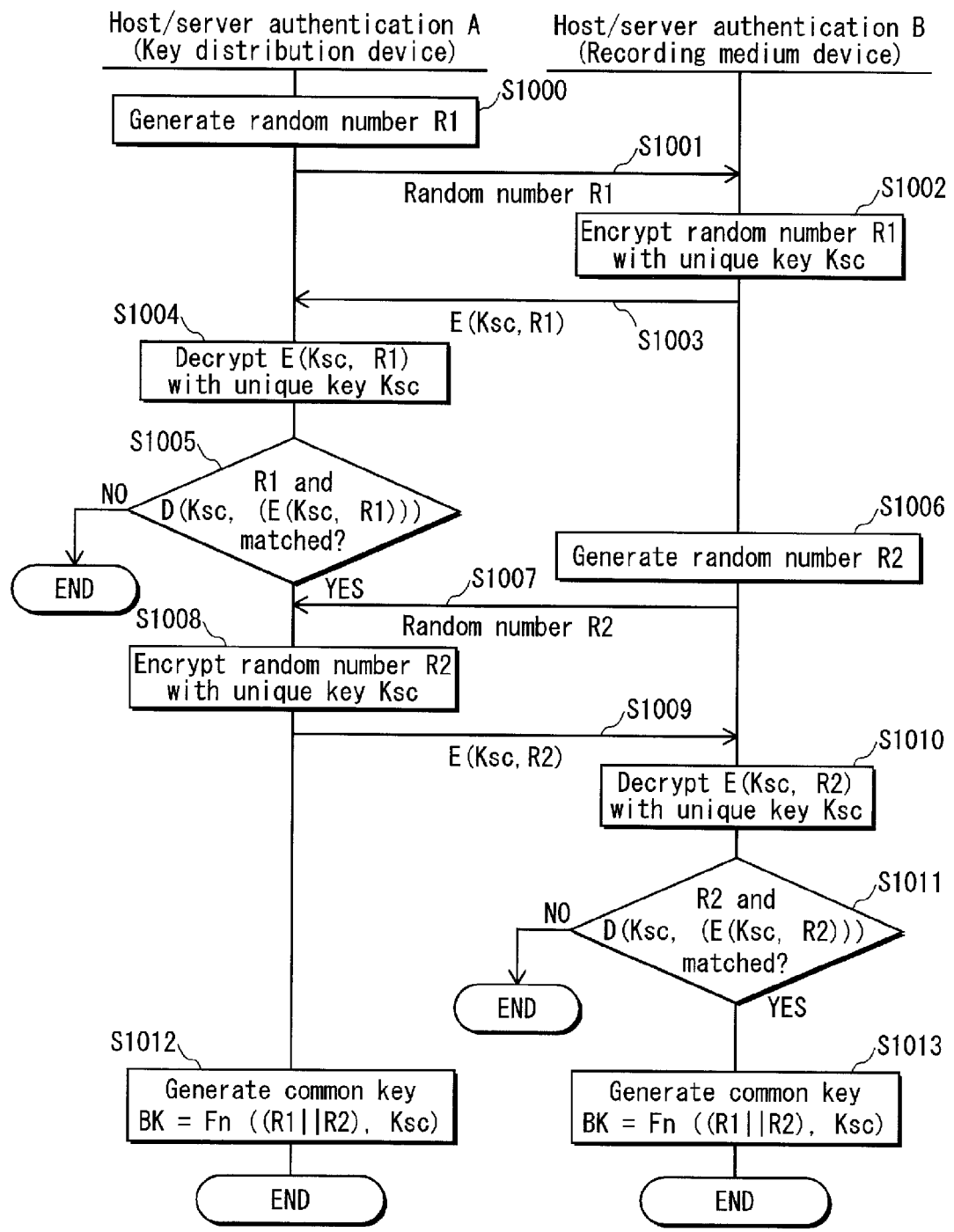
FIG. 16 is a sequence diagram for illustrating an example procedure for mutual authentication pertaining to an embodiment.

FIG. 16 is a sequence diagram of a procedure for mutual authentication performed between the host/server authentication A and the host/server authentication B.

<Authentication of Host/Server Authentication B performed by Host/Server Authentication A>

First, the random number generation unit A10 of the host/server authentication A generates a random number R1 (Step S1000), and transmits the random number R1 to the host/server authentication B (Step S1001).

The encryption unit B10 of the host/server authentication B receives the random number R1 from the host/server authentication A, and encrypts the random number R1 with a unique key Ksc (i.e. E(Ksc,R1)) (Step S1002). The encryption unit B10 transmits the encrypted random number R1 (i.e. E(Ksc,R1)) to the host/server authentication A (Step S1003).

The decryption unit A20 of the host/server authentication A decrypts the encrypted random number E(Ksc,R1) received from the host/server authentication B by using the unique key Ksc (i.e. D(Ksc,(E(Ksc,R1))))(=R1) (Step S1004).

The random number comparing unit A30 of the host/server authentication A checks whether the result of the decryption (i.e. D(Ksc,(E(Ksc,R1)))) matches the random number R1 generated by the random number generation unit A10 (Step S1005). If they do not match (Step S1005: NO), the host/server authentication A determines that the authentication has failed, and terminates the process without establishing a communication channel. If they match (Step S1005: YES), the host/server authentication A determines that the host/server authentication B is a valid module.

<Authentication of Host/Server Authentication A Performed by Host/Server Authentication B>

Next, the random number generation unit B20 of the host/server authentication B generates a random number R2 (Step S1006), and transmits the random number R2 to the host/server authentication A (Step S1007).

The encryption unit A40 of the host/server authentication A receives the random number R2 from the host/server authentication B, and encrypts the random number R2 with a unique key Ksc (i.e. E(Ksc,R2)) (Step S1008). Then, the encryption unit A40 transmits the encrypted random number R2(E(Ksc,R2)) to the host/server authentication B (StepS1009).

The decryption unit B30 of the host/server authentication B decrypts E(Ksc,R2) from the host/server authentication A with the unique key Ksc (i.e. D(Ksc,(E(Ksc,R2))))(=R2) (Step S1010).

The random number comparing unit B40 of the host/server authentication B checks whether the result of the decryption (i.e. D(Ksc,(E(Ksc,R2)))) matches the random number R2 generated by the random number generation unit B20 (Step S1011). If they do not match (Step S1011: NO), the random number comparing unit B40 determines the authentication has failed, and terminates the process without establishing a communication channel. If they match (Step S1011: YES), the host/server authentication B determines that the host/server authentication A is a valid module.

In Step S1005 and Step S1011, when it is determined that the counterpart is a valid module, the host/server authentication A and the host/server authentication B determines, as a common key, a value obtained by performing one-way function on R1||R2 by using Ksc (Step S1012, Step S1013). Here, the sign "||" means concatenation of data.

Although not described in detail here, not only a common key but a certificate is exchanged in the mutual authentication between the key distribution device 400 and the terminal device 500 and between the key distribution device 400 and the recording medium device 600. For the details of the procedure for the exchange, refer to "4.3 Drive Authentication Algorithm for AACS (AACS-Auto)" in Non-Patent Literature 2 (in particular, Steps 7 and 13 of the authentication procedure). The procedure for the mutual authentication described above is merely an example, and another mutual authentication method may be adopted.

1-11. Operations for Key Distribution Process

Figure 17:
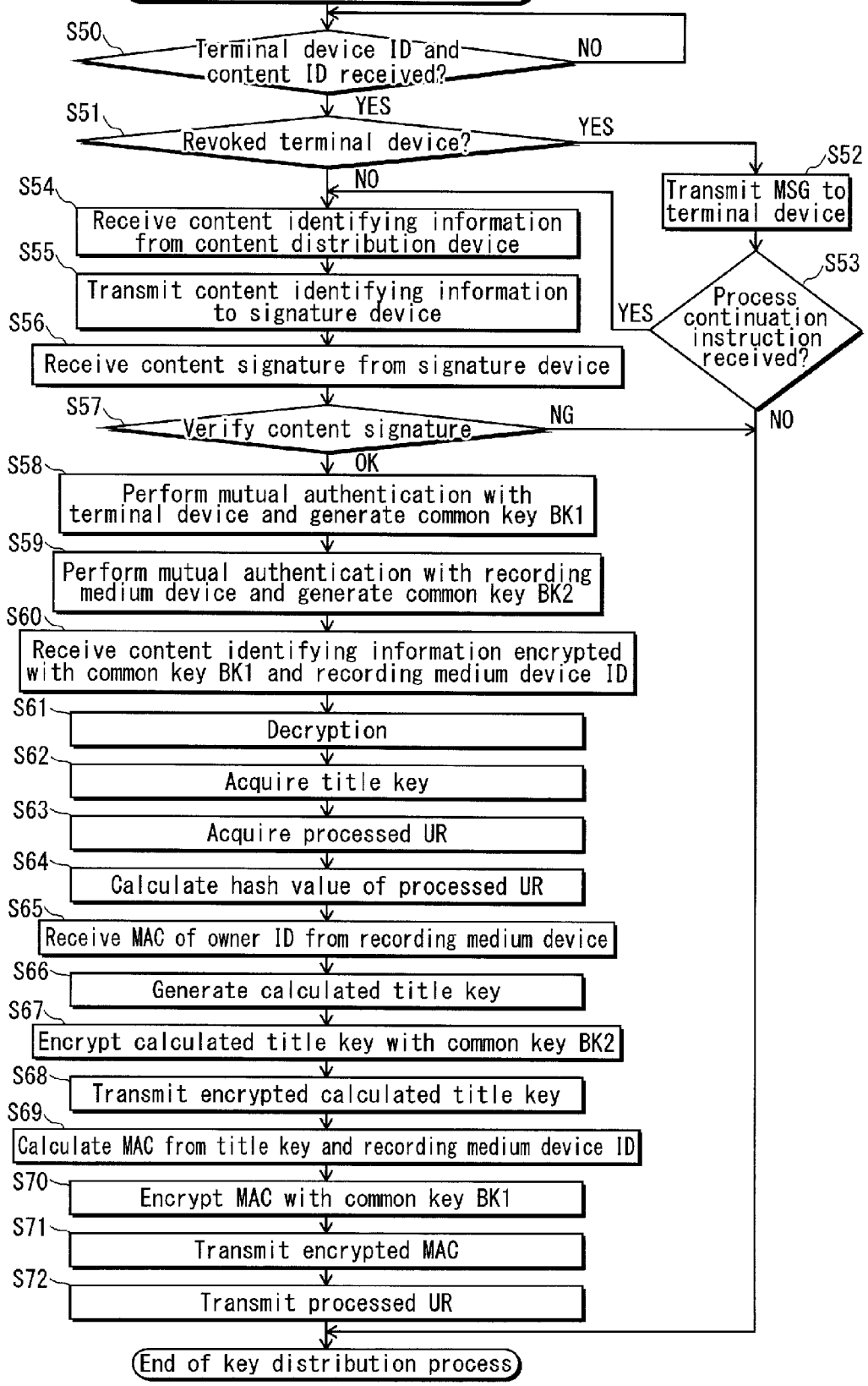
FIG. 17 is a flowchart showing a key distribution process performed by a key distribution device 400.

FIG. 17 is a flowchart showing a key distribution process performed by the key distribution device 400.

Prior to the key distribution process, the distribution device 400 has received and stored a root public key from the key issuing device 200. The key distribution device 400 has received and stored a key distribution device private key and a key distribution device certificate from the key issuing device 200. The key distribution device 400 has received and stored a title key, an UR and the content identifying information 1300 from the content production device 100.

The following process is performed when the key distribution device 400 receives from the terminal device 500 a request for transmitting a title key.

First, it is determined whether the terminal device ID/content ID reception unit 417 has received a terminal device ID and a content ID from the terminal device 500 (Step S50). If the terminal device ID and the content ID have not been received (Step S50: NO), the terminal device ID/content ID reception unit 417 waits until receiving them.

When the terminal device ID and the content ID are received (Step S50: YES), the revocation verification unit 418 determines whether the terminal device ID has been revoked or not (Step S51). Specifically, the revocation verification unit 418 determines whether the terminal device ID is contained in the list of the revoked device included in the revocation information. If the terminal device ID is contained in the list, the revocation verification unit 418 determines that the terminal device is a revoked device (Step S51: YES).

In the case of "YES" in Step S51, the MSG notification unit 419 reads, from the revocation information/MSG storage unit 413, a notification message for having the user of the terminal device 500 determine whether to continue the process, and transmits the message to the terminal device 500 (Step S52). When the MSG notification unit 419 receives an instruction to continue the process in response to the MSG (Step S53: YES), the process is continued from Step S54. When the MSG notification unit 419 does not receive an instruction to continue the process, or when a predetermined time period (e.g. 30 seconds) has elapsed from the MSG transmission without a response, the process terminates.

In the case of "NO" in Step S51 or "YES" in Step S53, the title key/content identifying information reception unit 421 receives, from the content distribution device 300, the content identifying information 1300 of the content corresponding to the content ID (Step S54).

Next, the content identifying information transmission unit 422 transmits the content identifying information 1300 to the signature device 700 (Step S55). The content signature reception unit 423 receives the content signature 1410 applied to the content identifying information 1300 (Step S56). The revocation verification unit 418 verifies whether the signature device 700 is a valid device or not based on the content signature received from the signature device 700. Specifically, the revocation verification unit 418 verifies the content identifying information 1300 and the content signature 1410 with the signature device public key contained in the signature device certificate 1050 by a signature verification algorithm used in digital signature authentication. Furthermore, the revocation verification unit 418 determines whether the signature device ID specified by the signature device certificate included in the content signature 1410 is contained in the list of the revoked device included in the revocation information (Step S51). If the signature device ID is contained in the list, the revocation verification unit 418 determines that the signature device 700 is a revoked device. When the signature verification fails or when the signature device 700 is determined as a revoked device (Step S57: NG), the key distribution process terminates.

In the case of "OK" in Step S57, the mutual authentication unit 430 performs mutual authentication with the terminal device 500, and generates a common key BK1 (Step S58). From this point forward, data exchanged between the key distribution device 400 and the terminal device 500 is encrypted with the common key BK1.

Next, the mutual authentication unit 430 performs mutual authentication with the recording medium device 600 connected to the terminal device 500, and generates a common key BK2, which is different from the common key BK1 (Step S59). From this point forward, data exchanged between the key distribution device 400 and the recording medium device 600 is encrypted with the common key BK2.

The encryption/decryption unit 441 receives, from the terminal device 500, the recording medium device ID encrypted with the common key BK1 (Step S60). The encryption/decryption unit 441 decrypts the encrypted recording medium device ID by using the common key BK1, and outputs the recording medium device ID to the recording medium device ID acquisition unit 450 (Step S61).

Next, the title key/content identifying information reception unit 421 receives the title key from the content distribution device 300 (Step S62). The UR reception unit 425 receives the UR from the content production device 100 (Step S63).

The UR processing unit 426 calculates the hash value of the entire content signature received by the content signature reception unit 423, and generates a processed UR 1440 by adding the hash value, the signature date/time described in the content signature, and the signature data of the content signature to the UR received by the UR reception unit 425.

Furthermore, the UR processing unit 426 calculates the hash value of the processed UR, and outputs the hash value of the processed UR to the title key calculation unit 440 (Step S64).

Next, the owner ID acquisition unit 428 acquires the owner ID from the owner ID region 1401-2 of the content signature received by the content signature reception unit 423, and outputs the owner ID to the encryption/decryption unit 441. The encryption/decryption unit 441 encrypts the owner ID with the common key BK2 and transmits it to the recording medium device 600, and in response, receives the MAC of the owner ID calculated by the recording medium device 600 using the private key of the recording medium device 600. The MAC of the owner ID has been encrypted with the common key BK2. The encryption/decryption unit 441 decrypts the encrypted MAC of the owner ID by using the common key BK2, and outputs the MAC to the owner ID acquisition unit 428 (Step S65).

The title key calculation unit 440 receives the title key from the title key/content identifying information reception unit 421, the hash value of the processed UR 1420 from the UR processing unit 426, and the MAC of the owner ID from the owner ID acquisition unit 428. The title key calculation unit 440 generates a calculated title key (XORed title key) by calculating the exclusive OR (XOR) of the title key and the data generated by concatenating the MAC of the owner ID and the hash value of the processed UR 1420 (Step S66).

The encryption/decryption unit 441 encrypts the calculated title key with the common key BK2 (Step S67), and transmits the calculated title key to the recording medium device 600 (Step S68).

Next, the MAC calculation unit 451 calculates the MAC of the recording medium device ID by using the title key received by the title key/content identifying information reception unit 421 and the recording medium device ID acquired by the recording medium device ID acquisition unit 450 (Step S69).

The MAC calculation unit 451 encrypts the MAC of the recording medium device ID with the common key BK1 (Step S70), and transmits the MAC to the terminal device 500 (Step S71).

The UR processing unit 426 transmits the processed UR 1420 to the terminal device 500 (Step S72).

1-12. Structure of Terminal Device 500

The terminal device 500 receives a content from the content distribution device 300 via a network such as the Internet and digital broadcasting, and a title key from the key distribution device 400. The terminal device 500 performs the content recording process for recording the received content and title key onto the recording medium device 600.

The terminal device 500 performs the content recording process for recording the received content and title key onto the recording medium device 600.

Figure 18:
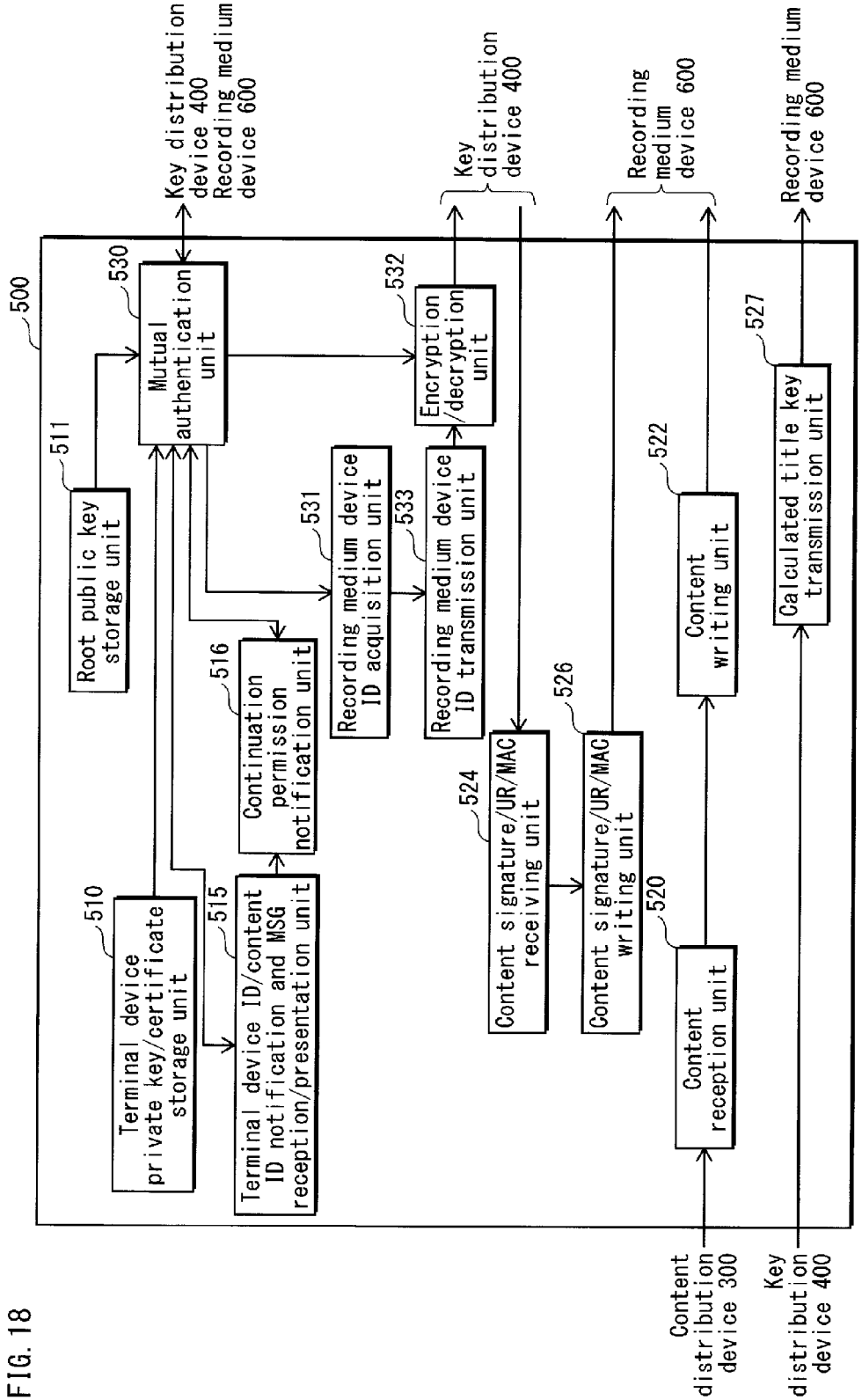
FIG. 18 is a block diagram showing a functional configuration of primary components of a terminal device 500 during a receiving and a writing process.
Figure 19:
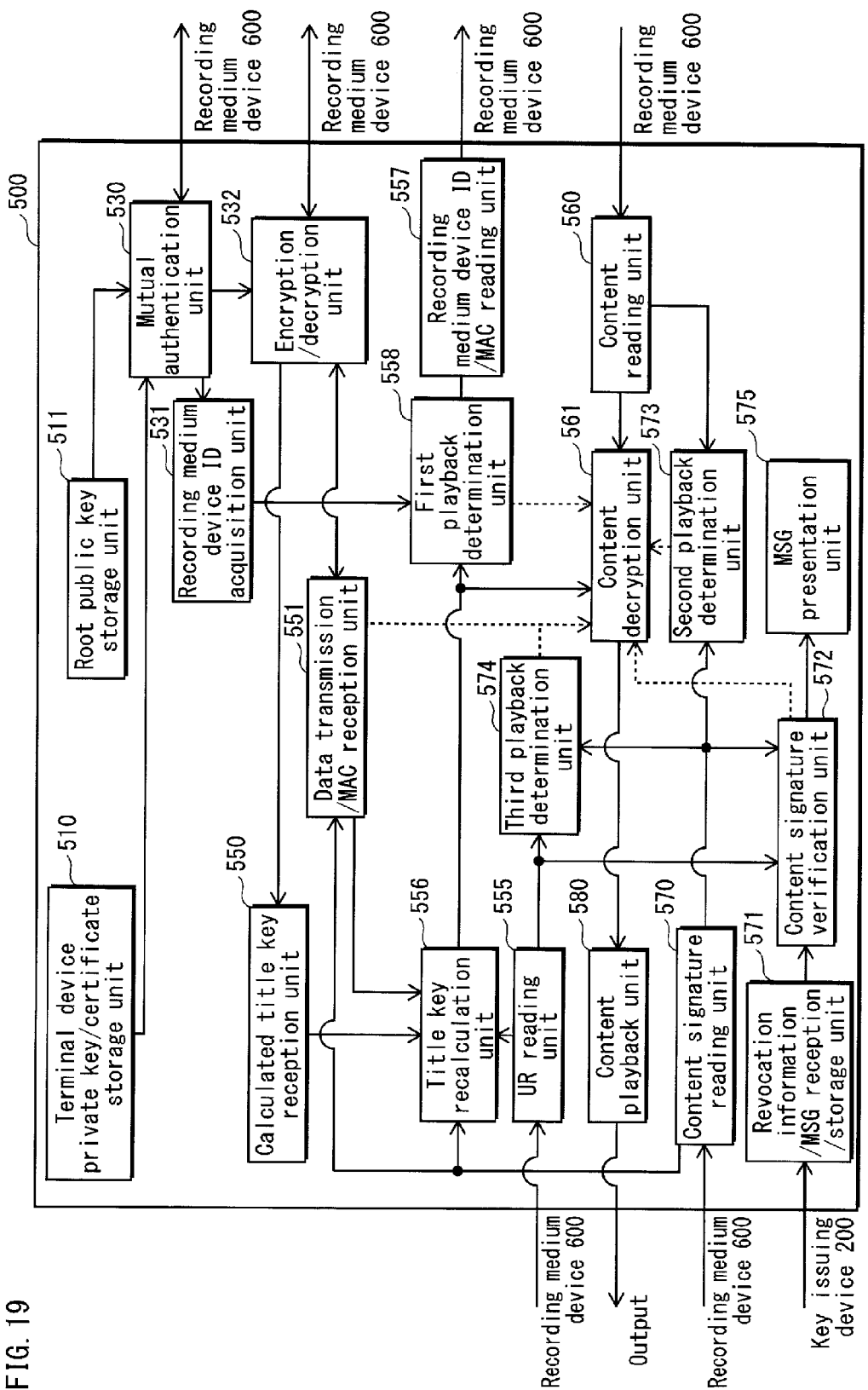
FIG. 19 is a block diagram showing a functional configuration of primary components of the terminal device 500 during a playback process.

FIG. 18 is a block diagram showing a functional configuration of the primary components of the terminal device 500 during the receiving and the writing process, and FIG. 19 is a block diagram showing a functional configuration of the primary components of the terminal device 500 during the playback process.

With reference to FIG. 18, the following describes the configuration relating to the receiving and the writing process by which the terminal device 500 receives a content and data such as a key necessary for protection and playback of the content, in cooperation with the content distribution device 300 and the key distribution device 400, and writes the content and the data into the recording medium device 600.

The following also describes, with reference to FIG. 19, the configuration relating to the playback process by which, under the condition where the content and the data such as the key have been written in the recording medium device 600, the terminal device 500 reads the content and the data such as the key from the recording medium device 600 and plays back the content. Note that the components used in both the receiving and the writing process and the playback process are given the same names and the same reference numbers in FIG. 18 and FIG. 19.

As shown in FIG. 18 and FIG. 19, the terminal device 500 includes a terminal device private key/certificate storage unit 510, a terminal device ID/content ID notification and MSG reception/presentation unit 515, a continuation permission notification unit 516, a content reception unit 520, a content writing unit 522, a content signature/UR/MAC receiving unit 524, a content signature/UR/MAC writing unit 526, a calculated title key transmission unit 527, a root public key storage unit 511, a mutual authentication unit 530, a recording medium device ID acquisition unit 531, an encryption/decryption unit 532, a calculated title key reception unit 550, a data transmission/MAC reception unit 551, a UR reading unit 555, a title key recalculation unit 556, a recording medium device ID/MAC reading unit 557, a first playback determination unit 558, a content reading unit 560, a content decryption unit 561, a content signature reading unit 570, a revocation information/MSG reception/storage unit 571, a content signature verification unit 572, a second playback determination unit 573, a third playback determination unit 574, a MSG presentation unit 575 and a content playback unit 580.

The terminal device 500 includes a CPU, a memory, and a network connection unit. The functions of each of the mutual authentication unit 530, the recording medium device ID acquisition unit 531, the encryption/decryption unit 532, the recording medium device ID transmission unit 533, the title key recalculation unit 556, the first playback determination unit 558, the content decryption unit 561, the content signature verification unit 572, the second playback determination unit 573, the third playback determination unit 574, the MSG presentation unit 575 and the content playback unit 580 are achieved by the CPU executing a computer program stored in the memory.

Data exchange among the terminal device ID/content ID notification and MSG reception/presentation unit 515, the continuation permission notification unit 516, the content reception unit 520, the content signature/UR/MAC receiving unit 524 and the revocation information/MSG reception/storage unit 571 is performed by using the network communication unit described above.

The following describes the functional structure of each unit.

(1) Terminal Device Private Key/Certificate Storage Unit 510, Root Public Key Storage Unit 511 and Revocation Information/MSG Reception/Storage Unit 571

The terminal device private key/certificate storage unit 510 is provided with a region for storing the terminal device private key generated by the key issuing device 200 and the terminal device certificate 1030.

The root public key storage unit 511 is provided with a region for storing the root public key issued by the key issuing device 200.

The revocation information/MSG reception/storage unit 571 is provided with a region for storing the revocation information 1200 received from the key issuing device 200. The revocation information/MSG reception/storage unit 571 is also provided with a region for storing a notification message for notifying the user of the terminal device when the terminal device has been revoked.

(2) Terminal Device ID/Content ID Notification and MSG Reception/Presentation Unit 515 and Continuation Permission Notification Unit 516

The terminal device ID/content ID notification and MSG reception/presentation unit 515 notifies the key distribution device 400 of the terminal device ID as identifying information for identifying the terminal device, and the content ID of the content stored in the recording medium device connected to the terminal device. The terminal device ID/content ID notification and MSG reception/presentation unit 515 also receives a MSG to be transmitted when the key distribution device 400 determines the terminal device 500 as an revoked device, and outputs the MSG to a display device (such as a monitor display), which is not depicted in the drawings.

When the user inputs an instruction to not continue the recording of the content according to the message displayed on the display device, the continuation permission notification unit 516 notifies the key distribution device 400 of that the recording is not to be continued. When the user inputs an instruction to continue the recording of the content, the continuation permission notification unit 516 notifies the key distribution device 400 of that the recording is to be continued.

(3) Content Reception Unit 520 and Content Writing Unit 522

The content reception unit 520 receives a content from the content distribution device 300.

The content writing unit 522 writes the content received by the content reception unit 520 into the recording medium device 600 connected to the terminal device 500.

(4) Content Signature/UR/MAC Receiving Unit 524, Content Signature/UR/MAC Writing Unit 526 and Calculated Title Key Transmission Unit 527

The content signature/UR/MAC receiving unit 524 receives, from the key distribution device 400, the content signature 1410, the processed UR 1440, and the MAC of the recording medium device ID.

The content signature/UR/MAC writing unit 526 writes the content signature 1410, the processed UR 1440, and the MAC of the recording medium device ID received by the content signature/UR/MAC receiving unit 524 to the recording medium device 600 connected to the terminal device 500.

The calculated title key transmission unit 527 transmits communication data between the key distribution device 400 and the recording medium device 600. The communication data specifically is the encrypted calculated title key encrypted with the common key BK3 shared between the key distribution device 400 and the recording medium device 600 by performing mutual authentication.

(5) Mutual Authentication unit 530 and Encryption/Decryption Unit 532

The mutual authentication unit 530 performs mutual authentication with the key distribution device 400 to verify the validity of the key distribution device 400, and shares the common key BK1 with the key distribution device 400. Similarly, the mutual authentication unit 530 performs mutual authentication with the recording medium device 600 to verify the validity of the recording medium device 600, and shares the common key BK3 with the recording medium device 600. Since the mutual authentication process has already been described with reference to FIG. 15 and FIG. 16, the description thereof will be omitted here.

Using the common key BK1 shared with the key distribution device 400, the encryption/decryption unit 532 encrypts or decrypts data to be transmitted to or received from the key distribution device 400. Similarly, using the common key BK3 shared with the recording medium device 600, the encryption/decryption unit 532 encrypts or decrypts data to be transmitted to or received from the recording medium device 600.

(6) UR Reading Unit 555

The UR reading unit 555 reads, from the recording medium device 600 storing contents, the processed UR 1440 of the content to be played, and outputs the content to the title key recalculation unit 556 and the third playback determination unit 574.

(7) Recording Medium Device ID Acquisition Unit 531, Recording Medium Device ID Transmission Unit 533, Calculated Title Key Reception Unit 550, Data Transmission/MAC Reception Unit 551, Recording Medium Device ID/MAC Reading Unit 557, and Content Signature Reading Unit 570

The recording medium device ID acquisition unit 531 acquires the recording medium device ID from the recording medium device certificate 1040 received during the mutual authentication by the mutual authentication unit 530 performed in the content recording process, and outputs the recording medium device ID to the recording medium device ID transmission unit 533.

The recording medium device ID acquisition unit 531 also acquires the recording medium device ID from the recording medium device certificate 1040 received during the mutual authentication by the mutual authentication unit 530 performed in the content recording process, and outputs the recording medium device ID to the first playback determination unit 558.

The recording medium device ID transmission unit 533 receives the recording medium device ID from the recording medium device ID acquisition unit 531, and transmits the recording medium device ID to the key distribution device 400 via the encryption/decryption unit 532.

The calculated title key reception unit 550 receives the calculated title key from the recording medium device 600 via the encryption/decryption unit 532. The calculated title key has been generated from the title key used for the encryption of the content to be played back in the content playback process.

The data transmission/MAC reception unit 551 extracts the owner ID from the owner ID region 1401-2 in the content signature 1410 read by the content signature reading unit 570, and transmits the owner ID to the recording medium device 600 via the encryption/decryption unit 532.

Then, the data transmission/MAC reception unit 551 receives the MAC of the owner ID after decryption by the encryption/decryption unit 532. The MAC of the owner ID has been obtained by the recording medium device 600 performing calculation on the owner ID using the private key of the recording medium device 600. The data transmission/ MAC reception unit 551 outputs the MAC of the owner ID to the title key recalculation unit 556.

The recording medium device ID/MAC reading unit 557 reads the MAC of the recording medium device ID stored in the recording medium device 600 in association with the content to be played back, and outputs the MAC to the first playback determination unit 558.

The content signature reading unit 570 reads the content signature 1410 from the recording medium device 600, and outputs the content signature 1410 to the second playback determination unit 573 and the content signature verification unit 572.

(8) Title Key Recalculation Unit 556

The title key recalculation unit 556 calculates the hash value of the processed UR 1420 read by the UR reading unit 555. Next, the title key recalculation unit 556 calculates the hash value of the data generated by concatenating the hash value of the processed UR 1420 and the MAC of the owner ID received by the data transmission/MAC reception unit 551. Then, the title key recalculation unit 556 obtains the original title key by calculating exclusive OR (XOR) of the hash value and the calculated title key received by the calculated title key reception unit 550.

(9) Content Signature Verification Unit 572

The content signature verification unit 572 refers to the revocation information 1200, and determines whether the signature device 700, which has generated the content signature received from the content signature reading unit 570, is a revoked device or not. When the signature device 700 is a revoked device, the content signature verification unit 572 instructs the content decryption unit 561 to not decrypt the content.

The content signature verification unit 572 also determines whether the signature data written in the signature data region 1425 of the processed UR 1440 received from the UR reading unit 555 matches the signature data written in the signature data region 1402 of the content signature 1410. When the pieces of signature data do not match, the content signature verification unit 572 instructs the content decryption unit 561 to not decrypt the content.

(10) First Playback Determination Unit 558, Second Playback Determination Unit 573, and Third Playback Determination Unit 574

The first playback determination unit 558 receives the title key from the title key recalculation unit 556, the recording medium device ID from the recording medium device ID acquisition unit 531, and the MAC of the recording medium device ID from the recording medium device ID/MAC reading unit 557. The first playback determination unit 558 calculates the MAC of the recording medium device ID by using the title key. Then, the first playback determination unit 558 determines whether the MAC obtained by the calculation matches the MAC of the recording medium device ID read by the recording medium device ID/MAC reading unit 557 from the recording medium device 600. When the MACs do not match, the first playback determination unit 558 instructs the content decryption unit 561 to not decrypt the content.

The second playback determination unit 573 receives the content signature 1410 from the content signature reading unit 570, and the content from the content reading unit 560. The second playback determination unit 573 verifies the validity of the content by using the content signature 1410. When determining that the content is invalid, the second playback determination unit 573 instructs the content decryption unit 561 to not decrypt the content.

The third playback determination unit 574 receives the processed UR 1440 from the UR reading unit 555, and the content signature 1410 from the content signature verification unit 572. The third playback determination unit 574 calculates the hash value of the entire content signature, and determines whether the hash value obtained by the calculation matches the hash value described in the content signature hash value region 1426 of the processed UR 1440. When the hash values do not match, the third playback determination unit 574 instructs the content decryption unit 561 to not decrypt the content.

(11) Content Reading Unit 560, Content Decryption Unit 561, Content Playback Unit 580 and MSG Presentation Unit 575

The content reading unit 560 reads the content to be played back from the recording medium device 600. The content reading unit 560 outputs the content to the content decryption unit 561 and the second playback determination unit 573.

The content decryption unit 561 receives the original title key restored by the title key recalculation unit 556 from the title key recalculation unit 556, and the content from the content reading unit 560. The content decryption unit 561 decrypts the content by applying a decryption algorithm D to the content by using the title key as the decryption key. The decryption algorithm D is an algorithm for decrypting data encrypted by an encryption algorithm E. The content decryption unit 561 outputs the content obtained by the decryption to the content playback unit 580.

The content decryption unit 561 does not decrypt the content when receiving an instruction to not decrypt the content from any of the first playback determination unit 558, the content signature verification unit 572, the second playback determination unit 573, or the third playback determination unit 574.

The content playback unit 580 receives the content from the content decryption unit 561 and decodes the content. The content playback unit 580 outputs the decoded content to a display device (such as a monitor display), which is not depicted in the drawings.

The MSG presentation unit 575 receives an MSG for notifying the user of the failure of the verification by the content signature verification unit 572, and outputs the MSG to the display device, which is not depicted in the drawings.

1-13. Operations for Content Recording Process

Figure 20:
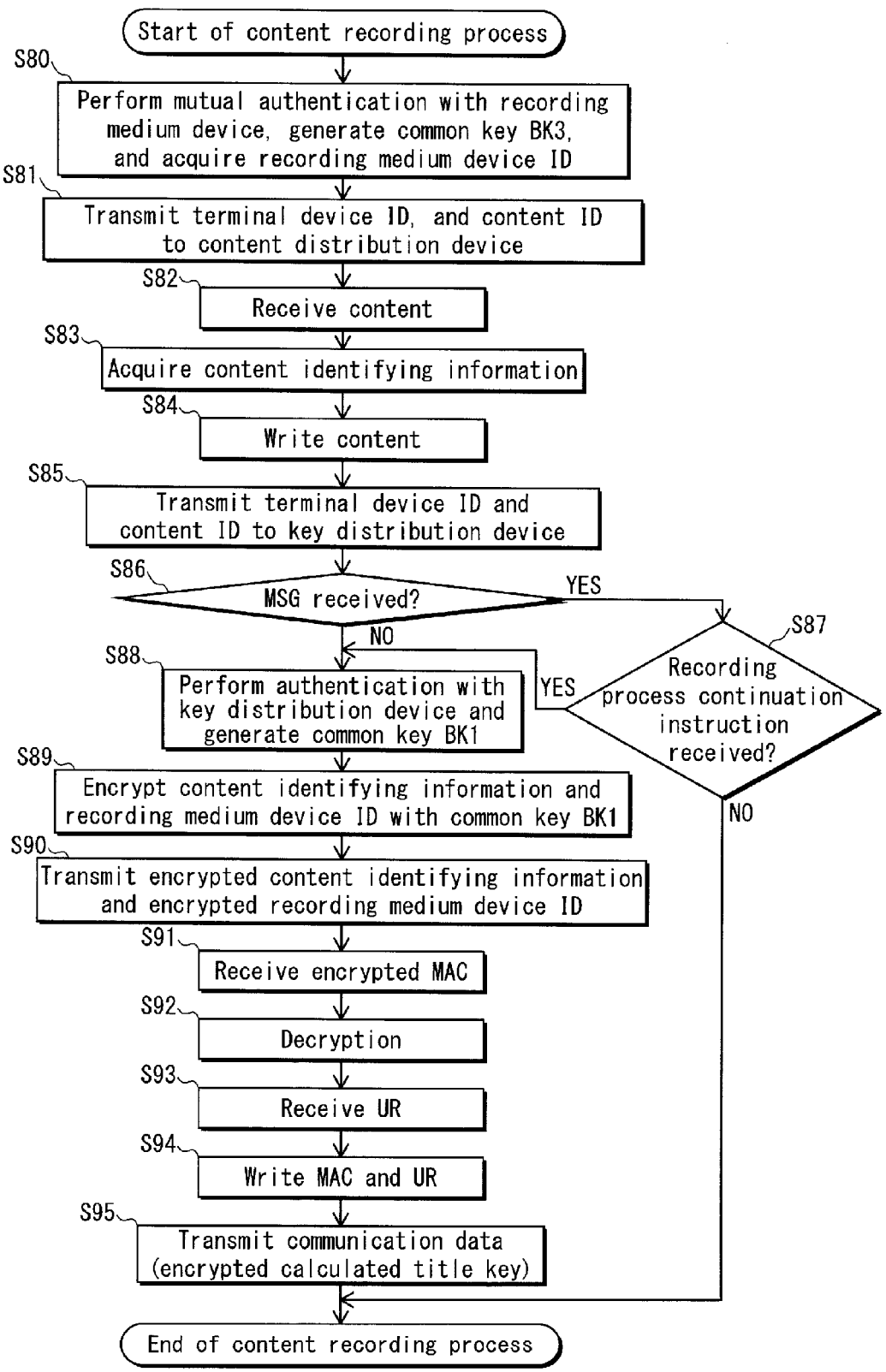
FIG. 20 is a flowchart showing operations for a content recording process performed by the terminal device 500.

FIG. 20 is a flowchart showing a content recording process performed by the terminal device 500. The terminal device 500 has already stored the root public key, the terminal device private key and the terminal device certificate 1030.

The mutual authentication unit 530 performs mutual authentication with the recording medium device 600 to verify the validity of the recording medium device 600. The recording medium device ID acquisition unit 531 acquires the recording medium device ID from the recording medium device certificate 1040 which has been received during the mutual authentication (Step S80).

The terminal device ID/content ID notification and MSG reception/presentation unit 515 transmits, to the content distribution device 300, the terminal device ID of the terminal device 500 and the content ID of the content to be recorded on the recording medium device 600 connected to the terminal device 500 (Step S81).

The content reception unit 520 receives, from the content distribution device 300, the content corresponding to the content ID transmitted by the terminal device ID/content ID notification and MSG reception/presentation unit 515 (Step S82). The content reception unit 520 acquires the content identifying information 1300 from the key distribution device 400 (Step S83).

The content writing unit 522 writes the content received by the content reception unit 520 and the content identifying information 1300 into the recording medium device 600 (Step S84).

Next, the terminal device ID/content ID notification and MSG reception/presentation unit 515 transmits the terminal device ID and the content ID to the key distribution device 400 (Step S85). In response, when the terminal device ID/content ID notification and MSG reception/presentation unit 515 receives from the key distribution device 400 the MSG that is to be transmitted when the key distribution device 400 determines that the terminal device is a revoked device (Step S86: YES), the terminal device ID/content ID notification and MSG reception/presentation unit 515 displays the MSG on the display device, which is not depicted in the drawings.

The continuation permission notification unit 516 receives the user instruction on whether or not to continue the recording process. When the user instruction is not to continue the recording process (Step S87: NO), the process terminates. When the user instruction is to continue the recording process (Step S87: YES) or when the terminal device ID/content ID notification and MSG reception/presentation unit 515 does not receive the MSG (Step S86: NO), the terminal device 500 performs mutual authentication with the key distribution device 400 and generates the common key BK1 (Step S88). Since the mutual authentication process has already been described with reference to FIG. 15 and FIG. 16, the description thereof will be omitted here.

Next, the encryption/decryption unit 532 encrypts the content identifying information 1300 and the recording medium device ID by using the common key BK1 (Step S89), and transmits the encrypted content identifying information and recording medium device ID to the key distribution device 400 (Step S90).

In response to the transmission of the recording medium device ID, the content signature/UR/MAC receiving unit 524 receives from the key distribution device 400 the MAC of the recording medium device ID which has been encrypted with the common key BK1 (Step S91), decrypts the MAC, and outputs the MAC to the content signature/UR/MAC writing unit 526 (Step S92).

The content signature/UR/MAC receiving unit 524 receives, from the key distribution device 400, the content signature 1410 and the processed UR 1440, and outputs them to the content signature/UR/MAC writing unit 526 (Step S93).

The content signature/UR/MAC writing unit 526 writes the MAC of the recording medium device ID, the content signature 1410 and the processed UR 1440 to the recording medium device 600 connected to the terminal device 500 (Step S94).

Next, the calculated title key transmission unit 527 transmits the calculated title key received from the key distribution device 400 to the recording medium device 600 (Step S95). Note that the calculated title key transmitted in Step S95 is encrypted with the common key BK3, which is shared between the key distribution device 400 and the recording medium device 600 by mutual authentication and is kept secret from the terminal device 500.

1-14. Operations for Content Playback Process

Figure 21:
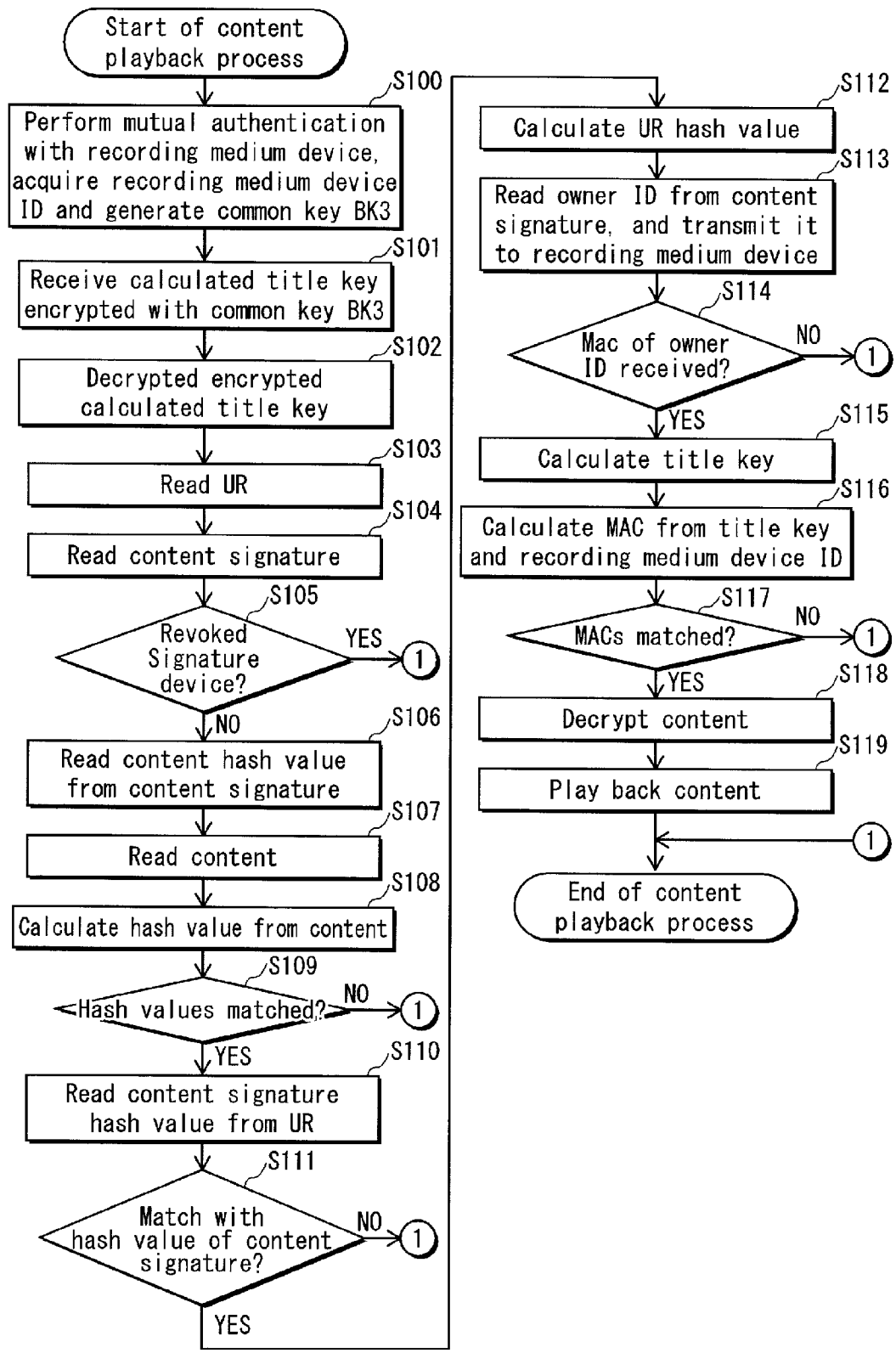
FIG. 21 is a flowchart showing operations for a content playback process performed by the terminal device 500.

FIG. 21 is a flowchart showing a content playback process performed by the terminal device 500. The recording medium device 600 has already stored the content, the calculated title key, the MAC of the recording medium device ID, the processed UR 1440, the content signature 1410, and so on, through the content recording process.

The mutual authentication unit 530 performs mutual authentication with the recording medium device 600, and generates the common key BK3. The recording medium device ID acquisition unit 531 acquires the recording medium device ID from the recording medium device certificate 1040 which has been received during the mutual authentication (Step S100).

The recording medium device ID acquisition unit 531 outputs the recording medium device ID to the first playback determination unit 558.

The encryption/decryption unit 532 receives the calculated title key encrypted with the common key BK3 from the recording medium device 600 (Step S101), and decrypts the calculated title key with the common key BK3. The encryption/decryption unit 532 outputs the calculated title key to the calculated title key reception unit 550 (Step S102). The calculated title key reception unit 550 receives the calculated title key, and outputs it to the title key recalculation unit 556.

Next, the UR reading unit 555 reads the processed UR 1440 from the recording medium device 600, and outputs the processed UR to the title key recalculation unit 556 and the third playback determination unit 574 (Step S103).

The content signature reading unit 570 reads the content signature 1410 from the recording medium device 600, and outputs the content signature 1410 to the title key recalculation unit 556, the content signature verification unit 572, the second playback determination unit 573 and the data transmission/MAC reception unit 551 (Step S104).

Next, the content signature verification unit 572 extracts the signature device ID from the signature device certificate region 1404 of the content signature 1410. The content signature verification unit 572 checks whether the signature device ID is listed in the revocation information 1200 stored in the revocation information/MSG reception/storage unit 571 (Step S105). Prior to this check, the revocation information/MSG reception/storage unit 571 compares the revocation information 1200 stored therein with the revocation information stored in the recording medium device 600 connected to the terminal device 500. When the revocation information stored in the recording medium device 600 is newer than the revocation information stored in the terminal device 500, the revocation information/MSG reception/storage unit 571 updates its revocation information to the revocation information stored in the recording medium device 600. Whether the revocation information is up-to-date or not is determined by comparing the signature date/times written in the respective signature regions of the pieces of revocation information.

When the revocation information 1200 contains the signature device ID, the content signature verification unit 572 extracts the signature date/time from the signature date/time region 1403 of the content signature 1410. The content signature verification unit 572 checks the revocation date/time written in the revocation information 1200 in association with the signature device ID. When the revocation date/time is earlier than the signature date/time, the content signature verification unit 572 determines that the signature device 700 is a revoked device (Step S105: YES), and outputs an instruction to not decrypt the content to the content decryption unit 561. Then, the terminal device 500 terminates the content playback process.

When the revocation date/time is later than the signature date/time, the content signature verification unit 572 determines that the signature device 700 is not a revoked device (Step S105: NO).

In the case of "NO" in Step S105, the second playback determination unit 573 reads the hash values described in the hash table region 1401-1 of the content signature 1410 received from the content signature reading unit 570 (Step S106).

The content reading unit 560 reads the content from the recording medium device 600, and outputs the content to the second playback determination unit 573 and the content decryption unit 561 (Step S107).

The second playback determination unit 573 divides the content received from the content reading unit 560 into five content portions. Then, the second playback determination unit 573 calculates the hash values of the content portions (Step S108). The second playback determination unit 573 compares the hash values of the content portions with the hash value described in the hash table region 1401-1 of the content signature 1410 to verify whether the content read from the recording medium device 600 is a valid content (Step S109). When at least one of the five hash values does not match with its corresponding hash value (Step S109: NO), the second playback determination unit 573 instructs the content decryption unit 561 to not decrypt the content. Then, the terminal device 500 terminates the content playback process.

When all the five hash values match with the corresponding hash values (Step S109: YES), the third playback determination unit 574 determines whether the processed UR 1440 received from the UR reading unit 555 is a UR processed by using the valid content signature. Specifically, the third playback determination unit 574 first reads the content signature hash value from the content signature hash value region 1426 of the processed UR 1440 (Step S110).

Next, the third playback determination unit 574 calculates the hash value of the content signature 1410, and determines whether the hash value obtained by the calculation matches the hash value described in the content signature hash value region 1426 of the processed UR 1440. When the hash values do not match (Step S111: NO), the third playback determination unit 574 instructs the content decryption unit 561 to not decrypt the content. Then, the terminal device 500 terminates the content playback process.

When the hash values match (Step S111: YES), the title key recalculation unit 556 calculates the hash value of the processed UR 1440 read by the UR reading unit 555 (Step S112).

Next, the data transmission/MAC reception unit 551 reads the owner ID from the owner ID region 1401-2 of the content signature 1410 received from the content signature reading unit 570, and transmits the owner ID to the recording medium device 600 via the encryption/decryption unit 532 (Step S113). The data transmission/MAC reception unit 551 checks whether the data transmission/MAC reception unit 551 has received the MAC of the owner ID from the recording medium device 600 in responses to the transmission of the owner ID (Step S114).

When the data transmission/MAC reception unit 551 has not received the MAC of the owner ID from the recording medium device 600 (Step S114: NO), the data transmission/MAC reception unit 551 instructs the content decryption unit 561 to not decrypt the content. Then, the terminal device 500 terminates the content playback process. When the data transmission/MAC reception unit 551 has received the MAC of the owner ID (Step S114: YES), the data transmission/MAC reception unit 551 outputs the MAC of the owner ID to the title key recalculation unit 556.

The title key recalculation unit 556 calculate the title key by calculating the exclusive OR (XOR) of the calculated title key (XORed title key) received from the calculated title key reception unit 550 and the data generated by the hash value of the content signature 1410 and the MAC of the owner ID (Step S115).

The first playback determination unit 558 calculates the MAC of the recording medium device ID by using the title key and the recording medium device ID (Step S116). The recording medium device ID/MAC reading unit 557 reads the MAC of the recording medium device ID from the recording medium device 600, and outputs the MAC to the first playback determination unit 558. The first playback determination unit 558 determines whether the MAC read from the recording medium device 600 matches the MAC calculated in Step S116 (Step S117).

When the MACs do not match (Step S117: NO), the first playback determination unit 558 instructs the content decryption unit 561 to not decrypt the content. Then, the terminal device 500 terminates the content playback process.

When the MACs match (Step S117: YES), the content decryption unit 561 decrypts the content by applying the decryption algorithm D to the content by using the title key as the decryption key (Step S118).

The content playback unit 580 decodes the content and displays the content on the display device (Step S119).

1-15. Structure of Recording Medium Device 600

The recording medium device 600 is, for example, an SD card which is connected to the terminal device 500 when used.

Figure 22:
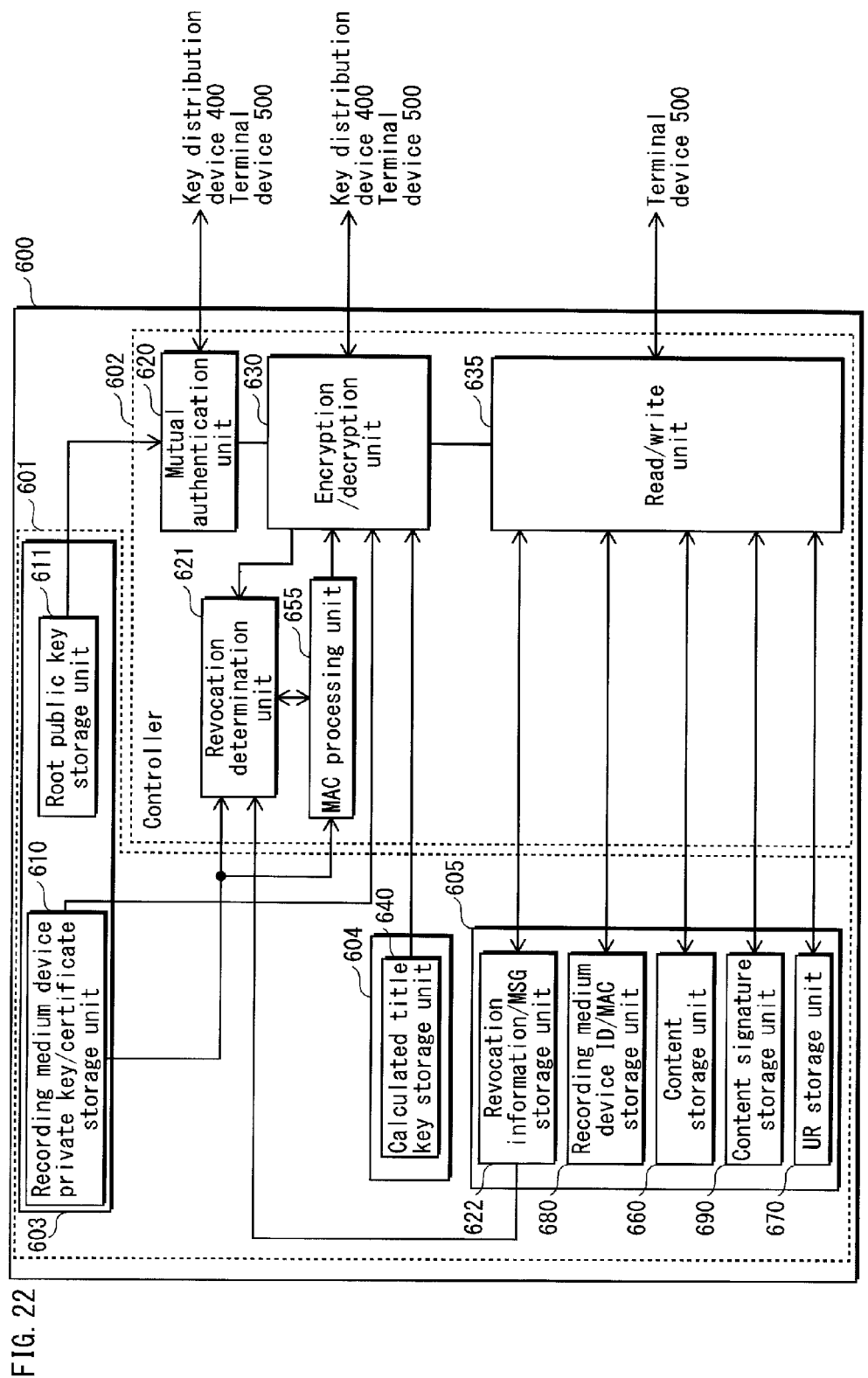
FIG. 22 is a block diagram showing a functional configuration of primary components of a recording medium device 600.

FIG. 22 is a block diagram showing a functional configuration of the primary components of the recording medium device 600.

As shown in FIG. 22, the recording medium device 600 includes a storage unit 601 and a controller 602. The controller 602 is a Large Scale Integration (LSI) device manufactured by a controller manufacturer. The internal processing of the controller 602 is secure and its information cannot be read from the outside.

The following describes the functional structure of each unit.

(1) Storage Unit 601

The storage unit 601 is a flash memory manufactured by a flash memory manufacturer. Data writing to the storage unit 601 and data reading from the storage unit 601 is performed via the controller 602. In particular, the storage unit 601 includes a system region 603, an authorized region 604 and a regular region 605. The system region 603 is a region that only the controller 602 can access (i.e. read date and write data), and it not accessible from outside the controller 602. The authorized region 604 is a region the access to which requires authentication via the controller 602. The regular region 605 does not require authentication, and is freely accessible from outside the controller 602 via the controller 602.

(1.1) System Region 603

The system region 603 includes the recording medium device private key/certificate storage unit 610, the root public key storage unit 611 and the recording medium device ID storage unit 650.

The recording medium device private key/certificate storage unit 610 is provided with a region for storing a recording medium device private key issued by the key issuing device 200 and the recording medium device certificate 1040.

The root public key storage unit 611 is provided with a region for storing the root public key issued by the key issuing device 200.

The recording medium device ID storage unit 650 is provided with a region for storing the recording medium device ID for identifying the recording medium device. The recording medium device ID is written by the recording medium device manufacturer when manufacturing of the recording medium device.

(1.2) Authorized Region 604

The authorized region 604 includes the calculated title key storage unit 640. The calculated title key storage unit 640 is provided with a region for storing the calculated title key generated and distributed by the key distribution device 400. As described above, access to the authorized region 604 requires authentication by the controller 602. Hence, writing and reading of the calculated title key is always performed via the mutual authentication unit 620 and the encryption/decryption unit 630.

(1.3) Regular Region 605

The regular region 605 includes the revocation information/MSG storage unit 622, the content storage unit 660, the UR storage unit 670, a recording medium device ID/MAC storage unit 680, and the content signature storage unit 690.

The revocation information/MSG storage unit 622 is provided with a region for storing the revocation information 1200 received form the key issuing device 200 and storing a notification message for notifying the user of the terminal device when the terminal device has been revoked.

The content storage unit 660 is provided with a region for storing a content distributed by the content distribution device 300.

The UR storage unit 670 is provided with a region for storing the processed UR 1440 distributed by the key distribution device 400.

The recording medium device ID/MAC storage unit 680 is provided with a region for storing the MAC of the recording medium device ID calculated by using the title key of the content distributed by the key distribution device 400 and the recording medium device ID.

The content signature storage unit 690 is provided with a region for storing the content signature 1410 signed by the signature device 700 and distributed by the key distribution device 400.

(2) Controller 602

The controller 602 includes the mutual authentication unit 620, the encryption/decryption unit 630, read/write unit 635, a revocation determination unit 621, and a MAC processing unit 655.

The mutual authentication unit 620 performs mutual authentication with the key distribution device 400 and shares the common key BK2. The mutual authentication unit 620 performs mutual authentication with the terminal device 500 and shares the common key BK3. Since the mutual authentication process and the key exchange process have already been described with reference to FIG. 15 and FIG. 16, the description thereof will be omitted here.

Using the common key BK2 shared with the key distribution device 400, the encryption/decryption unit 630 encrypts or decrypts data to be transmitted to or received from the key distribution device 400. Similarly, using the common key BK3 shared with the recording medium device 500, the encryption/decryption unit 630 encrypts or decrypts data to be transmitted to or received from the terminal device 500. In particular, at recording of the content, the encryption/decryption unit 630 receives the encrypted calculated title key from the key distribution device 400 via the calculated title key transmission unit 527 of the terminal device 500. Then, the encryption/decryption unit 630 decrypts the encrypted calculated title key and writes it to the calculated title key storage unit 640.

At playback of the content, the encryption/decryption unit 630 reads and encrypts the calculated title key stored in the calculated title key storage unit 640, and transmits it to the terminal device 500.

The read/write unit 635 reads data from the regular region 605 and writes data to the regular region 605.

The revocation determination unit 621 receives the terminal device ID and the owner ID from the terminal device 500 via the encryption/decryption unit 630, refers to the revocation information 1200 stored in the revocation information/MSG storage unit 622, and determines whether the terminal device 500 is a revoked terminal device or not based on the terminal device ID and the owner ID.

Prior to this check, in the content recording process, the revocation determination unit 621 compares the revocation information 1200 stored in the revocation information/MSG storage unit 622 with the revocation information stored in the key distribution device 400 connected to the recording medium device 600. When the revocation information stored in the key distribution device 400 is newer than the revocation information stored in the recording medium device 600, the revocation determination unit 621 updates the revocation information stored in the recording medium device 600 to the revocation information stored in the key distribution device 400. In the content recording process, the revocation determination unit 621 compares the revocation information 1200 stored in the revocation information/MSG storage unit 622 with the revocation information stored in the terminal device 500 connected to the recording medium device 600. When the revocation information stored in the terminal device 500 is newer than the revocation information stored in the recording medium device 600, the revocation determination unit 621 updates the revocation information stored in the recording medium device 600 to the revocation information stored in the terminal device 500. Whether the revocation information is up-to-date or not is determined by comparing the signature date/times written in the respective signature regions of the pieces of revocation information.

In the content recording process, when the revocation determination unit 621 determines that the terminal device 500 is not a revoked terminal device, the MAC processing unit 655 calculates the MAC of the owner ID by using the private key of the recording medium device 600 stored in the recording medium device private key/certificate storage unit 610 and the owner ID, and transmits the MAC to the key distribution device 400 via the encryption/decryption unit 630.

In the content playback process, when the revocation determination unit 621 determines that the terminal device 500 is not a revoked terminal device, the MAC processing unit 655 calculates the MAC of the owner ID by using the private key of the recording medium device 600 stored in the recording medium device private key/certificate storage unit 610 and the owner ID, and transmits the MAC to the terminal device 500 via the encryption/decryption unit 630.

1-16. Operations for Content Recording Process

Figure 23:
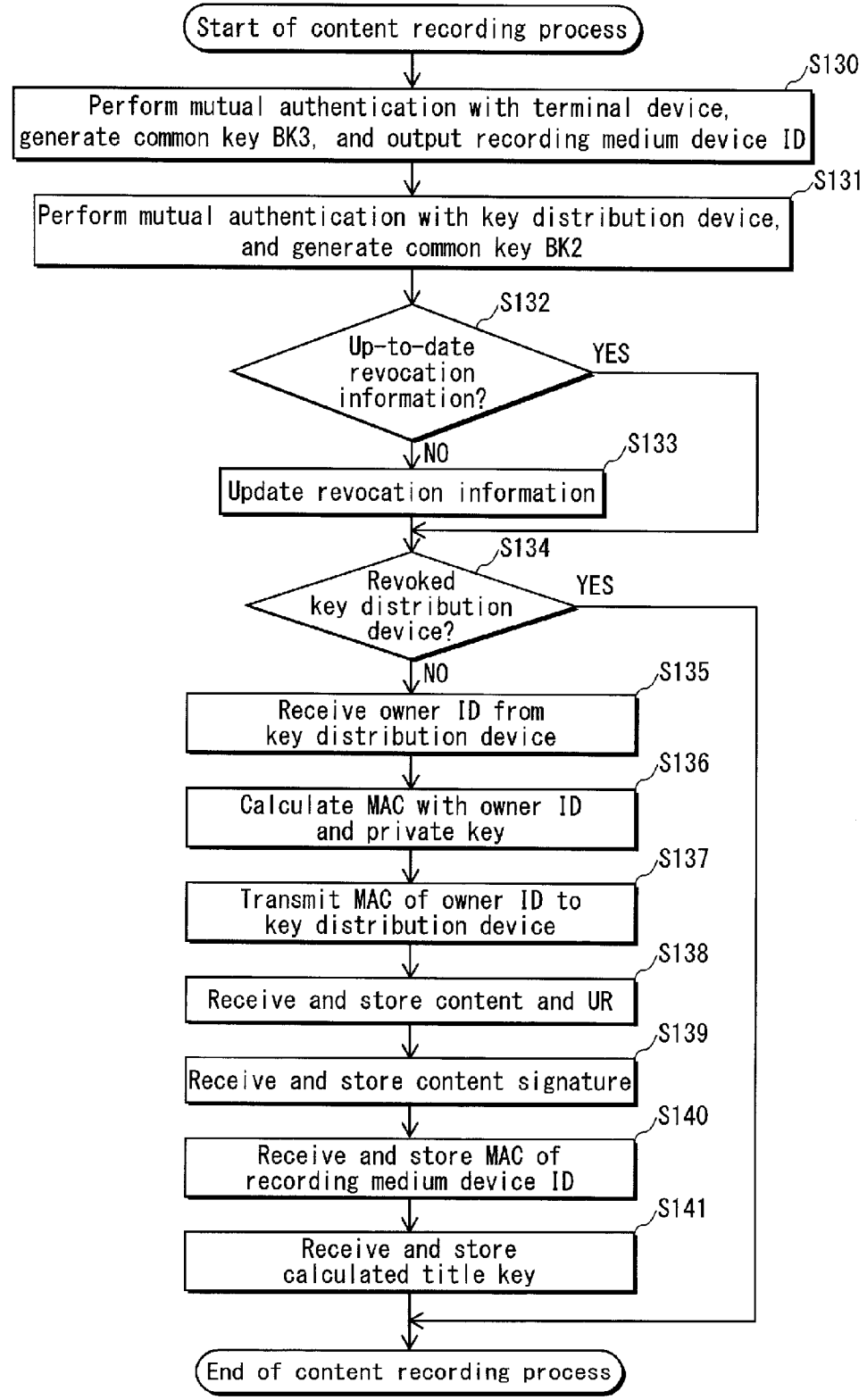
FIG. 23 is a flowchart showing operations for a content recording process performed by the recording medium device 600.

FIG. 23 is a flowchart showing a content recording process performed by the recording medium device 600. Note that the recording medium device 600 has already stored the root public key, the recording medium device private key, the recording medium device certificate 1040 and the recording medium device ID.

The mutual authentication unit 620 performs mutual authentication with the terminal device 500 to verify the validity of the terminal device 500, and acquires the terminal device ID from the terminal device certificate 1030 received in the mutual authentication process. The mutual authentication unit 620 also generates the BK3, and shares the common key BK3 with the terminal device 500 (Step S130).

Furthermore, the mutual authentication unit 620 performs mutual authentication with the key distribution device 400 to verify the validity of the key distribution device 400, and acquires the key distribution device ID from the key distribution device certificate 1020 received in the mutual authentication process. The mutual authentication unit 620 also generates the BK2, and shares the common key BK2 with the key distribution device 400 (Step S131).

The revocation determination unit 621 reads the revocation information 1200 from the revocation information/MSG storage unit 622. The revocation determination unit 621 also receives the revocation information stored in the key distribution device 400 from the key distribution device 400 via the encryption/decryption unit 630. The revocation determination unit 621 compares the pieces of revocation information to determine whether the revocation information 1200 stored in the recording medium device 600 is newer than the other (Step S132). Specifically, the revocation determination unit 621 compares the signature date/time contained the respective signature regions 1250 of the pieces of revocation information with each other. When the signature date/time of the revocation information 1200 stored in the recording medium device 600 is later than the signature date/time of the revocation information received from the key distribution device 400, the revocation determination unit 621 determines that the revocation information 1200 stored in the recording medium device 600 is newer than the other. When the revocation information stored in the recording medium device 600 is older than the other (Step S132: NO), the revocation determination unit 621 updates the revocation information stored in the recording medium device 600 to the revocation information received from the key distribution device 400, and stores the updated revocation information into the revocation information/MSG storage unit 622 (Step S133).

When the revocation information stored in the recording medium device 600 is new than the other (Step S132: YES), the revocation determination unit 621 skips the updating of the revocation information in Step S133.

Next, the revocation determination unit 621 determines whether the key distribution device 400 is a revoked device or not. Specifically, the revocation determination unit 621 determines whether the key distribution device ID is contained in the list of the revoked device included in the revocation information. If the key distribution device ID is contained in the list, the revocation determination unit 621 determines that the key distribution device 400 is a revoked device (Step S134). In the case of "YES" in Step S134, the content recording process terminates.

In the case of "NO" in Step S134, the MAC processing unit 655 receives the owner ID from the key distribution device 400 via the encryption/decryption unit 630.

Next, the MAC processing unit 655 calculates the MAC of the owner ID by using the recording medium device private key stored in the recording medium device private key/certificate storage unit 610 and the owner ID (Step S136). The MAC processing unit 655 transmits the calculated MAC of the owner ID to the key distribution device 400 via the encryption/decryption unit 630 (Step S137).

The read/write unit 635 reads the content from the content distribution device 300 via the terminal device 500, and stores the content into the content storage unit 660. The read/write unit 635 also receives the processed UR 1440 from the key distribution device 400 via the terminal device 500, and stores the processed UR 1440 into the UR storage unit 670 (Step S138). Furthermore, the read/write unit 635 receives the content signature 1410 from the key distribution device 400 via the terminal device 500, and stores the content signature 1410 into the content signature storage unit 690 (Step S139).

The read/write unit 635 receives the MAC of the recording medium device ID from the key distribution device 400 via the terminal device 500, and stores the MAC into the recording medium device ID/MAC storage unit 680 (Step S140).

The encryption/decryption unit 630 receives the calculated title key encrypted with the common key BK2 from the key distribution device 400, decrypts the encrypted calculated title key, and stores the calculated title key into the calculated title key storage unit 640 (Step S141).

1-17. Operations for Content Playback Process

Figure 24:
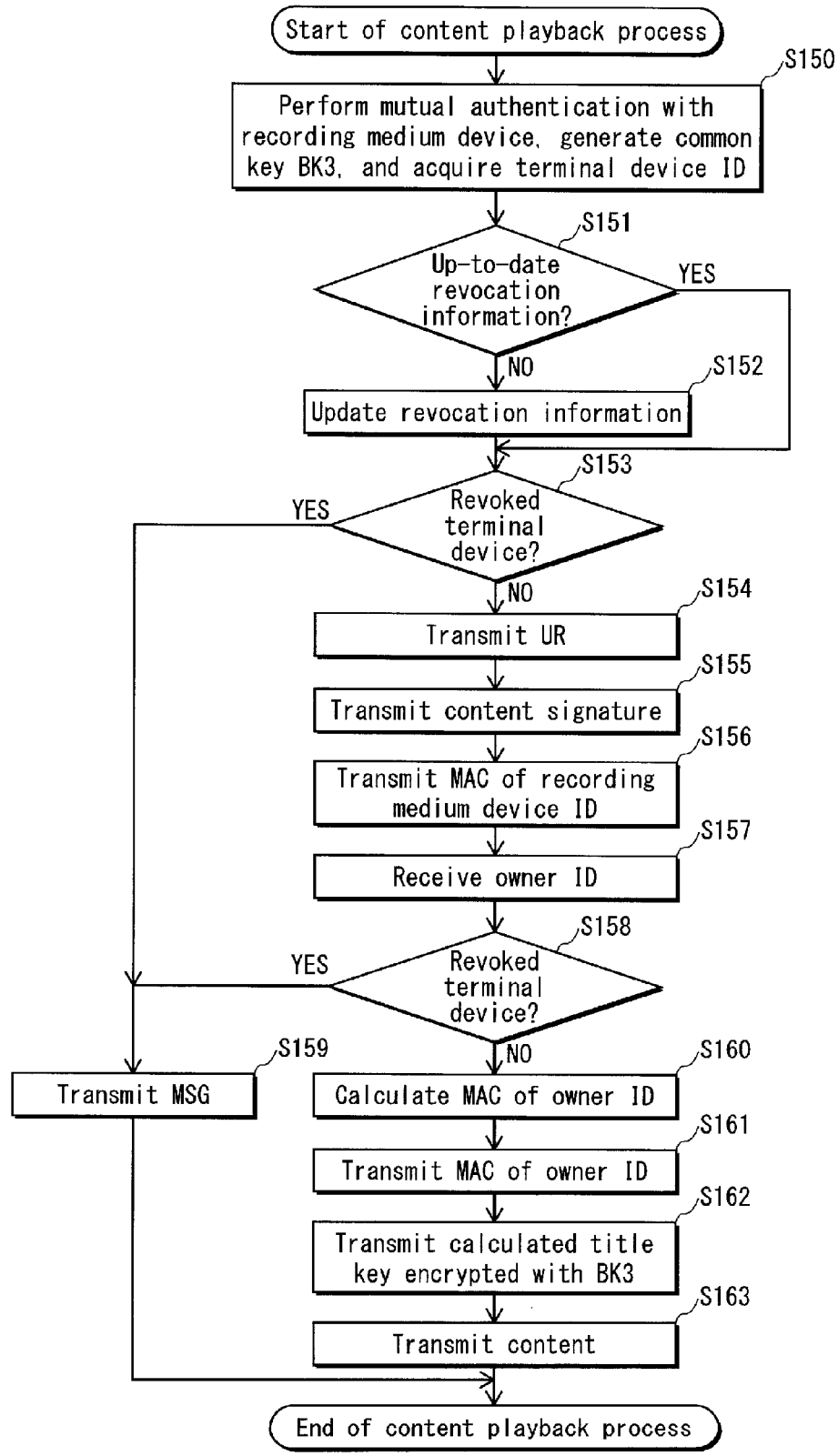
FIG. 24 is a flowchart showing operations for a content playback process performed by the recording medium device 600.

FIG. 24 is a flowchart showing a content playback process performed by the recording medium device 600. Note that the recording medium device 600 has already stored the root public key, the recording medium device private key, the recording medium device certificate 1040 and the recording medium device ID.

The mutual authentication unit 620 performs mutual authentication with the terminal device 500 to verify the validity of the terminal device 500, and acquires the terminal device ID from the terminal device certificate 1030 received in the mutual authentication process (Step S150).

The revocation determination unit 621 reads the revocation information 1200 from the revocation information/MSG storage unit 622. The revocation determination unit 621 also receives the revocation information stored in the terminal device 500 from the terminal device 500 via the encryption/decryption unit 630. The revocation determination unit 621 compares the pieces of revocation information to determine whether the revocation information 1200 stored in the recording medium device 600 is newer than the other (Step S151). Specifically, the revocation determination unit 621 compares the signature date/time contained the respective signature regions 1250 of the pieces of revocation information with each other. When the signature date/time of the revocation information 1200 stored in the recording medium device 600 is later than the signature date/time of the revocation information received from the terminal device 500, the revocation determination unit 621 determines that the revocation information 1200 stored in the recording medium device 600 is newer than the other. When the revocation information stored in the recording medium device 600 is older than the other (Step S151: NO), the revocation determination unit 621 updates the revocation information stored in the recording medium device 600 to the revocation information received from the terminal device 500, and stores the updated revocation information into the revocation information/MSG storage unit 622 (Step S152). When the revocation information stored in the recording medium device 600 is new than the other (Step S151: YES), the revocation determination unit 621 skips the updating of the revocation information in Step S152.

Next, the revocation determination unit 621 determines whether the terminal device 500 is a revoked device or not. Specifically, the revocation verification unit 418 determines whether the terminal device ID is contained in the list of the revoked device included in the revocation information. If the key distribution device ID is contained in the list, the revocation determination unit 621 determines that the terminal device 500 is a revoked device (Step S153). Here, the list of revoked devices to be referred to is described above the owner ID 1223 of the revocation information 1200 shown in FIG. 4.

In the case of "YES" in Step S153, the read/write unit 635 reads from the revocation information/MSG storage unit 622 the MSG for notifying the user of that the terminal device 500 has been revoked, and transmits the MSG to the terminal device 500. Then, the content playback process terminates (Step S159).

In the case of "NO" in Step S153, the read/write unit 635 reads the processed UR 1440 from the read/write unit 635, and outputs the processed UR 1440 to the terminal device 500 (Step S154).

The read/write unit 635 reads the content signature 1410 from the content signature storage unit 690, and outputs it to the terminal device 500 (Step S155).

Furthermore, the read/write unit 635 reads, from the recording medium device ID/MAC storage unit 680, the MAC of the recording medium device ID, and outputs it to the terminal device 500 (Step S156).

Next, the encryption/decryption unit 630 receives, from the recording medium device 600, the owner ID encrypted with the common key BK3, decrypts the encrypted owner ID, and outputs the owner ID to the revocation determination unit 621 (Step S157).

The revocation determination unit 621 determines whether the terminal device 500 is a revoked device or not based on the owner ID and the terminal device ID (Step S158). Specifically, the revocation determination unit 621 refers to the revocation list beginning with the owner ID 1223 in the revocation information 1200. First, the revocation determination unit 621 determines whether or not the owner ID written in the owner ID 1223 matches the owner ID received from the terminal device 500. When the owner IDs match, the revocation determination unit 621 refers to the revocation list following the owner ID, and determines whether the terminal device ID is contained in the revocation list. When the terminal device ID is contained in the list, the revocation determination unit 621 compares the signature date/time region 1403 in the content signature 1410 with the revocation date/time written in the revocation information 1200 in association with the terminal device ID. When the revocation date/time is earlier than the signature date/time, the revocation determination unit 621 determines that the terminal device 500 is a revoked device. When the revocation date/time is later than the signature date/time, the revocation determination unit 621 determines that the terminal device 500 is not a revoked device.

When the revocation determination unit 621 determines that the terminal device 500 is a revoked device (Step S158: YES), Step S159 is performed. When the revocation determination unit 621 determines that the terminal device 500 is not a revoked device (Step S158: NO), the revocation determination unit 621 outputs the owner ID to the MAC processing unit 655. The MAC processing unit 655 calculates the MAC of the owner ID by using the owner ID and the private key of the recording medium device 600 (Step S160). The MAC processing unit 655 transmits the calculated MAC of the owner ID to the terminal device 500 via the encryption/decryption unit 630 (Step S161).

Next, the encryption/decryption unit 630 reads the calculated title key from the calculated title key storage unit 640, encrypts the calculated title key with the common key BK3, and transmits the calculated title key to the terminal device 500 (Step S162).

The read/write unit 635 reads the content from the content storage unit 660, and transmits the content to the terminal device 500 (Step S163).

1-18. Structure of Signature Device 700

The signature device 700 performs a content signature generation process, by which the signature device 700 receives content identifying information from the key distribution device 400, generates a content signature by applying a signature to the content identifying information with a valid signature key, and returns the content signature to the key distribution device 400.

Figure 25:
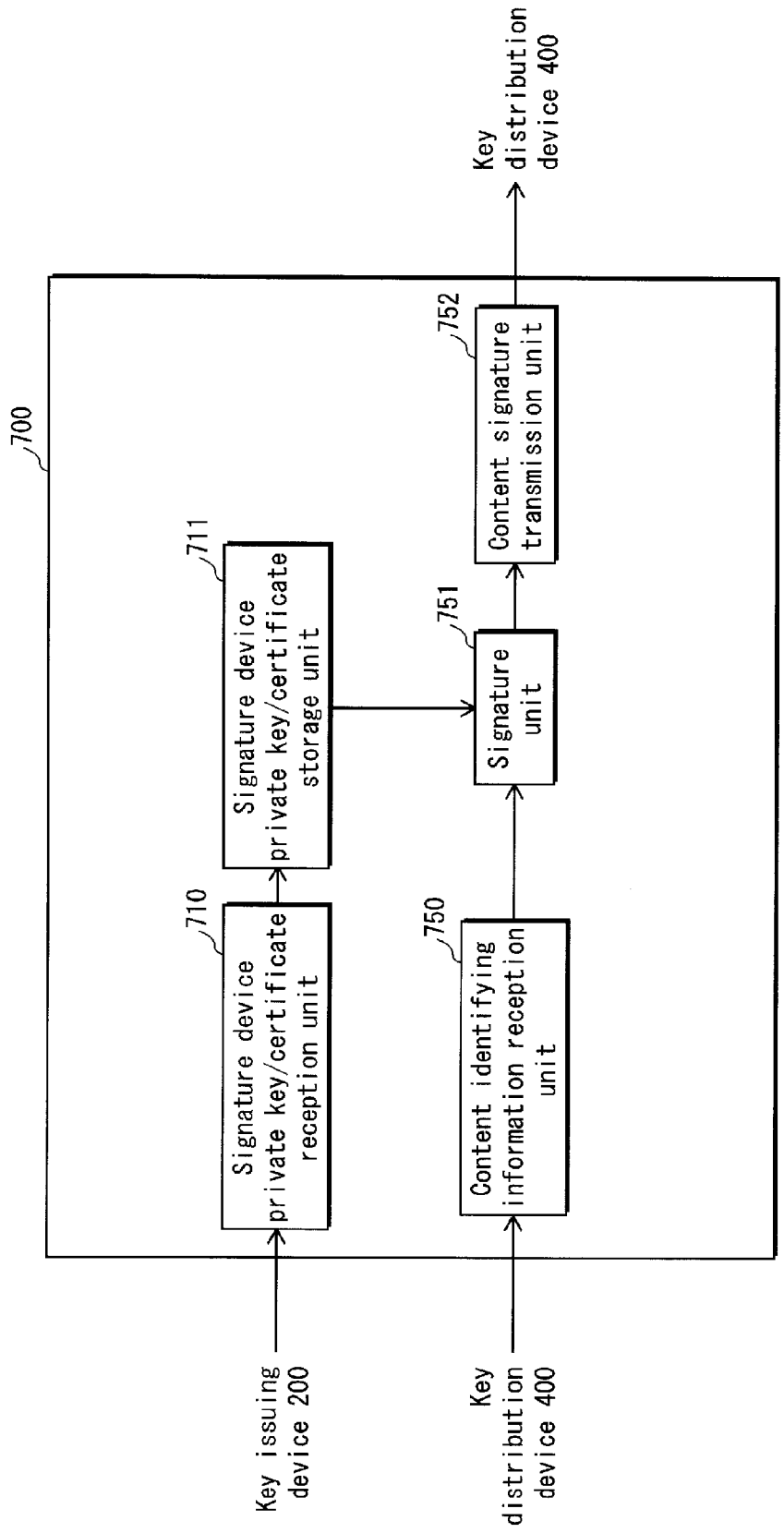
FIG. 25 is a block diagram showing a functional configuration of primary components of a signature device 700.

FIG. 25 is a block diagram showing a functional structure of the signature device 700.

As shown in FIG. 25, the signature device 700 includes a signature device private key/certificate reception unit 710, a signature device private key/certificate storage unit 711, a content identifying information reception unit 750, a signature unit 751, and a content signature transmission unit 752.

The content distribution device 700 is a computer system including a CPU, a memory, a secondary storage unit (e.g. a hard disk), a network connection unit, etc.

The signature device private key/certificate storage unit 711 includes a secondary storage unit (e.g. a hard disk). The functions of the signature unit 751 area achieved by the CPU executing a computer program stored in the memory. Each of the signature device private key/certificate reception unit 710, the content identifying information reception unit 750 and the content signature transmission unit 752 includes a network communication unit.

The signature device private key/certificate reception unit 710 receives, from the key issuing device 200, the signature device private key and the signature device certificate.

The signature device private key/certificate storage unit 711 stores the signature device private key and the signature device certificate.

The content identifying information reception unit 750 receives, from the key distribution device 400, the content identifying information 1300.

The signature unit 751 includes a clock for measuring the date/time. The signature unit 751 receives the content identifying information 1300 from the content identifying information reception unit 750, and generates the content signature by adding the signature data and so on to the content identifying information 1300. The signature unit 751 outputs the content signature to the content signature transmission unit 752.

The content signature transmission unit 752 receives the content signature from the signature unit 751, and transmits the content signature to the key distribution device 400, from which the content identifying information 1300 has been transmitted.

1-19. Operations for Content Signature Generation Process

Figure 26:
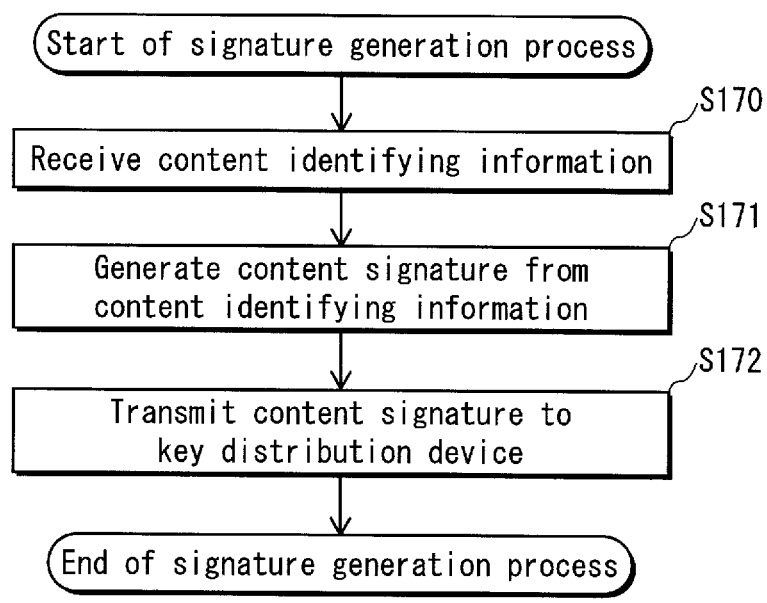
FIG. 26 is a flowchart showing operations for a content signature generation process performed by the signature device 700.

FIG. 26 is a flowchart showing a content signature generation process performed by the signature device 700.

Prior to the content signature generation process, the signature device 700 has received the signature device private key and the signature device certificate 1050 from the key issuing device 200 and stored them.

The content identifying information reception unit 750 receives, from the key distribution device 400, the content identifying information 1300 (Step S170).

The signature unit 751 generates the signature data by applying a signature verification algorithm S to the content identifying information 1300 by using the signature device private key as a signature key (Step S171). One example of the signature verification algorithm is Digital Signature Algorithm (DSA).

Specifically, the signature unit 751 writes the content identifying information 1300 received in Step S170 to the content identifying information region 1401, and writes the signature data generated in Step S171 to the signature data region 1402. Next, the signature device 700 acquires the current date/time from the internal clock, and writes the current date/time into the signature date/time region 1403. Then, the signature device 700 generates the content signature 1400 by writing the signature device certificate 1050 to the signature device certificate region 1404.

The content signature transmission unit 752 transmits the content signature 1400 generated in Step SS171 to the key distribution device 400 (Step S172).

1-20. Summary of Embodiment 1

When distributing the title key of the content stored in the recording medium device 600, the key distribution device 400 generates a calculated title key (XORed title key) by calculating the exclusive OR (XOR) of the title key and the data obtained by concatenating the MAC of the owner ID and the has value of the processed UR 1420 of the content, and transmits the calculated title key to the recording medium device 600. The owner ID is used for identifying the content provider, and the MAC of the owner ID has been calculated by using the private key of the recording medium device 600.

The revocation information 1200 is provided with a region for storing the revocation list in which revoked devices are written in association with each owner ID. Hence, when the terminal device 500 plays back the content, the recording medium device 600 refers to the revocation list for each owner ID included in the revocation information, and determine whether the terminal device 500 is a revoked device or not based on the owner ID described in the content signature of the content.

When the terminal device ID of the terminal device 500 is included in the revocation list for any of the owner ID, the recording medium device 600 does not output the MAC of the owner ID to the terminal device 500. Hence, even when the terminal device 500 reads the calculated title key from the recording medium device 600, the terminal device 500 cannot perform the inverse operation to the calculated title key without obtaining the MAC of the owner ID, and therefore cannot obtain the title key.

Also, when the terminal device 500 transmits to the recording medium device 600 an owner ID that is different from the owner ID of the content to be played back in order to avoid being determined as a revoked device by the recording medium device 600, the recording medium device 600 outputs the MAC of the different owner ID to the terminal device 500. The terminal device 500 cannot obtain the valid title key by performing the operation to the calculated title key by using the MAC of the different owner ID.

Hence the terminal device 500 cannot obtain the title key for decrypting the content, and the terminal device 500 cannot decrypt the content. The recording medium device 600 thus prevents unauthorized terminal devices from playing back the content.

2. Embodiment 2

2-1. Overview

The overall structure of the content distribution system pertaining to Embodiment 2 is basically the same as the content distribution system 1 pertaining to Embodiment 1 shown in FIG. 1. The content distribution system pertaining to the present embodiment includes a content production device 100, a key issuing device 200, a content distribution device 300b, a key distribution device 400b, a terminal device 500b, a recording medium device 600, and a signature device 700.

In Embodiment 1, at recording of a content, the content distribution device 300 distributes an encrypted content to the terminal device 500, and the key distribution device 400 distributes the calculated title key to the recording medium device 600. In contrast, in Embodiment 2, the content distribution device 300b distributes an unencrypted content to the terminal device 500b, and the key distribution device 400b distributes an unencrypted title key to the recording medium device 600. The difference is that the terminal device 500b reads the unencrypted title key from the recording medium device 600 and generates an encrypted content by using the title key and writes the encrypted content into the recording medium device 600.

In the following, the same components as Embodiment 1 are given the same reference numbers, and the differences from Embodiment 1 are mainly described.

2-2. Structure of Key Distribution Device 400b

Figure 27:
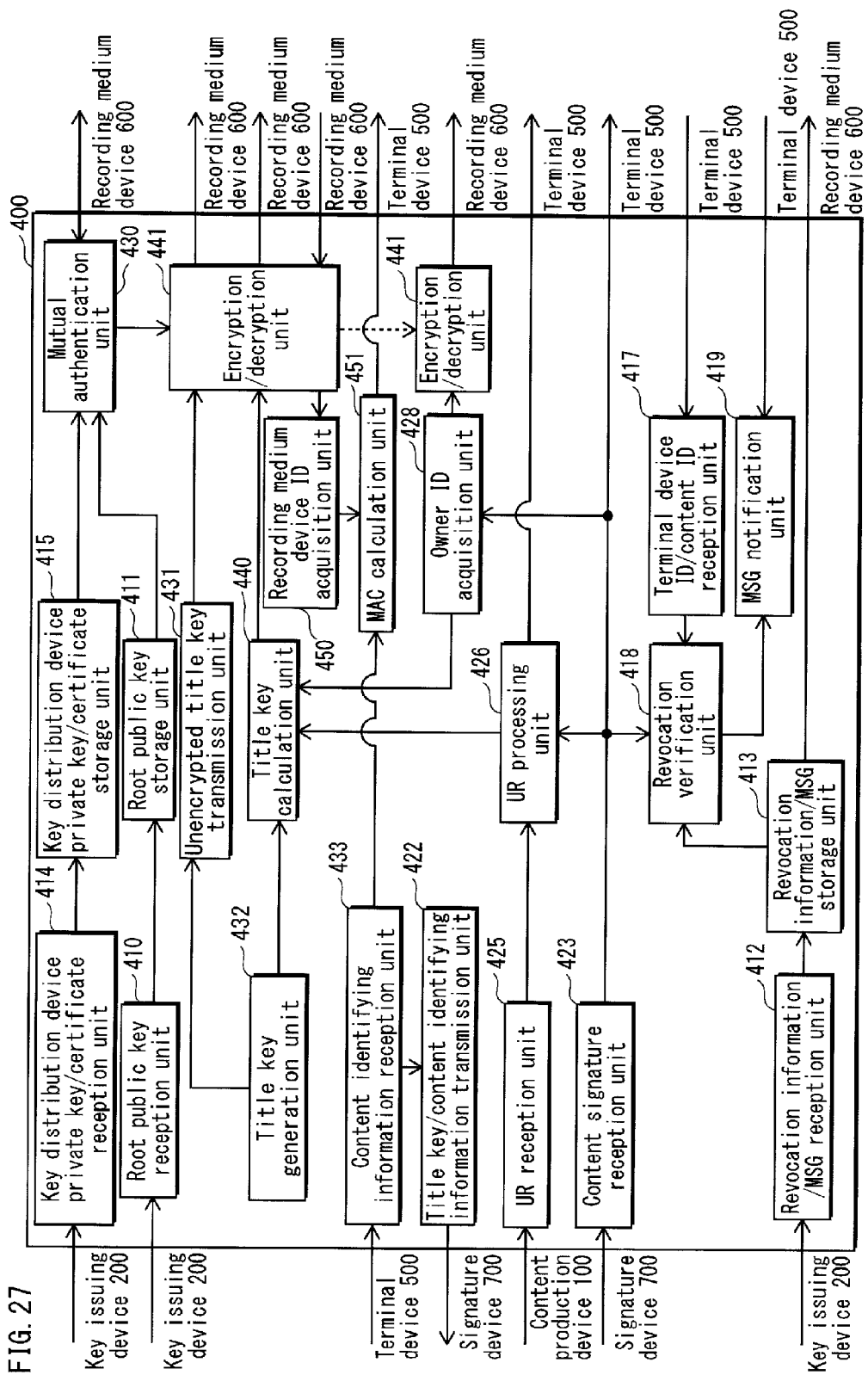
FIG. 27 is a block diagram showing a functional configuration of primary components of a key distribution device 400b.

FIG. 27 is a block diagram showing a functional structure of the content distribution device 400b.

The key distribution device 400b further includes a title key generation unit 432 and an unencrypted title key transmission unit 431 in addition to the components of the key distribution device 400 shown in FIG. 12, and includes a content identifying information reception unit 433 instead of the title key/content identifying information reception unit 421.

The same components as the key distribution device 400 shown in FIG. 12 are not explained below.

The title key generation unit 432 generates a 128-bit random number, and determines the random number as the title key. The title key is output to the unencrypted title key transmission unit 431 and the title key calculation unit 440.

The unencrypted title key transmission unit 431 outputs the unencrypted title key to the recording medium device 600 via the encryption/decryption unit 441.

2-3. Operations for Key Distribution Process

Figure 28:
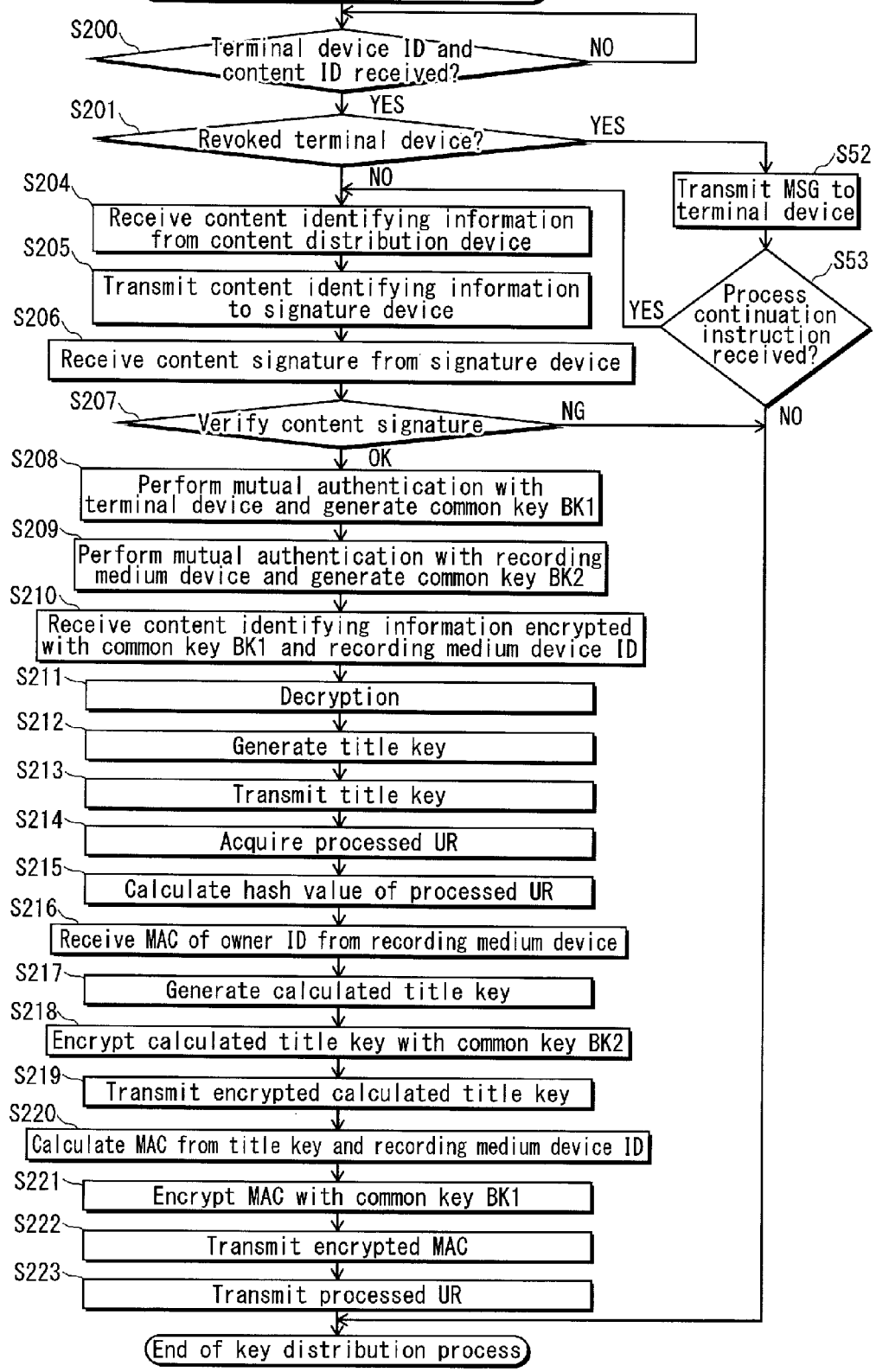
FIG. 28 is a flowchart showing a key distribution process performed by the key distribution device 400b.

FIG. 28 is a flowchart showing a key distribution process performed by the key distribution device 400b.

Prior to the key distribution process, the distribution device 400b has received and stored a root public key from the key issuing device 200. The key distribution device 400b has received and stored a key distribution device private key and a key distribution device certificate from the key issuing device 200. The key distribution device 400b has received and stored an UR and the content identifying information 1300 from the content production device 100.

The following process is performed when the key distribution device 400b receives from the terminal device 500b a request for transmitting a title key.

In the flowchart shown in FIG. 28, Steps S200 through S211 are the same as Steps S50 through S61 shown in the flowchart shown in FIG. 17. Hence, the explanations of these steps are omitted.

On completion of Step S211, the title key generation unit 432 generates a title key (unencrypted title key) (Step S212).

The title key generation unit 432 outputs the unencrypted title key to the unencrypted title key transmission unit 431. The unencrypted title key transmission unit 431 transmits the unencrypted title key to the recording medium device 600 via the encryption/decryption unit 441. The unencrypted title key is encrypted by the encryption/decryption unit 441 with the common key BK2, and is transmitted to the recording medium device 600 (Step S213).

The Step S214 and the following Steps are the same as Steps S63 through S72 in the flowchart shown in FIG. 17. Hence the explanations thereof are omitted here. The unencrypted title key transmitted to the recording medium device 600 in Step S213 is overwritten with the calculated title key transmitted in Step S219. Thus, the unencrypted title key is removed from the recording medium device 600.

2-4. Structure of Terminal Device 500b

The structure of the terminal device 500b is basically the same as the terminal device 500.

Figure 29:
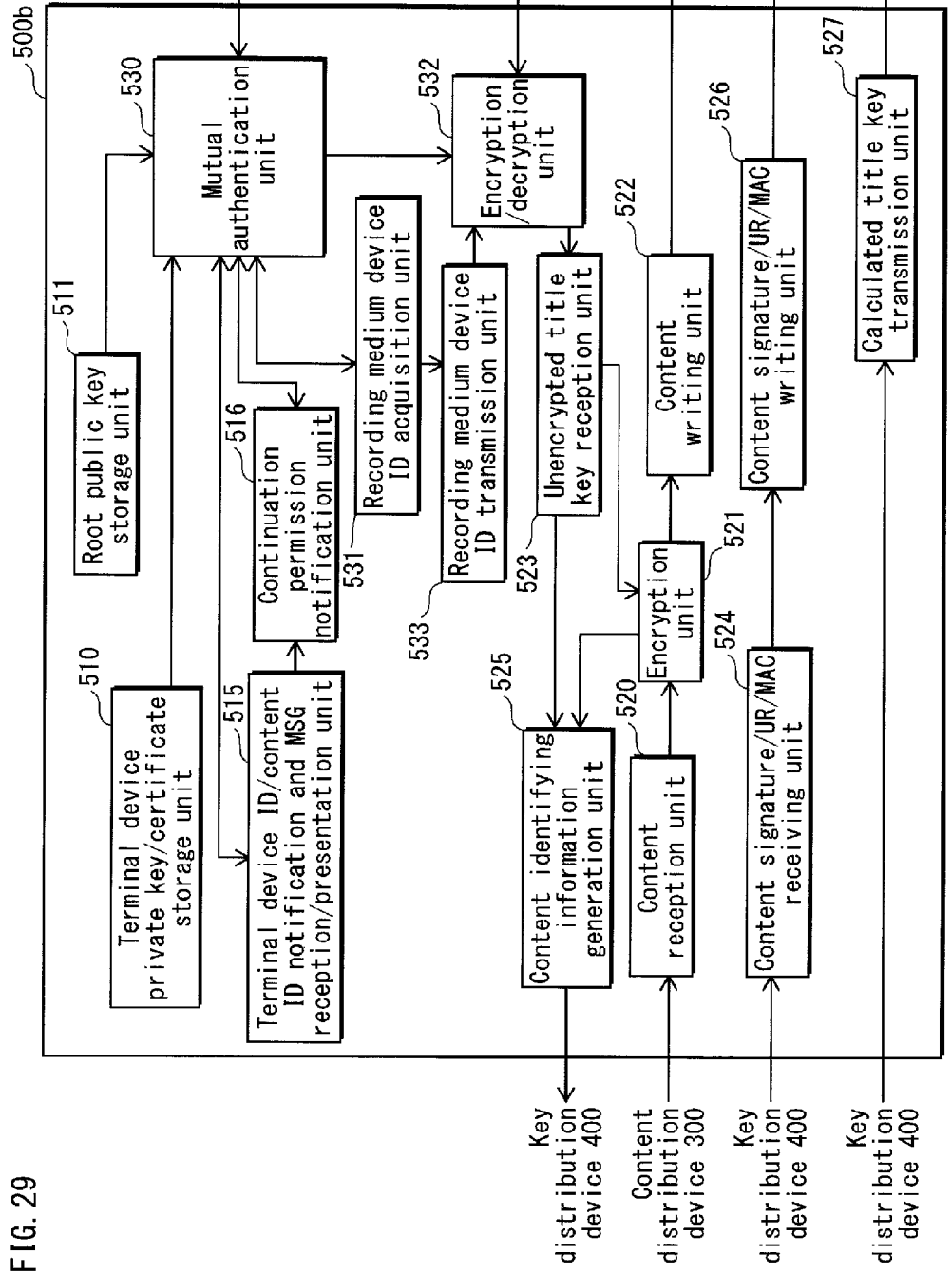
FIG. 29 is a block diagram showing a functional configuration of primary components of a terminal device 500b during a receiving and a writing process.

FIG. 29 is a block diagram showing a functional configuration of primary components of the terminal device 500b during a receiving and a writing process. The difference from the terminal device 500 is that the terminal device 500b further includes an encryption unit 521, an unencrypted title key reception unit 523, and a content identifying information generation unit 525.

The same components as the terminal device 500 are given the same reference numbers, and are not explained below.

The encryption unit 521 encrypts the unencrypted content that the content reception unit 520 has received from the content distribution device 300b with the unencrypted title key received by the unencrypted title key reception unit 523.

The unencrypted title key reception unit 523 reads the unencrypted title key from the recording medium device 600 via the encryption/decryption unit 532. The unencrypted title key stored in the recording medium device 600 is encrypted in the recording medium device 600 with the common key BK3 and is then transmitted to the terminal device 500. The encrypted title key is decrypted by the encryption/decryption unit 532 with the common key BK3, and is then output to the unencrypted title key reception unit.

The content identifying information generation unit 525 generates content identifying information 1300 from the content encrypted by the encryption unit 521, and transmits the content identifying information 1300 to the key distribution device 400.

2-5. Operations for Content Recording Process

FIG. 30 is a flowchart showing a content recording process performed by the terminal device 500b. The terminal device 500b has already stored the root public key, the terminal device private key and the terminal device certificate 1030.

The mutual authentication unit 530 performs mutual authentication with the recording medium device 600 to verify the validity of the recording medium device 600. The recording medium device ID acquisition unit 531 acquires the recording medium device ID from the recording medium device certificate 1040 which has been received during the mutual authentication (Step S180).

The terminal device ID/content ID notification and MSG reception/presentation unit 515 transmits, to the content distribution device 300, the terminal device ID of the terminal device 500b and the content ID of the content to be recorded on the recording medium device 600 connected to the terminal device 500b (Step S181).

The unencrypted title key reception unit 523 receives the unencrypted title key from the key distribution device 400 via the encryption/decryption unit 532 (Step S182).

Next, the content reception unit 520 receives an unencrypted content from the content distribution device 300 (Step S183).

The encryption unit 521 encrypts the unencrypted content by an encryption algorithm by using the unencrypted title key, and thus generates the encrypted content (Step S184). The encryption algorithm is based on a private key cryptosystem. For example, AES may be used.

The content writing unit 522 writes the encrypted content to the recording medium device 600 (Step S185).

Next, the content identifying information generation unit 525 generates the content identifying information 1300 uniquely identifying the content, from the content encrypted by the encryption unit 521, and transmits the content identifying information 1300 to the key distribution device 400 (Step S186). The content identifying information 1300 has already been described above, and the explanation thereof is omitted here.

The terminal device ID/content ID notification and MSG reception/presentation unit 515 transmits the terminal device ID and the content ID to the key distribution device 400 (Step S187).

Steps S188 through S197 are the same as Steps S86 through S95 of the flowchart shown in FIG. 20, and the explanations thereof are omitted here.

Through these procedures, the terminal device 500*b* encrypts the unencrypted content by using the unencrypted title key received from the key distribution device 400, and stores the encrypted content to the recording medium device 600 connected to the terminal device 500*b*, and then the recording medium device 600 receives the calculated title key calculated by the key distribution device 400, and stores the calculated title key instead of the unencrypted title key.

3. Modifications

Although the present invention has been described above based on Embodiments, the present invention is not limited to the content distribution system pertaining to Embodiments. The content distribution system may be modified as follows.

(1) In Embodiment 1, the key distribution device 400 and the signature device 700 are independent from each other. However, these devices may be integrated as a single device. Similarly, the key distribution device 400*b* and the signature device 700 may be integrated as a single device.

(2) In Embodiments above, the content production device 100 and the content distribution device 300 are independent from each other. However, these devices may be integrated as a single device.

Unlike the content distribution device 300 shown in FIG. 9, the title key generation unit 331, the encryption unit 332, the content identifying information generation unit 340 and the title key/content identifying information transmission unit 341 may be included in the content production device 100, and the functions of these functional blocks may be achieved by the content production device 100.

(3) In the revocation information 1200, it is not necessarily the owner ID that is associated with a revoked device. Any kind of information may be used only if the information distinguishes the content from regular contents. For example, information about the owner, the content, the user, the device, the content distribution service, or the like may be used.

Examples of the information about the owner include identifying information showing the group to which the owner belongs, the name, the address and telephone number of the owner, and the likes.

The information about the content may be information identifying the content. For example, the following may be used: identifying information such as content type information and content ID; the content identifying information; the hash value of the content identifying information; the content signature; the signature included in the content signature; the hash value of the content signature; the UR; the hash value of the UR; and the hash value of the UR in the form of a number such as a random number written in the UR or the content signature.

The information about the user may be the user type such as the sex, the age and the family member, the user ID, or the like.

The information about the device may be the type of the device such as a terminal device type and a recording medium device type, the terminal device ID, or the like.

The information about the content distribution service may be identifying information showing the group to which the key distribution device belongs, the type of the key distribution device, the terminal device ID of the key distribution device, or the like.

The key distribution device 400 may transmit the information associated with the revoked device, instead of the owner ID, to the terminal device 500 and the terminal device 500*b*. Thus the calculated title key can be generated based on the identifying information associated with the revocation information.

(4) The data to be calculated and transmitted by the recording medium device 600 in response to the owner ID received from the key distribution device is not necessarily the MAC obtained by using the block encryption. It is possible to use any data that can be used for verifying that the calculated data has not been tampered with. For example, a signature, a hash function, an AES encryption or the like may be used instead.

The key used in the calculation by the recording medium device 600 is not necessarily the private key of the recording medium device 600. The key may be a unique key of the controller, a key provided by the server at the distribution, a numeric value, or the like may be used instead.

(5) In Embodiments above, the hash values of the five content portions are used as the pieces of content identifying information. However, the number of the hash values is not necessarily five. The content may be not divided into pieces, or the number of the hash values may be other than five.

In order to improve the accuracy of the validity of the content, the hash values may be calculated for more than five content portions. Conversely, in order to reduce the amount of calculation, the hash values may be calculated for less than five content portions.

(6) In Embodiments, the notification message information is text information. However, the notification message information is not necessarily text information. The only necessity is that the information can convey a message from the content provider, and it may be audio, or an image, for example.

(7) In the description above, the input unit 215 of the key issuing device 200 receives the terminal device ID, the recording medium device ID or the signature device ID of a revoked device. However, information received by the input unit 215 is not necessarily a device ID. The only necessity is that the information identifies the revoked device. For example, the model ID of the revoked terminal device, recording medium device, or signature device may be received by the input unit 215. Here, the model ID is a model number identifying the type of the terminal device, the recording medium device or the signature device. Alternatively, identifying information that identifies the public key certificate assigned to the revoked terminal device, recording medium device, or signature device may be received by the input unit 215.

(8) The root key pair generation unit 210 of the key issuing device 200 in Embodiments generates key pairs such as the root key pairs for the devices by the elliptic curve cryptography as a public key cryptosystem. However, the public key cryptosystem used for generating the key pairs is not necessarily the elliptic curve cryptography. It is possible to use any method that can generate key pairs according to a public key cryptosystem. For example, the private keys and the public keys may be generated by using the RSA encryption as a public key cryptosystem.

(9) In Embodiments above, an SD card is used as an example of the recording medium device 600. However, the recording medium device 600 is not necessarily an SD card. The recording medium device 600 may be made up from a storage device, such as an HDD, and a control LSI. The recording medium device 600 is not necessarily a detachable device such as an SD card. The recording medium device 600 may be made up of a built-in memory included in a mobile telephone, an eBook, a NetBook, or the like, and a control LSI.

(10) The terminal device 500 and the terminal device 500*b* pertaining to Embodiments above may be portable devices such as PCs, smartphones, and tablet devices. The terminal device 500 may be a KIOSK terminal installed in stores such as convenience stores. The terminal device 500 may be a receiver device for receiving digital television broadcasting. The terminal device 500 is at least connectable to a network such as the Internet, and a television broadcast network, and at least has a function to acquire contents, title keys, content signatures, UR, and so on via the network and records them on the recording medium device 600.

(11) In Embodiments above, the terminal device 500 and the terminal device 500b have a structure for acquiring the recording medium device ID in the course of mutual authentication with the recording medium device 600. However, the method for acquiring the recording medium device ID is not limited in this way.

For example, the recording medium device ID for uniquely identifying the recording medium device 600 may be stored in the authorized region 604 of the recording medium device 600. If this is the case, the terminal device 500 and the terminal device 500b perform mutual authentication with the recording medium device 600, and after sharing the common key BK3, receive the recording medium device ID encrypted with the common key BK3 from the recording medium device 600. Thus, the terminal device 500 and the terminal device 500b may decrypt and acquire the recording medium device ID by using the common key BK3.

(12) In Embodiments above, the content signature reception unit 423 of the key distribution device 400 may perform the verification of the content signature 1410 from the signature device 700 in the following manner.

The content signature reception unit 423 refers to the revocation information 1200 stored in the revocation information/MSG storage unit 413, and determines whether the signature device ID is contained in the revocation information. When the signature ID is contained in the revocation information 1200, the content signature reception unit 423 compares the signature date/time described in the content signature 1410 with the revocation date/time described in the revocation information 1200. When the signature date/time described in the content signature 1410 is later than the revocation date/time described in the revocation information 1200, the content signature reception unit 423 determines that the content signature 1410 is invalid.

When the signature date/time described in the content signature 1410 is earlier than the revocation date/time described in the revocation information 1200, the content signature reception unit 423 further determines whether the signature date/time of the content signature 1410 is significantly different from the reception date/time of the content signature 1410.

For example, the content signature reception unit 423 determines whether or not the date/time described in the signature is different from the current date/time by 48 hours or more. If the signature's date/time is different from the current date/time by 48 hours or more, the content signature reception unit 423 determines that the content signature 1410 is invalid.

(13) In Embodiments above, the first playback determination unit 558 of the terminal device 500 determines whether the terminal device 500 is permitted to playback a content by using the MAC generated based on the ID of the recording medium device 600. However, the information used for determining whether the terminal device is permitted to playback a content is not necessarily the MAC. For example, the information may be a value obtained by calculating the XOR of the calculated title key and the identifying information of the recording medium device. Alternatively, the information may be a value obtained by calculating the XOR of the calculated title key and the hash value of the identifying information of the recording medium device. Alternatively, the information may be the identifying information of the recording medium device 600 added with the signature of the key issuing device 200. Alternatively, the information may be the identifying information of the recording medium device 600 signed by the key issuing device 200. If this is the case, the terminal device 500 can determine whether it is permitted to playback the content by calculating the XOR or verifying the signature.

(14) In Embodiments above, the third playback determination unit 574 of the terminal device 500 has a structure for calculating the hash value of the content signature 1410, and comparing the hash value obtained by the calculation with the hash value described in the content signature hash value area 1426 of the processed UR 1440.

However, this structure is merely an example. It is only necessary for the third playback determination unit 574 to confirm that the information identifying the content signature 1410 is appropriately embedded in the processed UR 1440.

For example, the third playback determination unit 574 may have a structure for determining whether the signature data written in the signature data region 1425 of the processed UR 1440 read by the UR reading unit 555 matches the signature data written in the signature data region 1402 of the content signature 1410 read by the content signature reading unit 570.

(15) In Embodiments above, the first playback determination unit 558, the content signature verification unit 572, the second playback determination unit 573 and the third playback determination unit 574 have a structure for outputting an instruction to not decrypt the content to the content decryption unit 561, according to the results of their determination. However, this structure is merely an example.

To restrict playback of the content, the first playback determination unit 558, the content signature verification unit 572, the second playback determination unit 573 and the third playback determination unit 574 may output an instruction to not decode the content to the content playback unit 580 according to the results of the determination.

Alternatively, the first playback determination unit 558 may output an instruction to not read the content to the content reading unit 560 according to the results of the determination.

(16) In Embodiments above, contents are, for example, movies consisting of video data and audio data. However, the contents are not limited to movies, as a matter of course. The contents may be still images such as JPEG images, computer programs, computer games, music contents not containing video data, text data, or the likes.

(17) The key distribution process and the content playback process pertaining to Embodiments described above may be realized with a control program composed of program codes in a machine language or a high-level language. The program code is executed by processors in the key distribution device and the terminal device or various circuits connected to the processors, and may be recorded on a recording medium, or be distributed via various kinds of communication channels.

Examples of such a recording medium include an IC card, a hard disk, an optical disc, a flexible disc, a ROM and a flash memory.

The distributed control program is stored in a memory or the like that is readable from a processor, and the functions of Embodiments described above are realized by the processor executing the control program.

To execute the control program, the processor may compile the control program or use an interpreter, instead of directly executing the control program.

(18) The functional components of the devices pertaining to Embodiments described above (e.g. the revocation determination unit 621, the MAC processing unit 655, the mutual authentication unit 620, the encryption/decryption unit 630 and the read/write unit 635 of the recording medium device 600, the first playback determination unit 558, the second playback determination unit 573, the third playback determination unit 574, the content signature verification unit 572, the title key recalculation unit 556, the content decryption unit 561, the content playback unit 580 and the MSG presentation unit 575 of the terminal device 500, and the title key calculation unit 440, the revocation verification unit 418 and the MAC calculation unit 451 of the key distribution device 400) may be realized as circuits achieving the functions, or be realized by one or more processors executing a program.

Also, the key distribution device and the terminal device pertaining to Embodiments described above may be realized as a package of integrated circuits such as an IC and an LSI.

Such a package is incorporated in various devices, and thus the various devices realize the functions of Embodiments as described above.

(19) Embodiments and Modifications described above may be combined together in any manner.

4. Supplementary Explanation

The following describes the structures and modifications of a recording medium device, a terminal device and a key distribution device pertaining to an embodiment of the present invention.

(1) A recording medium device as one aspect of the present invention is a recording medium device for storing contents used by terminal devices connected to the recording medium device, comprising: a content storage unit configured to store contents including a special content; an attribute storage unit configured to store attributes of the contents, which correspond one-to-one to the contents and among which an attribute of the special content contains content identifying information distinguishing the special content from regular contents; a revocation information storage unit configured to store revocation information indicating a terminal device restricted from using the special content; a device identifying information acquisition unit configured to acquire device identifying information from a terminal device connected to the recording medium device, the device identifying information identifying the terminal device; a usage information output unit configured to output usage information to a terminal device connected to the recording medium device, the usage information being necessary for using the special content; and a control unit configured to refer to the revocation information to determine, when a terminal device attempts to use the special content, whether or not the terminal device is restricted from using the special content, based on the device identifying information acquired from the terminal device, and when determining affirmatively, to restrict the usage information output unit from outputting the usage information to the terminal device.

With the stated structure, the recording medium device is capable of store the revocation information indicating a terminal device to be restricted from using a special content when the content includes information for distinguishing the special content from regular contents. When the attribute of the content contains information distinguishing a special content from regular contents, the recording medium device refers to the revocation information to determine whether the terminal device connected to the recording medium device is a revoked device associated with the information distinguishing a special content. When the terminal device is a revoked device, the recording medium device can prevent the necessary information for using the content from being output to the terminal device. Hence, by flexibly setting the revocation information, the provider of a special content, which is distinguished from regular contents, can prevent the special content from being used by an unauthorized terminal device.

(2) The usage information may be encryption unique information that is necessary for decrypting a title key encrypted in association with the content identifying information, the title key being a key for decrypting the special content.

According to this structure, the necessary information for using the content, output by the recording medium device, is encryption unique information used for decrypting the encrypted title key. The terminal device determined as an unauthorized terminal device cannot acquire the title key for decrypting the content stored in the recording medium device. Thus, unauthorized terminal devices are prevented from using the content.

(3) The encryption unique information may be a Message Authentication Code (MAC) obtained by a calculation using a private key of the recording medium device and the content identifying information.

According to this structure, the encryption unique information is the MAC obtained by performing a calculation on the content identifying information by using the private key of the recording medium device.

Thus, even if a terminal device has fake content identifying information and is determined as not a revoked terminal device, the encryption unique information that the terminal device can obtain is the MAC of the fake information. The terminal device cannot properly decrypt the encrypted title key by using the MAC of the fake information. The terminal device cannot decrypt the content without the correct title key, and thus the terminal device is prevented from using the content.

(4) The recording medium device may further comprise a notification information output unit configured to output notification information to a terminal device when the control unit restricts the usage information output unit from outputting the usage information to the terminal device.

With the stated structure, when the recording medium device determines that the terminal device is an unauthorized device, the recording medium device transmits notification information to the terminal device instead of the encryption unique information, in order to notify the user of the terminal device that the terminal device cannot use the content.

Thus, when the terminal device cannot use the content, the user of the terminal device is informed of the reason.

(5) A terminal device as one aspect of the present invention is a terminal device for using contents stored in a recording medium device connected to the terminal device, the contents including a special content, the terminal device comprising: a device identifying information output unit configured to output device identifying information to the recording medium device, the device identifying information identifying the recording medium device; an attribute acquisition unit configured to acquire an attribute of a content from the recording medium device; a content identifying information extracting unit configured to extract content identifying information from the attribute of the content when the content identifying information is contained in the attribute, the content identifying information being information distinguishing the special content from regular contents; a content identifying information output unit configured to output the content identifying information to the recording medium device; a usage information acquisition unit configured to acquire usage information, the usage information being necessary for using the special content and having been generated by the recording medium device by using the content identifying information; and a usage unit configured to use the special content by using the usage information.

With the stated structure, the terminal device extracts the content identifying information from the attribute of the special content stored in the recording medium device, outputs the content identifying information to the recording medium device, and acquires the necessary information for using the content, which is generated by the recording medium device by using the content identifying information. Thus, when using the content, the terminal device can acquire base information that is necessary for acquire the necessary information for using the content stored in the recording medium device, from the attribute of the content. The terminal device can acquire the necessary information for using the content in response to transmitting the base information to the recording medium device.

(6) The usage information may be encryption unique information that is necessary for decrypting a title key encrypted in association with the content identifying information, the title key being a key for decrypting the special content.

According to this structure, the necessary information for using the content, acquired by the terminal device, is encryption unique information used for decrypting the encrypted title key. The terminal device can acquire the title key for decrypting the content by using the encryption unique information acquired from the recording medium device. Thus, the terminal device can decrypt and use the content by using the title key. When the terminal device cannot acquire the encryption unique information from the recording medium device, the terminal device cannot acquire the title key. Thus, unauthorized terminal devices are prevented from using the content.

(7) The encryption unique information may be a Message Authentication Code (MAC) obtained by a calculation using a private key of the recording medium device and the content identifying information.

According to this structure, the encryption unique information that the terminal device acquires from the recording medium device is the MAC obtained by performing a calculation on the content identifying information by using the private key of the recording medium device.

Thus, even if a terminal device has fake content identifying information and is determined as not a revoked terminal device, the encryption unique information will be the MAC of the fake information. The terminal device cannot properly decrypt the encrypted title key by using the MAC of the fake information. The terminal device cannot decrypt the content without the correct title key, and thus the terminal device is prevented from using the content.

(8) The terminal device may further comprise: an encrypted-key read unit configured to read the title key which has been encrypted and is stored in the recording medium device; and a decryption unit configured to decrypt the title key by using the encryption unique information, wherein the usage unit may decrypt and play back the special content by using the title key decrypted by the decryption unit.

With the stated structure, the terminal device acquires the title key used for decrypting the content by acquiring the encrypted title key from the recording medium device, and decrypting the encrypted title key with the encryption unique information. Hence, the terminal device can decrypt the content by using the title key and play back the content.

(9) The terminal device may further comprise: a notification information reception unit configured to receive notification information from the recording medium device, the notification information being output by the recording medium device instead of the encryption unique information; and a presentation unit configured to present the notification information to a user of the terminal device.

With the stated structure, when the terminal device cannot use the content, the terminal device receives notification information from the recording medium device instead of the encryption unique information, in order to notify the user of the terminal device that the terminal device cannot use the content. Thus, when the terminal device cannot use the content, the user of the terminal device is informed of the reason.

(10) A distribution device as one aspect of the present invention is a distribution device for distributing information related to usage of contents to a recording medium device connected to terminal devices, the contents including a special content, the distribution device comprising: a storage unit configured to store attributes of the contents, the attributes corresponding one-to-one to the contents; a content identifying information extraction unit configured to extract content identifying information from an attribute stored in the storage unit when the content identifying information is contained in the attribute, the content identifying information being information distinguishing the special content from regular contents; a content identifying information transmission unit configured to transmit the content identifying information to the recording medium device; a usage information acquisition unit configured to acquire usage information, the usage information being necessary for using the special content and having been generated by the recording medium device by using the content identifying information; an encryption unit configured to encrypt a title key in association with the content identifying information by using the usage information, the title key being a key for decrypting the special content; and an encrypted-key transmission unit configured to transmit the title key encrypted by the encryption unit to the recording medium device.

With the stated structure, the distribution device encrypts the title key by using the necessary information for using the content, generated from the content identifying information extracted from the attribute of the content. The content identifying information distinguishes the special content from regular contents. Then, the distribution device transmits the encrypted title key to the recording medium device. Therefore, the distribution device can transmit, to the recording medium device, an encrypted title key that cannot be decrypted without correct content identifying information.

(11) The usage information may be encryption unique information that is necessary for decrypting a title key encrypted in association with the content identifying information, the title key being a key for decrypting the special content.

According to this structure, the necessary information for using the content, generated by the key distribution device, is encryption unique information used for decrypting the encrypted title key. With the use of the encryption unique information generated by the key distribution device, the terminal device determined as an unauthorized terminal device cannot acquire the title key for decrypting the content stored in the recording medium device. Thus, unauthorized terminal devices are prevented from using the content.

(12) The encryption unique information may be a Message Authentication Code (MAC) obtained by a calculation using a private key of the recording medium device and the content identifying information.

According to this structure, the encryption unique information is the MAC obtained by performing a calculation on the content identifying information by using the private key of the recording medium device. Using this MAC, the distribution device encrypts the title key for decrypting the content, and transmits the encrypted title key to the terminal device. When the encrypted title key generated in this way is used, even if a terminal device has fake content identifying information and is determined as not a revoked terminal device, the encryption unique information that the terminal device can obtain is the MAC of the fake information. The terminal device cannot properly decrypt the encrypted title key by using the MAC of the fake information. The terminal device cannot decrypt the content without the correct title key, and thus the terminal device is prevented from using the content.

(13) The distribution device may further comprise: a revocation information transmission unit configured to transmit revocation information to the recording medium device, the revocation information indicating a terminal device restricted from using the special content.

With the stated structure, the distribution device transmits the revocation information to the recording medium device. The revocation information indicating a revoked device associated with the content identifying information. Therefore, the content producer can transmit new revocation information to the recording medium device by updating the revocation information in the distribution device.

(14) The distribution device may further comprise: a notification information transmission unit configured to transmit notification information to the recording medium device, the notification information being information to be presented to a user of a terminal device when the terminal device is restricted from using the special content.

With the stated structure, when the terminal device is restricted from using the content, the distribution device transmits notification information to the recording medium device in order to notify the user of the terminal device. Therefore, the content producer can transmit new notification information to the recording medium device by updating the notification information in the distribution device.

The present disclosure can be used in industries that manufacture and sell terminal devices that record contents distributed via a network, title keys, etc. onto recording medium devices such as SD memory cards, for the purpose of the prevention of unauthorized use of particular contents.

REFERENCE SIGNS LIST

1: Content distribution system
100: Content production device
200: Key issuing device
300: Content distribution device
400: Key distribution device
410: Root public key reception unit
411: Root public key storage unit
412: Revocation information/MSG reception unit
413: Revocation information/MSG storage unit
414: Key distribution device private key/certificate reception unit
415: Key distribution device private key/certificate storage unit
418: Revocation verification unit
426: UR processing unit
430: Mutual authentication unit
441: Encryption/Decryption Unit
440: Title key calculation unit
450: Recording medium device ID acquisition unit
451: MAC calculation unit
500: Terminal device
510: Terminal device private key/certificate storage unit
511: Root public key storage unit
530: Mutual authentication unit
532: Encryption/Decryption Unit
550: Calculated title key reception unit
551: Data transmission/MAC reception unit
556: Title key recalculation unit
558: First playback determination unit
560: Content reading unit
561: Content decryption unit
572: Content signature verification unit
573: Second playback determination unit
574: Third playback determination unit
580: Content playback unit
600: Recording medium device
610: Recording medium device private key/certificate storage unit
611: Root public key storage unit
620: Mutual authentication unit
621: Revocation determination unit
630: Encryption/Decryption Unit
635: Read/write unit
640: Calculated title key storage unit
655: MAC processing unit
660: Content storage unit
670: UR storage unit
680: recording medium device ID/MAC storage unit
690: Content signature storage unit

The invention claimed is:

1. A recording medium device for storing contents used by terminal devices connected to the recording medium device, comprising:
   a content storage unit configured to store contents including a special content;
   an attribute storage unit configured to store attributes of the contents, which correspond one-to-one to the contents and among which an attribute of the special content contains content identifying information distinguishing the special content from regular contents;
   a revocation information storage unit configured to store revocation information including a first region indicating a terminal device restricted from using any content and a second region indicating a terminal device restricted from using the special content;
   a device identifying information acquisition unit configured to acquire device identifying information from a terminal device connected to the recording medium device, the device identifying information identifying the terminal device;
   a usage information output unit configured to output usage information to a terminal device connected to the recording medium device, the usage information being necessary for using the special content;
   a content identifying information acquisition unit configured to acquire the content identifying information from a terminal device connected to the recording medium device; and
   a control unit configured to
   (i) when a terminal device attempts to use the special content, perform a first determination as to whether or not the terminal device is restricted from using any content, by comparing the first region of the revocation information with the device identifying information acquired from the terminal device, and when the result of the first determination is affirmative, prohibit the content identifying information acquisition unit from acquiring the content identifying information from the terminal device, and (ii) when the content identifying information acquisition unit acquires the content identifying information from the terminal device, perform a second determination as to whether or not the terminal device is restricted from using the special content, by comparing the second region of the revocation information with the device identifying information of the terminal device, and when the result of the second determination is affirmative, prohibit the usage information output unit from outputting the usage information to the terminal device.

2. The recording medium device of claim 1, wherein the usage information is encryption unique information that is necessary for decrypting a title key encrypted in association with the content identifying information, the title key being a key for decrypting the special content.

3. The recording medium device of claim 2, wherein the encryption unique information is a Message Authentication Code (MAC) obtained by a calculation using a private key of the recording medium device and the content identifying information.

4. The recording medium device of claim 3 further comprising:
a notification information output unit configured to output notification information to a terminal device when the control unit restricts the usage information output unit from outputting the usage information to the terminal device.

5. The recording medium device of claim 1, wherein when the control unit determines that the terminal device is not restricted from using the special content, the control unit calculates a Message Authentication Code (MAC) by using a private key of the terminal device and the content identifying information, and the usage information output unit outputs the MAC to the terminal device.

6. A control method used in a recording medium device storing contents used by terminal devices connected to the recording medium device, comprising the steps of:
storing contents including a special content;
storing attributes of the contents, which correspond one-to-one to the contents and among which an attribute of the special content contains content identifying information distinguishing the special content from regular contents;
storing revocation information including a first region indicating a terminal device restricted from using any content and a second region indicating a terminal device restricted from using the special content;
acquiring device identifying information from a terminal device connected to the recording medium device, the device identifying information identifying the terminal device;
outputting usage information to a terminal device connected to the recording medium device, the usage information being necessary for using the special content;
acquiring the content identifying information from a terminal device connected to the recording medium device; and
(i) when a terminal device attempts to use the special content, performing a first determination as to whether or not the terminal device is restricted from using any content, by comparing the first region of the revocation information with the device identifying information acquired from the terminal device, and when the result of the first determination is affirmative, prohibiting the acquiring of the content identifying information from the terminal device, and
(ii) when the content identifying information is acquired from the terminal device, performing a second determination as to whether or not the terminal device is restricted from using the special content, by comparing the second region of the revocation information with the device identifying information of the terminal device, and when the result of the second determination is affirmative, prohibiting the outputting of the usage information to the terminal device.

7. A non-transitory computer readable recording medium storing a control program to be executed by a recording medium device storing contents used by terminal devices connected to the recording medium device, the control program causing the recording medium device to perform the steps of:
storing contents including a special content;
storing attributes of the contents, which correspond one-to-one to the contents and among which an attribute of the special content contains content identifying information distinguishing the special content from regular contents;
storing revocation information including a first region indicating a terminal device restricted from using any content and a second region indicating a terminal device restricted from using the special content;
acquiring device identifying information from a terminal device connected to the recording medium device, the device identifying information identifying the terminal device;
outputting usage information to a terminal device connected to the recording medium device, the usage information being necessary for using the special content;
acquiring the content identifying information from a terminal device connected to the recording medium device; and
(i) when a terminal device attempts to use the special content, performing a first determination as to whether or not the terminal device is restricted from using any content, by comparing the first region of the revocation information with the device identifying information acquired from the terminal device, and when the result of the first determination is affirmative, prohibiting the acquiring of the content identifying information from the terminal device, and
(ii) when the content identifying information is acquired from the terminal device, performing a second determination as to whether or not the terminal device is restricted from using the special content, by comparing the second region of the revocation information with the device identifying information of the terminal device, and when the result of the second determination is affirmative, prohibiting the outputting of the usage information to the terminal device.

* * * * *